(12) United States Patent
Smyth

(10) Patent No.: US 8,988,524 B2
(45) Date of Patent: Mar. 24, 2015

(54) APPARATUS AND METHOD FOR ESTIMATING AND USING A PREDICTED VEHICLE SPEED IN AN INDIRECT VISION DRIVING TASK

(71) Applicant: U.S. Army Research Laboratory, Washington, DC (US)

(72) Inventor: Christopher C. Smyth, Fallston, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 13/792,585

(22) Filed: Mar. 11, 2013

(65) Prior Publication Data

US 2014/0253722 A1    Sep. 11, 2014

(51) Int. Cl.
*H04N 9/47* (2006.01)
*G01P 3/38* (2006.01)

(52) U.S. Cl.
CPC ........................................ *G01P 3/38* (2013.01)
USPC ........................................................ 348/121

(58) Field of Classification Search
CPC ................................................... A63B 2220/30
See application file for complete search history.

(56) References Cited

U.S. PATENT DOCUMENTS

| 4,970,683 | A | 11/1990 | Harshaw et al. |
| 7,895,135 | B2 | 2/2011 | Norris et al. |
| 2003/0167454 | A1 | 9/2003 | Iordanov et al. |
| 2009/0086021 | A1 | 4/2009 | Baier et al. |
| 2009/0091475 | A1* | 4/2009 | Watanabe et al. .......... 340/932.2 |
| 2009/0118996 | A1 | 5/2009 | Kantarjiev et al. |
| 2012/0075123 | A1 | 3/2012 | Keinrath et al. |

OTHER PUBLICATIONS

"Indirect Vision Dirving With Fixed Flat Panel Displays for Near-Unity, Wide, and Extended Fields of Camera View"; Christopher C. Smyth, James W. Gombash, and Patricia M. Burcham, Army Research Laboratory, ARL-TR-2511, Jun. 2001, 165 pages.
"Modeling Indirect Vision Driving With Fixed Flat Panel Displays: Task Performance and Mental Workload", Christopher C. Smyth, Army Research Laboratory, ARL-TR-2701, May 2002, 89 pages.

(Continued)

*Primary Examiner* — Dave Czekaj
*Assistant Examiner* — Leron Beck
(74) *Attorney, Agent, or Firm* — Eric B. Compton

(57) ABSTRACT

A method and apparatus for predicting vehicle speed during an indirect vision driving task. A further method and apparatus for optimizing the display of a camera return during an indirect vision driving task based on operator perceived vehicle speed as set by the display characteristics and the field-of-view of the camera. A further method and apparatus for using the perceived speed as a driving task aid, in particular, as an electronic aider for optimizing the driving scene display characteristics of scene compression and camera field-of view. In this manner, the invention adjusts the perceived speed in order to match the operator's cognitive flow to the control dynamics needed from the operator for the task. The invention has application to autonomous driving where manual intervention is incorporated during critical events for particular tasks; and with limited display space within the vehicle, the display format is adjusted by the invention according to the operator's task needs.

20 Claims, 22 Drawing Sheets

(56) References Cited

OTHER PUBLICATIONS

"Is the Cerebellum a Smith Predictor?", R.C. Miall, D.J. Weir, D.M. Wolpert, and J.F. Stein, Oxford University, University Laboratory of Physiology, Journal of Motor Behavior, 1993, vol. 25, No. 3, pp. 203-216.

"Driving Performance of the Vetronics Technology Test-Bed (VTT) Vehicle", Christopher C.Smyth, MAJ Dennis Gaare, James W. Gombash, and Christopher C. Stachowiak, Army Research Laboratory, Human Research & Engineering Directorate, ARL TR-2914, data presented by TARDEC at Jun. 2002 NDIA Intelligent Vehicle Systems Symposium, 82 pages.

"Detecting targets from a Moving Vehicle with a Head-Mounted Display and Sound Localization", Christopher C. Smyth, Army Research Laboratory, ARL-TR-2703, May 2002, 111 pages.

"Indirect Vision Driving Study", Christopher C. Smyth and Ronald G. Whittaker, 21st Army Science Conference, Norfolk, VA, Jun. 15-17, 1998, 9 pages.

"A Note on Speed-Road Curvature Relationships," J. Emmerson, Traffic Engineering and Control, Nov. 1970. Cited in Fitzpatrick K & WH Schneider IV (2004). Turn Speeds and Crashes Within Right-Turn Lanes. FHWA/TX-05/0/4365-4, Texas Transportation Institute, The Texas A&M University System: College Station, Texas 77843-3135, p. 24.

U.S. Appl. No. 13/721,161, filed Dec. 20, 2012.

\* cited by examiner

APPARATUS AND METHOD FOR ESTIMATING AND USING A PREDICTED VEHICLE SPEED IN AN INDIRECT VISION DRIVING TASK

GOVERNMENT INTEREST

Governmental Interest—The invention described herein may be manufactured, used and licensed by or for the U.S. Government.

FIELD OF INVENTION

Embodiments of the present invention generally relate to vehicle navigation and, more particularly, to a method and apparatus for estimating and using a predicted vehicle speed during an indirect vision driving task.

BACKGROUND

As technology progresses, modern combat vehicles will be driven autonomously as much as possible, with manual intervention called for only in critical moments. During autonomous driving, the operator may view video camera returns of the external scene that are projected along with multifunctional displays on large screen monitors mounted within the vehicle. As well as the driving scene, the monitors commonly shared by several operators may show different display windows depending upon the function, such as tactical maps, system status, and situational awareness as organized by an on-board electronic display driver. This is especially true for a vehicle operated as a control station for remote unmanned air and ground vehicles due to multiple tasks required to manage the systems. During autonomous driving, the operator of a tactical vehicle may be performing multiple tasks monitoring and controlling other operations from the on-board vehicle displays. Although many of these tasks are automated with an electronic associate in the form of embedded computer programs, there are times during critical events when the automation will defer to the human operator for operation of the vehicle. Because of the limited display space within the vehicle, the display formats will be economized depending upon the needs of the task for monitoring or engaging manual control.

As examples of the complexity and need for economizing display space, modern combat vehicles utilize computerized system level electronic associates providing course and tactical advisories including path planning based on terrain, the tactical situation, and the system capabilities. These systems may involve displays for processing multiple control tasks in vehicle controls, tactical evaluation and decision making, system status, and communications needed for complex system performance. These manned vehicle designs may incorporate visual imaging systems with multifunctional displays in the crew stations to both operate the vehicle and control subordinate unmanned air and ground robotic elements. Depending upon the task being performed, the imaging system will visually display the scene that is external to either the host vehicle or the robotic element. The scene images will be collected by sensors mounted on the exterior of the vehicle, and for robotics operations, radioed back to the host vehicle. The display system will show computerized digitized images acquired by the sensors. The crewmember will see a selected portion of the computerized display buffer that depends upon his or her task and viewing direction. No doubt future imaging systems will appear to the crewmember of the host vehicle as "see-through armor" by incorporating virtual reality components for the seemingly direct viewing of the external scene. In this case, the crewmember may be supervising the autonomous driving or flying of the vehicle, operating the vehicle when called upon by the electronic associate for obstacle avoidance, or monitoring the scene for targets in the local area.

Incorporated with the scene displays are computer driven multifunctional displays of tactical situation maps, systems status, control status, and communications. The crewmember uses the displays to supervise and interact with the electronic associate programs that plan and coordinate the control and communication functions needed to perform a mission. These functions include planning and monitoring the advance of the host vehicle and the semi-autonomous robotics elements, maintaining tactical awareness, seeking and engaging targets, monitoring the system status of the host vehicle and the robotics elements, and composing and sending status reports including spot intelligence reports to higher headquarters.

In regard to robotics functions, the crewmember may be searching for targets on the display of a RSTA sensor return from unmanned air or ground reconnaissance vehicles, supervising the assignment of fire missions among armed robotics elements, confirming the approach routes assigned by the electronic associates, and monitoring the battery, fuel, and ammunition status of the vehicles. Furthermore, in those cases where the crewmember has rejected the plan proposed by the electronic associate, he or she will be interacting with the program to supervise the refinement. Finally, in those incidents where the ground robotic element cannot navigate further along the designated route possibly because of terrain obstacles, the crewmember may be temporally called upon to tele-operate the robotic vehicle from the onboard display of the remote vehicle camera return.

The technology for autonomous vehicle driving is well established, using Google's self-driving car as an example; course selection, obstacle avoidance, and driving control are all built into the vehicle. Driving course selection is automated with a roadway mapping data system combined with an external data feed on tactical constraints and a Global Positioning System (GPS) for locating the vehicle relative to the terrain mapping. Concurrently, obstacle avoidance is maintained by an array of technology including a movement-detection radar for distant viewing, an on-board laser detection system for immediate distance viewing, and a video camera for panoramic viewing of the external scene about the vehicle; the accumulated driving scene data is processed with image processing software for driving hazards and integrated with a self-driving control program for hazard avoidance. However, there may be critical times when the automated processes will receive insufficient data for proper functioning, and the automation will defer to the human operator for operation of the corresponding particular tasks.

Therefore, because of the limited display space within the vehicle, the display format will depend upon the features of the task. In particular, the display window size for the driving scene can be reduced during monitoring of autonomous driving to accommodate other displays, by, for example, scene compression coupled with panoramic camera field-of view. However, these display characteristics impact the driver's natural awareness of the vehicle speed and therefore driving performance during manual intervention, thereby necessitating the need for a means to control display size and camera field-of-view for compatibility of the display with the controls used in the driving task. For example, when elements of the autonomous driving are suspended with manual intervention called for in critical moments, the driving scene characteristics may be adjusted to optimize the called for task. In particular, such adjustments may be made for setting the perceivable road speed at a level that generates a cognitive flow rate in the operator that is compatible with the control dynamics needed for the task. For example, different settings will be needed for such sundry tasks as driving on an undetermined course, maintaining driving environmental awareness including detecting obstacles, evaluating obstacles, circumnavigating obstacles, navigating tight course turns, or parking the vehicle; with each such successive task requiring increased speed awareness and display/control compatibility for optimal operation.

SUMMARY

The invention employs a method and apparatus for predicting perceived vehicle speed during indirect vision driving based on display characteristics, viewing camera field-of-view, and road characteristics. The invention uses an estimator of vehicle speed awareness from the perceived scene optical flow as determined by the display characteristics of display scene compression and camera field-of view, for predicting perceived vehicle speed.

An embodiment of the invention is directed to a further method and apparatus for using the predicted speed as a driving aid, in particular, as an electronic aider for optimizing the driving scene display characteristics of scene compression and camera field-of view, display characteristics that may impact the natural perception of the vehicle speed and therefore driving task performance.

In a further embodiment, the invention is an electronic aider for optimizing driving scene display characteristics as a function of task needs that are determined from an embedded model of operator visual attention and knowledge of task demands, that are incorporated within a skills-based, rules-based, and knowledge-based (SRK) micro-model of visual attention processing, and a forward-predictor model of skills processing.

In one form of embodiment, the invention may constitute an electronic display organizer, which electronically aware of the task priorities, schedules the information needs for the task and arranges such in a display format that is in a manner supportive of the performance by the operator; in particular, the display size and camera FOV that for the vehicle speed generates a perceivable speed corresponding to a cognitive flow rate in the operator that is compatible with the control dynamics needed for the task.

The invention is intended for use as a peripheral to an electronic system associate for control of display and camera characteristics as a function of the tactical situation and a cost/benefit calculation of the effect on the system performance. In this embodiment, the invention has application to autonomous driving where manual intervention is incorporated during critical events for particular tasks, and with limited display space within the vehicle, the display format is adjusted by the invention according to the operator's task needs. In this embodiment, the invention may adjust one or more of the display size, camera FOV, and the vehicle speed for a perceivable speed corresponding to a cognitive flow rate in the operator that is compatible with the control dynamics needed for the task, where the camera FOV is bounded by the task needs, and the vehicle speed is bounded by tactical considerations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
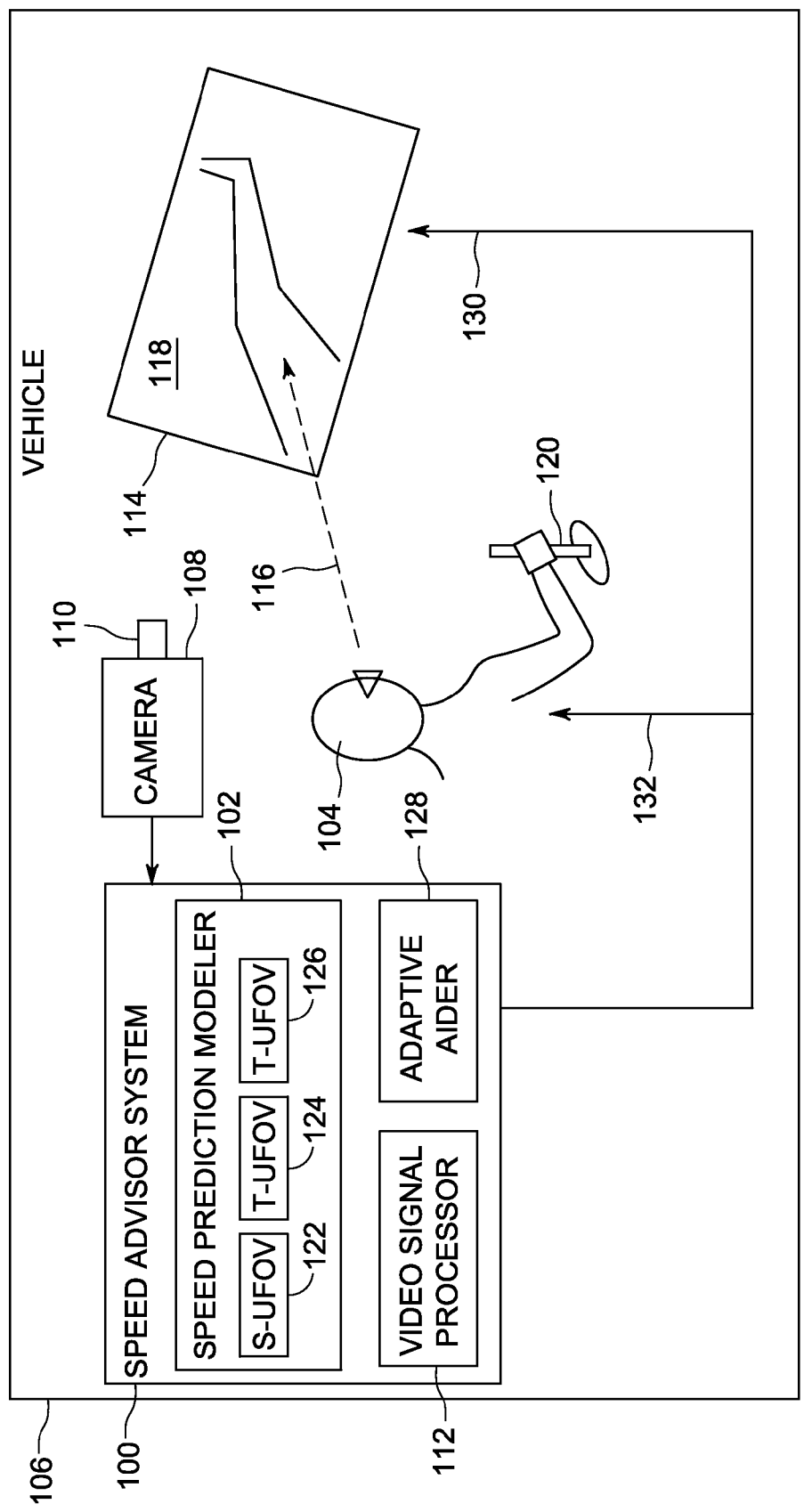
FIG. 1 is a block diagram of a system for indirect vision vehicle driving that includes a speed advisor system for predicting vehicle speed during indirect vision driving and a real-time adaptive aider that applies a predicted speed perception as a driving aid in accordance with exemplary embodiments of the present invention.

Essential to the development of the invention is a method and apparatus for predicting perceived road speed as seen on a video display from an indirect vision camera return, and in particular as determined from the characteristics of both the display and camera. Following are the basis for one such embodiment first with a description of the driving paradigm for indirect vision driving.

When driving a vehicle using indirect vision (that is, driving based on a displayed scene), the driver typically navigates segments of track in a scene (a road course) that can be classified as portions that have relatively unlimited field-of-view (that is, a straight road portion and entry and exit portions of a road turn portion), and road portions that have a limited-field of view (that is, the road turn portion between the entry and exit portions of the road turn). The driver uses the velocity of the optic flow field of the displayed scene to maintain the vehicle track. In a straightway, it is believed that that the driver fixates on the apparent origin of the optic flow field and while visually pursuit tracking the origin point in the displayed scene, drive at a speed that he has learned from training to be safe and practical. Typically, the display viewed by the driver will provide, for example a 110° Field of View (FOV), which matches a 110° FOV provided by a forward and slightly downward viewing monocular camera array, mounted on the front roof of the vehicle being driven. With this arrangement, the driver will not notice any scene compression, and driving speed for indirect driving should match that of direct driving. However, if in response to changing conditions (such as entering an unfamiliar area), the camera array is adjusted to provide an increased FOV (and no corresponding change is made to the display), the displayed scene will necessarily have increased compression, and as a consequence the displayed scene will have a lower resolution. As a result of the increased compression, the origin point will appear closer in the scene to the front of the vehicle. The optic flow will now be perceived to move faster than it is in reality because now the origin point appears closer to the front of the vehicle, and the driver now has to look further down on the display closer to the hood of the vehicle in order to visually track the flow origin. As a result, the driver proceeds slower to compensate for what the driver perceives as an apparent increase in speed. Additionally, the lower resolution will make it more difficult for the driver to discern specifics in the displayed scene, thereby also contributing to the result that the driver will proceed slower to compensate for these changes in the displayed scene.

In a road turn with near unlimited field of view, that is, for "wide" turns (turns having a large radius of curvature), the driver sees not only the scene changing with the forward motion of the vehicle, but also with a vehicle rotation as determined by the forward motion of the vehicle and the radius of curvature of the turn. Again, the driver is believed to fixate on the apparent origin of the scene optic flow, but now judges the vehicle to move with the resultant speed of the scene (that is, resulting from the combined effect of the forward motion and the radius of curvature). As a result, the driver now tends to reduce his forward motion to account for the rotational motion component of the displayed scene.

Finally, when the field-of view is so limiting that the flow origin for the turn being executed is outside of the view of the driver, the driver must reduce his speed to allow sufficient time to judge the velocity flow field that remains in the display; that is, the driver tracks the optic flow from the image of the road course at an edge of the display. Since in this case, as explained above, due to scene compression, the optic flow source is closer to the vehicle than it would be for the unlimited field of view, the optic flow appears to move still faster because the driver now has to look further down on the display even more to visually track the flow origin, and as a result the driver proceeds still slower to compensate for the perceived increase in speed. Such slower driving can be detrimental or unwanted in certain situations, such as in a combat situation where the driver may be engaged in a pursuit or escape.

Accordingly, embodiments of the present invention comprise a method and apparatus for predicting vehicle speed during indirect vision driving, and use of the predicted speed as a driving aid. Predicting indirect vision driving speed for a vehicle comprises calculating a function that includes, among other variables, the direct vision straightway speed, the radius of any turn and the field-of-view of the system used to provide the driving image on a display of the indirect vision driving system. The predicted indirect vision driving speed is then applied as a driving aid. In one embodiment, the predicted driving speed may be used with a speed advisor system; in still another embodiment the predicted driving speed is applied to adaptively control display characteristics of the scene field-of view or scene compression presented to a driver. In this embodiment, the predicted driving speed may be used as a metric for optimizing the display of a camera return during an indirect vision driving task based on an operator perceived vehicle speed as set by the display characteristics and the field-of-view of the camera. Such adaptive control of the display characteristics affects the perceived driving speed, which in turn affects the true speed attained by the driver. Adaptive field-of view and/or scene compression are only two mechanisms for optimization of display usage within the vehicle.

FIG. 1 is a block diagram of a system for indirect vision vehicle driving that includes a speed advisor system for predicting vehicle speed during indirect vision driving and a real-time adaptive aider that applies a predicted speed perception as a driving aid in accordance with exemplary embodiments of the present invention. More specifically, in this embodiment, the speed advisor system includes a speed prediction modeler that predicts speeds that a driver will most likely attain when navigating a vehicle along paths in an oncoming scene when using an indirect vision system, as compared to a speed the driver would be expected to attain when navigating the same paths using direct vision. An adaptive aider is applied to one or more senses of the driver so as to one or both of alert the driver that there is a difference between the perceived and actual speeds, or affect the display portion of the indirect vision system in a manner intended to reduce the difference between the drivers perceived and actual speed.

Accordingly, a speed advisor system 100 includes a speed prediction modeler 102 for predicting a speed that a driver 104 will most likely attain when navigating a vehicle 106 along paths in an oncoming scene when using an indirect vision system, as compared to a speed the driver would normally attain when navigating the same paths using direct vision. A camera 108 including a lens 110 is mounted on the roof of the vehicle 106 and directed toward the front of the vehicle 106 so as to capture the oncoming scene and present a video signal representative of the scene to a video signal processor 112. Processor 112 processes the video signal from the camera 108 so as develop a video signal suitable for application to a video display 114. Video display 114 is positioned in the view 116 of the driver 104, and the speed advisor system 100 applies the video signal from processor 112 to the display 114 so that the driver 104 can view a video image of the oncoming scene 118 on the display. The vehicle 106 may be a ground traveling vehicle such as a tank, but is not limited to such a vehicle, that is, other vehicles, as well as airborne vehicles, are contemplated. In response to the driver 104 viewing the scene 118 on display 114, the driver may control the speed and direction of the vehicle 106 using controls, such as a joystick 120 (representative of one of many types of devices well known to those of ordinary skill in the art which can be used to control a vehicle). It is noted that camera 108 may comprise a single camera having an adjustable field of view lens 110, may comprise an array of cameras 108 with fixed field of view lenses 110 or may comprise an array of cameras 108 having adjustable field of view lenses 110.

The speed prediction modeler 102 includes segment modelers that develop speed predictions for different segments of oncoming scenes, such as a straight path modeler 122 for straight path segments having unlimited field of view (S-UFOV), a nearly unlimited field of view modeler 124 for path segments corresponding to entry and/or exit of a turn which has unlimited field of view (T-UFOV), and a limited field of view modeler 126 for path segments that are further into a turn where there is a limited field of view (T-LFOV). In response to the speed predictions from one or more of modelers 122, 124 and 126, an adaptive aider 128 develops sensory input that is applied to the driver. As a result of the aid, the driver may adjust his speed so it will more closely approach an expected speed. In one embodiment the sensory input is a modification of the video signal that is applied to display 114 via path 130, such as a modification to change one or more of its field of view, compression or resolution. In another embodiment, the sensory input may be a written message on display 114 or a sound or touch warning or alert via path 132, each of which is applied so as to advise the driver that the current speed is different from the expected speed.

Figure 2:
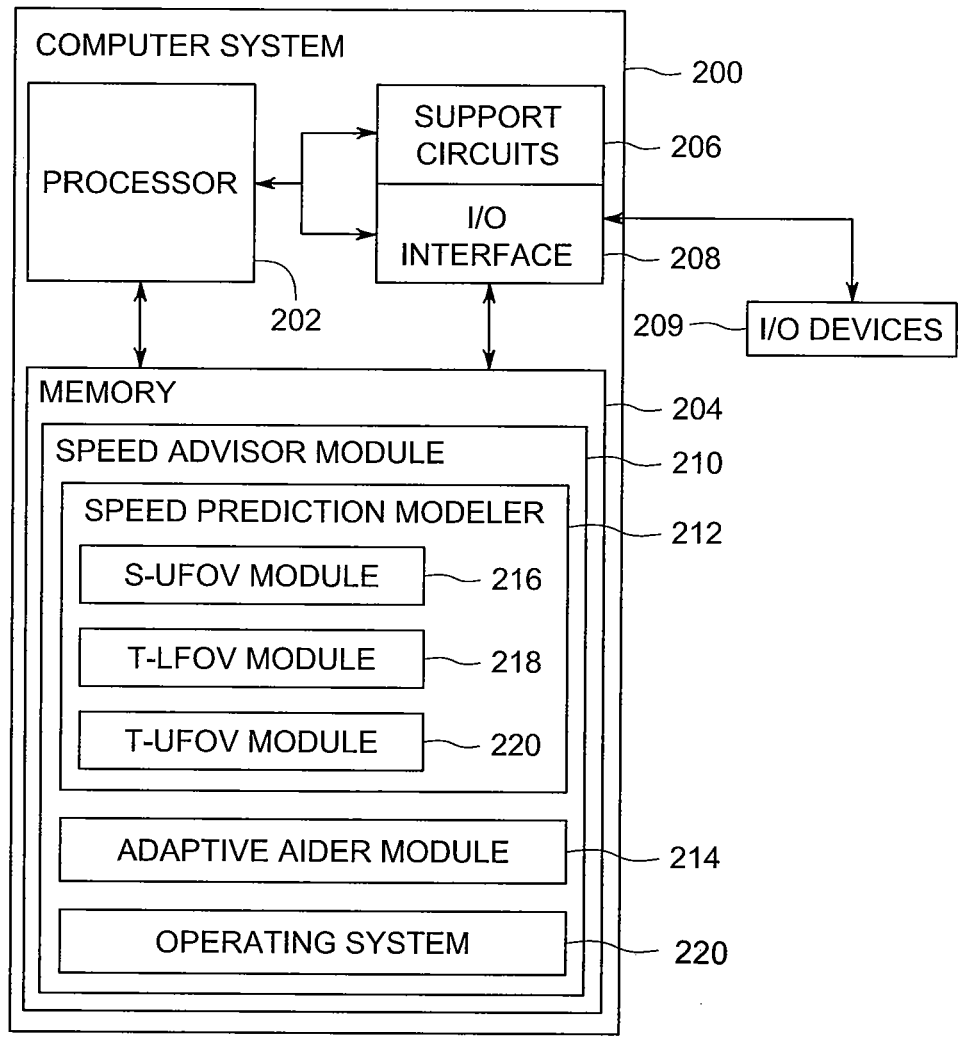
FIG. 2 is a block diagram of a computer system for implementing the speed advisor system of FIG. 1 in accordance with embodiments of the present invention.

FIG. 2 is a block diagram of a computer system for implementing the speed advisor system of FIG. 1 in accordance with embodiments of the present invention. The computer system 200 includes a processor 202, a memory 204, various support circuits 206 and an Input/Output (I/O) interface. The processor 202 may include one or more microprocessors known in the art, and/or dedicated function processors such as field programmable gate arrays programmed to perform dedicated processing functions. The support circuits 206 and I/O interface 208 for the processor 202 include microcontrollers, application specific integrated circuits (ASIC), cache, power supplies, clock circuits, data registers, and the like. The I/O interface 208 may be directly coupled to the memory 204, coupled via processor 202 or coupled through the supporting circuits 206. The I/O interface 208 may also be configured for communication with input devices and/or output devices 209, such as the camera 108 and joystick 120 of FIG. 1 or network devices, various storage devices, mouse, keyboard, displays, sensors and the like, and include analog and digital signal processing sufficient to perform the functions of video signal processor 128.

The memory 204 stores non-transient processor-executable instructions and/or data that may be executed by and/or used by the processor 202. These processor-executable instructions may comprise firmware, software, and the like, or some combination thereof. Modules using processor-executable instructions that are stored in the memory 204 comprise the speed advisor system 100 of FIG. 1, and as such include a speed advisor module 210, a speed prediction modeler 212 and an adaptive aider module 214. The speed prediction modeler 212 includes a scene segment modeler S-UFOV module 216, a scene segment modeler T-LFOV module 218, and a scene segment modeler T-UFOV module 220. Speed prediction modeler 212 and the segment modelers 216, 218 and 220 provide a speed prediction for different road segments of oncoming scenes: straight paths having unlimited field of view (S-UFOV), paths corresponding to entry and exit of a turn which have unlimited field of view (T-UFOV), and paths that are between the entry and exit portions of the turn where there is a limited field of view (T-LFOV), as described in FIG. 1, and as further described below.

The computer system 200 may be programmed with one or more operating systems 222 (generally referred to as operating system, OS), which may include OS/2, JAVA VIRTUAL MACHINE®, LINUX®, SOLARIS®, UNIX®, WINDOWS®, WINDOWS SERVER, among other known platforms. At least a portion of the operating system 222 may be disposed in the memory 204. In an exemplary embodiment, the memory 204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

Figure 3:
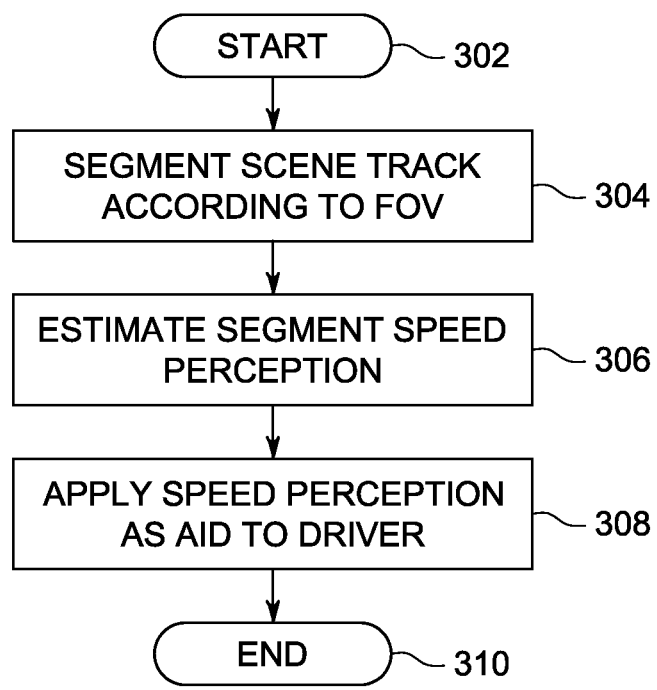
FIG. 3 is a flow diagram for a method for predicting vehicle speed during indirect vision driving and a real-time adaptive aider that applies a predicted speed perception as a driving aid in accordance with embodiments of the present invention.

FIG. 3 is a flow diagram for a method for predicting vehicle speed during indirect vision driving and a real-time adaptive aider that applies a predicted speed perception as a driving aid, using the computer system of FIG. 2, in accordance with embodiments of the present invention. Method 300 starts at step 302 and proceeds to step 304. At step 304 the track in the scene is segmented according to FOV using the modules 216, 218 and 220 of FIG. 2, that is, straight paths having unlimited field of view (S-UFOV), paths corresponding to entry into or exit from a turn and therefore have nearly an unlimited field of view (T-UFOV), and paths that are further into a turn and therefore have a limited field of view (T-LFOV). Conventional computer implemented pattern recognition techniques can be used to identify, and thereby segment, such path portions in the images by segment. Of course, these configurations may be used in further embodiments as a basis for applying the predicted driving speed with adaptively controlling display characteristics of the scene field-of-view or scene compression presented to a driver. One such embodiment described later is the optimizing of the display of a camera return during an indirect vision driving task based on operator perceived vehicle speed as set by the display characteristics and the field-of-view of the camera.

In order to provide a speed prediction, each of modules 216, 218 and 220 of the speed prediction modeler 212 operates to solve a respective speed prediction equation for each segmented path portion. Derivation of the speed prediction equations are described next.

Mathematical Derivation of Speed Prediction Equations

The driving task is self-paced with the speed being adjusted to accommodate the information processing and reactive decisions that follow from the velocity flow field of the scene that appears on the display. The velocity flow field is generated by the apparent flow of terrain features across the display along the direction of travel. During indirect vision driving, when there is an increase of camera field of view (FOV) over unity (that is, the FOV of the camera is greater than the FOV of the display), there will be a corresponding increase in display compression and a corresponding decrease in scene resolution, which reduces the visibility of the terrain detail that provides the flow field to the driver. With compression, the velocity flow appears to originate from a point in the scene that is closer to the front of the vehicle. Further, the velocity flow appears faster than normal and appears to speed up and move laterally as the vehicle moves forward because of scene distortion with compression. For this reason, the driver actually moves at a slower speed to allow time to evaluate course changes and execute motor responses. Also, the decrease in scene resolution that accompanies the display compression increases the control to display response ratio and thereby decreases the control sensitivity. As a result of the display compression, the driver must make finer control adjustments to get the same control as with direct viewing. Therefore, the driver reduces his or her driving speed even more to accommodate the rate of change in course variation and to try to maintain a consistent error rate under the reduced control sensitivity.

In a straightway, the driver is assumed to fixate on the flow field origin and drive at a speed that he has learned from training to be safe and practical. At an increased display scene compression ratio, the origin point appears closer in the scene to the vehicle and therefore the driver must proceed at a slower speed to allow the same amount of mental processing time as when the origin point was further away. In a turn, the driver sees not only the scene changing with the forward motion of the vehicle, but also with the rotational speed as determined by the forward motion and the radius of curvature. Again, the driver is assumed to fixate on the origin of the velocity flow but now judges the speed from the resultant speed with which the scene is appearing to move. Since this speed includes a rotational component in addition to the forward component, the driver now tends to reduce his forward motion to account for the rotational component. Finally, when the field-of view is so limiting that the flow origin is outside of the view for the turn being executed, the driver must reduce his speed even further to allow sufficient time to judge the velocity flow field that remains in the display.

Figure 4:
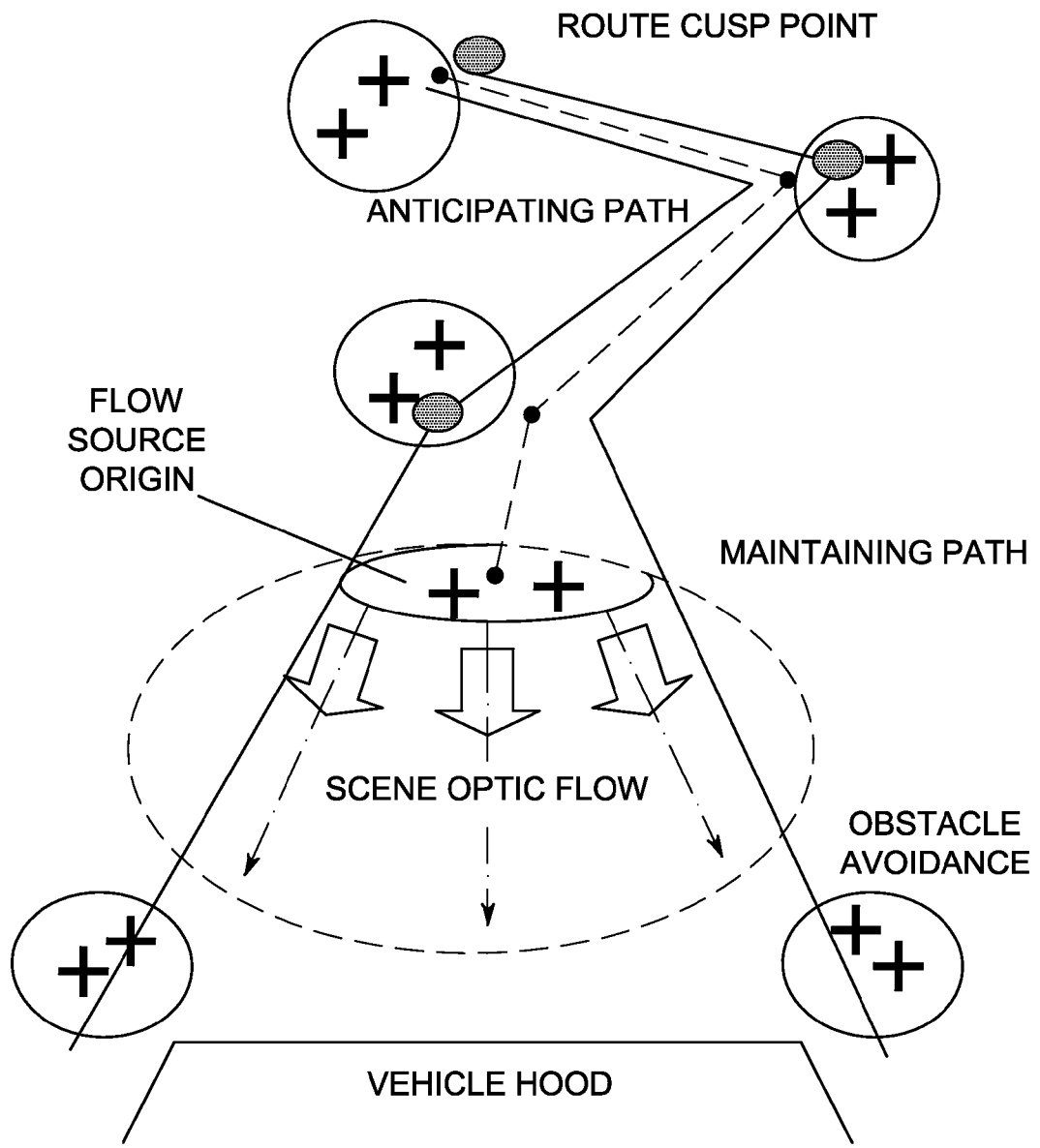
FIG. 4 illustrates a typical driving scene as might be perceived by the driver of a vehicle.

FIG. 4 is a block diagram which shows a typical driving scene as might be perceived by the driver of the vehicle. Here, feasible fixation points and corresponding gaze areas are shown marked by cross-hairs and circles. The route is shown as consisting of a close distance, a near distance, and a far distance as defined by different driving domains. The close distance is that which is the immediate front and sides of the vehicle, and here the driver is concerned with obstacle avoidance.

As shown in FIG. 4, in the close distance, the driver tends to visually fixate on the road edges to ensure that the vehicle is within the roadway boundaries. Further out from the vehicle front, in the near distance, the driver sees a point from which the terrain optical flow appears to originate, called the flow source origin. Here, the features of the roadway terrain consists of the variations, stones, and brush in the roadway depending upon the terrain. The flow source origin tends to be a point a fixed distance ahead of the vehicle, the exact location depending upon the lighting and reflectance of the terrain textures, and for an indirect vision system, the brightness, contrast and resolution of the display that the driver is using to view the roadway. While the driver fixates on the flow source origin, the optic flow is perceived in the peripheral vision and this flow is more noticeable as the vehicle moves faster. In this near distance domain, the driver tends to steer the vehicle so as to maintain the flow source origin within the image of the roadway. Finally, in the far distance, the driver anticipates the route to be followed from a series of visual fixations on definite cusp points along the roadway. In this driving process, the driver tends to adjust his speed and direction to maintain a consistent velocity flow along the roadway that he judges is reasonable for the terrain and the mechanics of the vehicle. Intermediate with keeping the vehicle along the roadway, the driver looks ahead to anticipate the course and in front to avoid obstacles. However, during normal driving in which obstacles are not apparent and the roadway is relatively obvious, the driver tends to control his driving activity predominately from the optic flow pattern occasionally interrupting his concentration to check ahead.

Figure 5A:
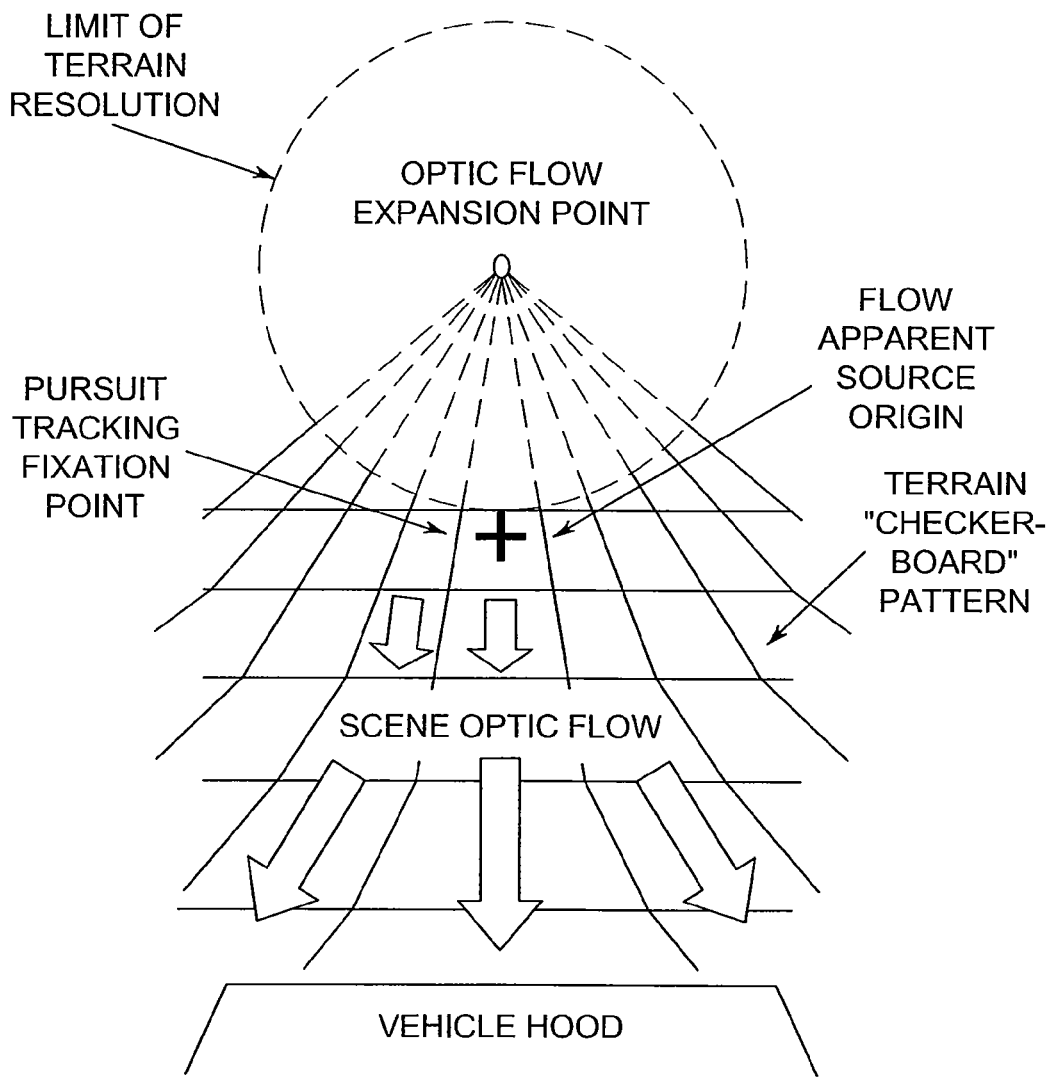
FIG. 5A illustrates a driving scene in which the terrain is idealized as a "checker-board" grid pattern.

To better understand driving from the optic flow pattern, FIG. 5A shows a driving scene in which the terrain is idealized as a "checker-board" grid pattern. The driver maintains the path of travel by pursuit tracking of the scene optical flow. As the vehicle moves forward, the fixed terrain visually appears to flow outward from the optic flow expansion point; this is the point on the horizon that the vehicle is heading toward. In an indirect vision system, because of the reduced resolution of the cameras and displays, the terrain optic flow only becomes apparent at distances closer to the vehicle. In effect, the optic flow appears to stream from a zone of apparent origin that is closer to the vehicle than the expansion point, and expand in size as an inverse function of the distance from the vehicle. When maintaining the path of travel, the driver locates and visually fixates on the zone of apparent origin, controlling the vehicle from the optical flow of the terrain in the foveal and peripheral vision fields, In this process, the driver performs a form of compensatory control at the skill level with pipelined perceptual and motor activity and cognitive monitoring, in which the optic flow is compared to the projected path and corrections are made for offsets in direction and speed. Visually, the driver is fixated on the edge of the flow origin and pursuit tracks this target, which is moving across the stationary terrain. While the moving target is being fixated on the fovea of the eye, the terrain is being blurred across the retina out to the limits of peripheral vision. However, it has been shown experimentally that the acuity of stationary objects seen during pursuit tracking is independent of the tracking speed at the higher luminance levels. In particular, it has been shown that the minimum resolution of stationary vertical and horizontal striped patterns remains relatively constant (about one minute of arc) across a wide range of pursuit target speeds (zero to 120 degrees per second) for the luminance levels of video displays (60 mL), when presented for at least 100 milliseconds. While the location of the flow origin is determined by the resolution of the terrain pattern, the perceived speed of the flow pattern is determined by the angular motion of the pattern at the retina. The short time span needed for processing allows time sharing of the path maintenance with the other tasks of driving such as anticipating the path and obstacle avoidance. In what follows, we model this vehicle control modality in which the driver uses the flow pattern to guide his course for indirect vision driving. However, in order to develop a speed prediction model that takes the above observations into account, we must first understand more about the effect of display scene compression on object awareness.

To this purpose, in a further embodiment, the effects of display scene compression on object awareness are derived as a function of the compression ratio. Following, in a still further embodiment, this development is extended to the effects of display scene compression on perceived vehicle speed. In this effort, the effects are derived using the speed for a 'unity' display configuration as a basis. Here, the scene compression as seen on the display of the camera return is determined by the ratio of the camera FOV to that of the display as seen from the driving station. A unity display occurs when the display FOV matches that of the camera, that is, the scene seen on the display is in a one-to-one correspondence with the natural scene in the camera view. Here, the scene resolution is limited by native resolution of the display monitor (pixels per length), if not by the resolution of the camera sensor.

Mathematics for Object Awareness

Figure 5B:
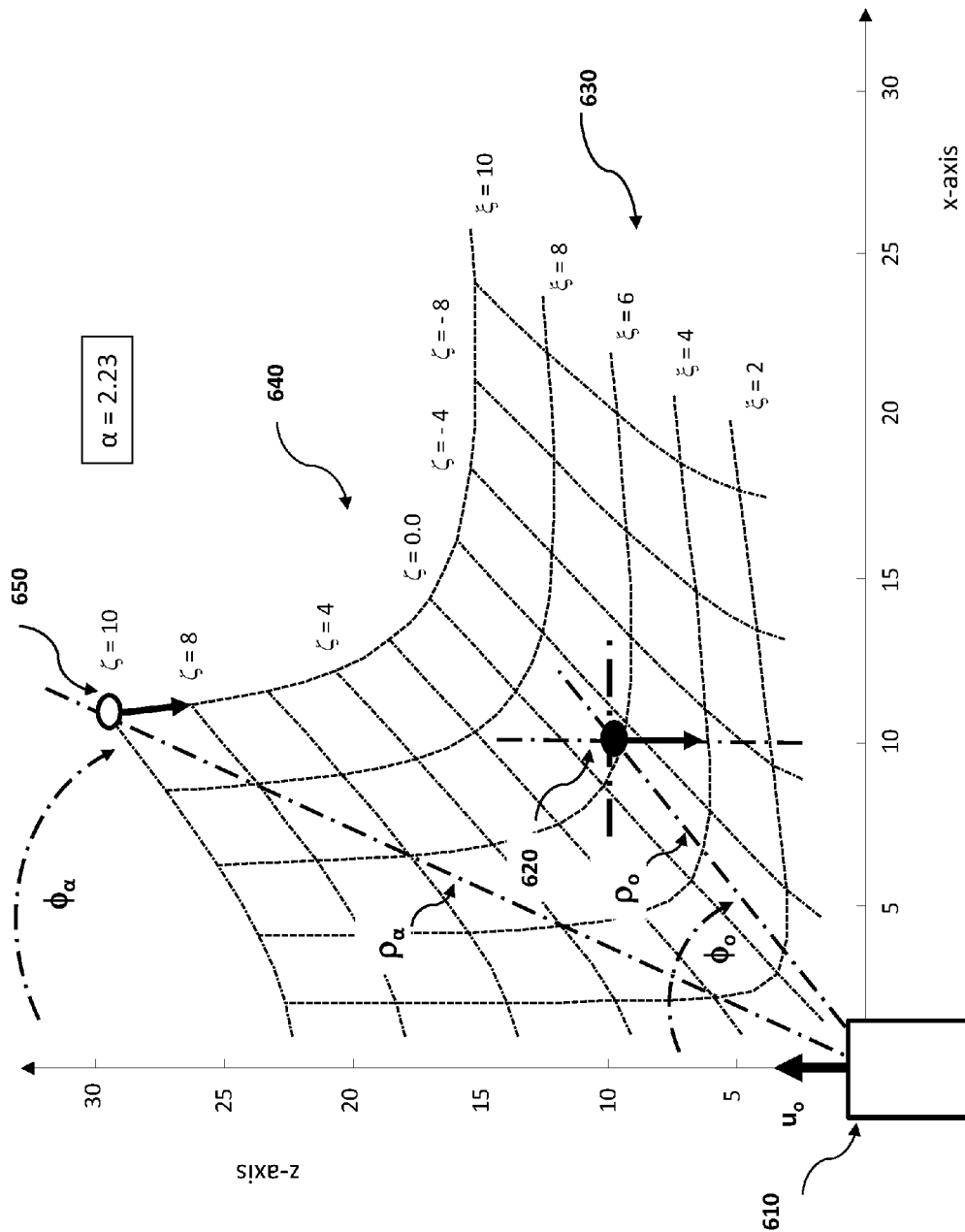
FIG. 5B illustrates a terrain map plot with a Cartesian coordinate system for a compressed scene centered on a vehicle.

The effects of display compression upon the display scene imagery may be demonstrated to a first order approximation with a simple mathematical analysis mapping the distortions in space and time of the actual scene to the display scene for a pinhole camera (i.e., without consideration of the camera lens optical properties). To this purpose, consider a unity-display (equal camera and display FOV), with a real world scene located in a Cartesian coordinate system centered on the vehicle 610 as shown in FIG. 5B, and the longitudinal axis of the vehicle collinear with the forward looking z-axis of the display (with [x, y] monitor coordinates). Considering a stationary object 620 of size $\sigma$ located at a point $(x_O, z_O)$; the corresponding polar coordinates are the radial distance, $\rho_O=\text{sqrt}(x_O*x_O+z_O*z_O)$ and bearing $\phi_O=a\tan(x_O/z_O)$; as seen from the coordinate center the object has angular size, $\Phi_O=\sigma/\rho_o$. Let the vehicle be moving forward in a straight line with a constant forward velocity $u_O$ along the z-axis. With velocity components $u_x=0$ and $u_z=u_O$, the position of the object in the scene changes to $x=x_O$ and $z=z_O-u_O*t$ over time, t. Since the direction of travel is along a straight line $(x=x_o)$, the radial distance to the object as a function of the bearing is $\rho=x_O/\sin(\phi)$, and the angular size is $\Phi=\sigma*\sin(\phi)/x_O$, where $\phi=a\tan 2(x_O, z_O-u_O*t)$. The rate of increase in angular size (i.e., visual expansion rate), is $\Phi'=\sigma*u_o*\cos(\phi)*\sin^2(\phi)/x_O^2$, while the acceleration in angular size is $\Phi''=\sigma*u_O^2*(2*\cos^2(\phi)-\sin^2(\phi))*\sin^3(\phi)/x_O^3$; here, primes denote time derivatives. The object appears to be approached at a constant speed and the driver experiences no visual sensation of acceleration in this driving situation.

As shown in FIG. 5B, consider now a scene compressed in angular field-of-view (FOV) by the ratio of the camera FOV for the scene to that of the display, here $\alpha=2.23$. With the resulting distortion of the x-axis into the ξ-axis 630 and y-axis into the ζ-axis 640, the before mentioned object is now 650 compressed in linear dimensions by the same ratio along with the other elements in the scene, and appears to have reduced angular size, $\Phi_\alpha=\Phi/\alpha$, and be at a reduced angular bearing, $\phi_\alpha=\phi/\alpha$. Assuming that the object is recognizable with a known size, it appears perceptually at a greater range, $\rho_\alpha=\rho*\alpha$, and therefore to be located at the point $(x_\alpha, z_\alpha)$, where $x_\alpha=\rho_\alpha*\sin(\phi_\alpha)$, and $z_\alpha=\rho_\alpha*\cos(\phi_\alpha)$. Considering the same driving situation as above, the object in the compressed scene follows a trajectory defined by $[x_\alpha, z_\alpha=x_\alpha*\cot(\phi_\alpha)]$, with an angular size of $\Phi_\alpha=\sigma*\sin(\phi_\alpha)/x_\alpha$, where $\phi_\alpha=\alpha^{-1}*a\tan 2(x_O, z_O-u_O*t)$, as the vehicle moves forward alone the line $[x_O, z_O-u_O*t]$, in the unity-scene. Referring to the radial distance ρ and bearing φ in the unity-display, the apparent coordinates of the object's location reduce to $x_\alpha=\alpha*x_O*\sin(\phi/\alpha)/\sin(\phi)$, and $z_\alpha=\alpha*x_O*\cos(\phi/\alpha)/\sin(\phi)$; and the angular size becomes $\Phi_\alpha=\alpha^{-1}*(\sigma*\sin(\phi)/x_O)$, that is, the angular size and therefore the visual expansion rate and acceleration are the same as those for the unity-display divided by the compression ratio, α. Further, because of the decreased resolution associated with the scene compression, the sensitivity to the acceleration is decreased by the compression ratio, that is, the acceleration would have to be increased by a factor of α for the change in rate to be as apparent as with the unity-display. Finally, the apparent speed of the object is $u_a=-u_o*\text{sqrt}((\alpha^2-1)*\cos^2(\phi)+1)$, while the velocity component along the $x_\alpha$-axis is $u_{x_\alpha}=u_o*(\alpha*\sin(\phi/\alpha)*\cos(\phi)-\cos(\phi/\alpha)*\sin(\phi))$, and that along the $z_\alpha$-axis $u_{z_\alpha}=-u_o*(\alpha*\cos(\phi/\alpha)*\cos(\phi)+\sin(\phi/\alpha)*\sin(\phi))$; at great distance, the object appears to travel at a speed of $u_a=-u_o*\alpha$ toward the vehicle, but as approached the object appears to slow in speed and turn away, and the driver experiences a visual sensation of acceleration in this driving situation. For reference, the apparent deceleration is $u_a'=-u_o^3*(\alpha^2-1)*\cos(\phi)*\sin^3(\phi)/(x_o*u_a)$, a function that increases as the object is approached; the corresponding component decelerations are $u_{x_\alpha}'=-u_o^2*(\alpha^2-1)*\sin(\phi/\alpha)*\sin^3(\phi)/(\alpha*x_o)$, and $u_{z_\alpha}'=-u_o^2*(\alpha^2-1)*\cos(\phi/\alpha)*\sin^3(\phi)/(\alpha*x_o)$. Further, the apparent path curvature given by $\kappa=(u_{x_\alpha}*u_{z_\alpha}'-u_{x_\alpha}'*u_{z_\alpha}')/u_\alpha^3$, becomes $\kappa=(\alpha^2-1)*\sin^4(\phi)/(\alpha*x_o*((\alpha^2-1)*\cos^2(\phi)+1)^{3/2})$, an expression dependent only on position. Therefore, considering such a distant object being approached, the locus of object locations in the real world is distorted in the display world. The object appears more distant than it is, while the path of approach bend outwards and the apparent speed decreases as the object is closer to the vehicle. For this reason, as the object is approached it appears to move further laterally and slower on the display reaching the speed of the vehicle as the object is passed. Furthermore, since in a road turn the real scene center of rotation is a point on the $x_O$-axis ($z_O=0$) with the turning radius R determined by the steering wheel setting, the turning point in the display compressed scene is at $[\alpha*R*\sin(\text{pi}/2\alpha), \alpha*R*\cos(\text{pi}/2\alpha)]$, with an apparent turning radius of $\alpha*R$ at an angle $\phi=\text{pi}/2\alpha$ to the direction of travel; thus, the scene compression tends to straighten the turns. However, in the turn, the scene rotates at an angular velocity set by the kinematics of the unity-display, $\omega=u_o/R$. The display compression distorts the real world scene in space and speed.

A part of maintaining course situational awareness is the detection of road obstacles and evaluation for action, a cognitive process that depends upon angular size. As has been shown above, the apparent angular size is reduced by the display scene compression ratio, $\Phi_\alpha=\Phi/\alpha$. Following the Johnson criteria as a rough estimate of the angular sizes needed for this cognitive process using vision devices, the size to recognize an object must be at least 4 times that to detect and that to identify (for action) at least 6.4 times. Thus, as a rough estimate, recognition can best occurs at a distance closer than 25% of that for detection, and identification closer than 62.5% of that for recognition. The effect of display scene compression is to reduce the obstacle detection distance and therefore the time for recognition, evaluation, and corrective action.

Further tasks are road driving in traffic and following a lead vehicle in a convoy. The ability to navigate in traffic depends upon the evaluation and tracking of the surrounding vehicles as determined from their angular size and visual expansion rate. As has been shown above, both the object apparent angular size and therefore rate and acceleration of expansion are reduced by the display scene compression ratio. In convoy following, the driver maintains a set distance behind the lead vehicle as determined by the angular size and expansion rate; for a well trained driver this reduces to a single optical looming factor equal to the ratio of the angular size and the visual expansion rate ($\Gamma=\Phi/\Phi'$), which is a measure of the time to collision. However, while the motion of an object can be predictively tracked for a constant rate, the reduced resolution with scene compression reduces the sensitivity to acceleration by the compression ratio, and therefore reduces the sensitivity of the looming factor as a measure of time to collision accordingly, that is, $\Gamma_\alpha=\Gamma/\alpha$, since $\Gamma_\alpha=\Phi_\alpha/(\alpha*\Phi'_\alpha)$, and $\Phi_\alpha/\Phi'_\alpha=\Phi/\Phi'$. The effect of display scene compression is to induce a longer response lag for acceleration of the lead vehicle to be noticed, leaving less time for correction of distance. Furthermore, the correction response time, $\tau_o$, consisting of the time to evaluate the change, decide, and execute speed correction, is physiologically based independent of the scene compression, and the driver will tend to adjust the convoy separation distance, $\Delta d$, to accommodate the vehicle road speed, v, as perceived from the display, that is, $\Delta d >= v^* \tau_o$; the ratio of the separation distances for the unity-display and compressed display will naturally tend to be limited by the ratio of the apparent vehicle road speeds: $\Delta d_c/\Delta d_o = v_c/v_o$, where $v_o = u_o$, the unity-display road speed.

A further task is navigating the vehicle along a roadway; commonly this is done from the optical flow generated from the forward motion of the vehicle as tracked by peripheral vision, where the optical flow appears to originate from a point located a fixed distance in front of the vehicle as determined from scene resolution and the roadway terrain features. While objects in a display compressed scene appear to be nearing at an ever slowing rate as approached finally being passed at the vehicle speed only when reached, the flow origin is at a fixed distance in front of the vehicle and therefore appears to be moving at a speed somewhat faster than the vehicle. As is shown in the following further embodiment, the origin point distance is shortened by the display scene compression.

Mathematics for Perceived Road Speed

The effect of the display scene compression on the perceived speed is due to the reduction in resolution distance; the origin point distance is shortened by the display scene compression. This may be separated into a direct effect of reduced scene resolution as seen in the camera vertical view, and an indirect effect during road turns as seen in the camera horizontal view.

Reduced Scene Resolution

Figure 6:
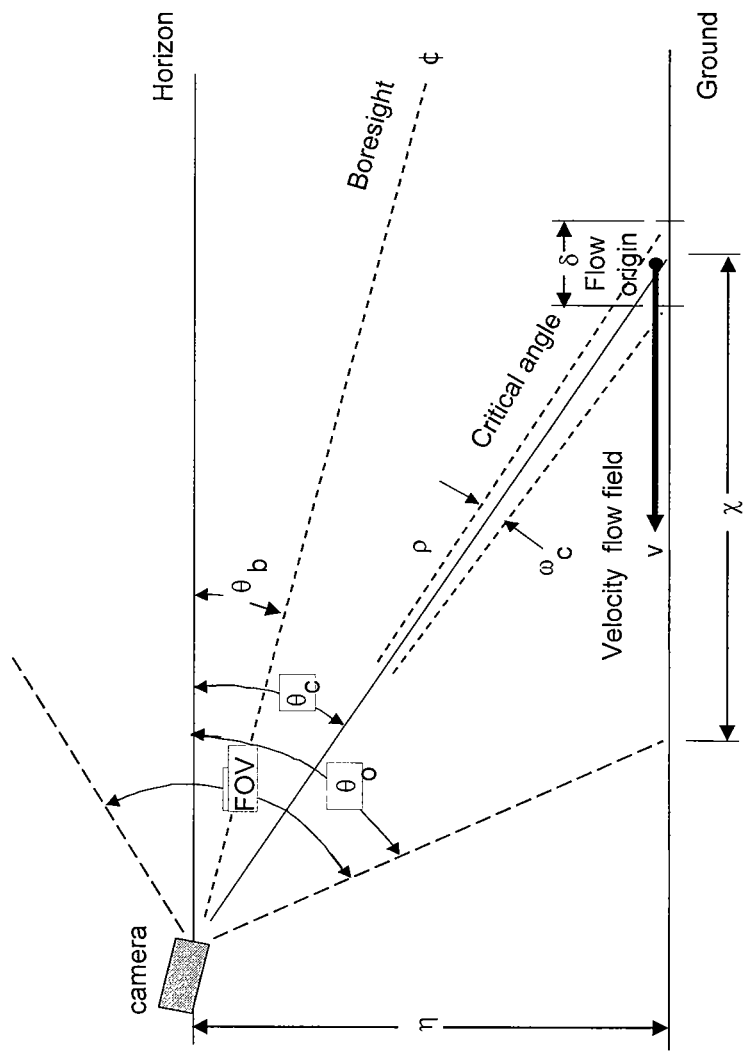
FIG. 6 illustrates a side-view of a camera geometry for indirect vision driving.

FIG. 6 depicts a side view of the camera geometry for indirect vision driving, that is, driving a vehicle from a video display of a camera return where the camera is mounted on the vehicle to show the driving road scene. Here, the camera is positioned on the vehicle a height, $\eta$, above the ground level, and with a vertical field-of view, FOV, bore sighted at an angle, $\theta_b$, to the horizon. In this figure, the bottom edge of the camera view is at an angle, $\theta_o = \theta_b + \frac{1}{2} * FOV$, from the horizon. Here, the velocity flow field for the roadway texture appears to originate at a point that is a distance, $\chi$, from this edge and subtends an angle, $\theta_c$. Letting the texture features that define the velocity flow field be fixed squares (of linear dimension, $\delta$), the apparent solid angular area ($\omega$) of a feature as seen at an angle ($\theta$), is the ratio of the projected area divided by the square of the viewing distance (p) from the camera to the feature, $\omega = (\delta/p)^2 * \sin(\theta)$. Since the camera on the vehicle is at a height ($\eta$) above the ground, the apparent angular area is given by, $\omega = (\delta/\eta)^2 * \sin^3(\theta)$, with the use of the sinusoidal relation between the camera height ($\eta$), viewing distance (p), and viewing angle ($\theta$), $p = \eta/\sin(\theta)$. To be seen on the display of the camera return, the apparent angular area of the feature must exceed a critical size ($\omega_c$) determined by a psychophysical threshold value for perception ($\overline{\omega}$), here normalized for an unity display, such that, $\omega_c = \overline{\omega}$; the viewing angle ($\theta_c$) corresponding to the critical size is given by, $$\overline{\omega} = (\delta/\eta)^2 * \sin^3(\theta_c) \quad (1)$$

since $\theta_c = \theta$, when $\omega = \omega_c$. The critical size determines the origin of the velocity flow field as seen on the display since all flowing terrain features appear to originate from this point and then pass to the bottom of the display screen and out of the camera's FOV.

In turn, the rotational speed, w, of this critical feature is given by the value of the velocity component normal to the camera viewing distance, p, divided by this distance $$w = (v/p) * \sin(\theta_c) \quad (2)$$

where v is the forward speed of the vehicle. Making use of the sinusoidal relation between the camera height ($\eta$), viewing distance (p), and viewing angle ($\theta$), the rotational speed is $$w = (v/\eta) * \sin^2(\theta_c) \quad (3)$$

With reduced scene resolution due to display scene compression, the origin of the optic flow as seen on the display appears closer to the vehicle and at a greater angle to the horizon; the terrain flow rate is increased because of the increased camera-viewing angle. In this analysis, the display scene compression is assumed so slight that the critical terrain features providing the optic flow on the display remain the same as in direct view. Because of the reduced resolution, the display image of the original flow source of linear dimension, $\delta$, seen at an angle ($\theta_c$) to the camera, subtends an apparent solid angular area, $\alpha^{-2} * \omega_c$, where $\alpha$ is a measure of the compressed scene resolution. Since this angular area is now below perceptual threshold, the feature can no longer be discernible at that angle and the flow origin point instead appears closer to the vehicle and at a steeper angle. The origin point that is now seen on the display occurs at the point, $\chi'$, which is closer to the ground intercept of the bottom viewing edge of the camera. Again, letting the critical feature be fixed squares of linear dimension, $\delta$, the apparent solid angular area ($\omega'$) now seen at the angle ($\theta_c'$) by the camera, is the ratio of the projected area divided by the square of the viewing distance (p') from the camera to the feature, $\omega_c' = (\delta/p')^2 * \sin(\theta_c')$; here primed variables denote different display configurations. Making use of the sinusoidal relation between the viewing distance (p), camera height ($\eta$), and viewing angle ($\theta$), the viewing angular area of the critical feature is now $$\omega_c' = (\delta/\eta)^2 * \sin^3(\theta_c'). \quad (4)$$

For the display image of this feature to be at the psychophysical threshold value for perception ($\overline{\omega}$), the camera viewing area must be $\alpha^2$ times that of the original feature, $\omega_c' = \alpha^2 * \omega_c$. That is, $(\delta/\eta)^2 * \sin^3(\theta_c') = \alpha^2 * (\delta/\eta)^2 * \sin^3(\theta_c)$, resulting in the following relation between the camera viewing angles for the unity-display and the compressed scene display:

$$\sin(\theta_c') = \alpha^{2/3} * \sin(\theta_c). \quad (5)$$

Given the flow origin distance for the unity-display, the distance for the reduced resolution may be computed from equation (5) by noting that $\eta = \rho * \sin \theta$, therefore $\rho' = \alpha^{-2/3} * \rho$, that is, the reduced resolution distance is equal to the original distance divided by the compression ratio raised to the ⅔ power.

Similarly, the rotational velocity of the feature as seen from the camera is given by, $w' = (v/\eta) * \sin^2(\theta_c')$, where v is the forward velocity of the vehicle. However, the rotational velocity as perceived on the display is $w'' = \alpha^{-1} * w'$, because of the display scene compression; this is the rotational velocity seen on the retina of the driver.

Finally, for the driver to perceive the rotational velocity to be the same for both the unity display and the reduced resolution display, $w'' = \alpha^{-1} * (v/\eta) * \alpha^{4/3} * \sin^2(\theta_c) = (v''/\eta) * \sin^2(\theta_c)$, a relation between vehicle velocity, v, and the velocity, v'', that is perceived to be the same on the compressed display, resulting in:

$$v = v'' * \alpha^{-1/3}, \quad (6)$$

that is, the perceived velocity is equal to the vehicle velocity times the compression ratio raised to the ⅓ power.

As shall be shown, the effect of road turns on perceived road speed follows directly from the roadway geometry and indirectly from the reduction on resolution distance caused by the display scene compression. In the embodiment following, the effect of road turns on perceived speed will be derived first for the unity display case from the corresponding kinematics, and these results then adjusted for the effects of the display scene compression on the origin-point resolution distance.

Road Turn with Unlimited Field-of View

Figure 7:
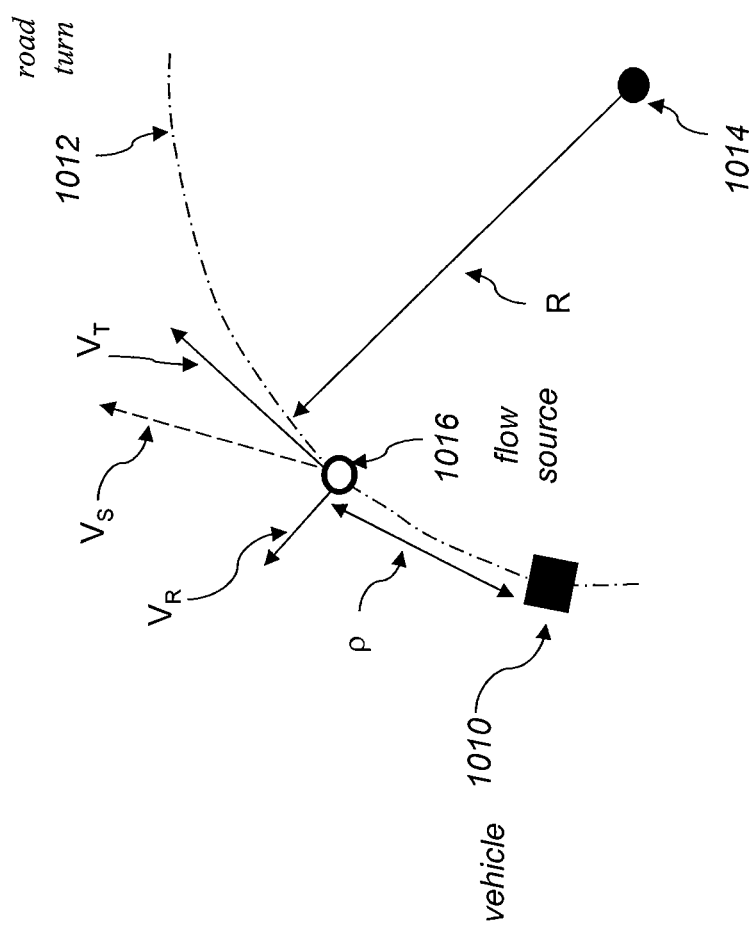
FIG. 7 illustrates road turn geometry without a field of view limitation.

In a road turn, the driver tends to adjust his speed so that the combination of the forward motion and rotational turning velocities appears the same as the straight course speed; in this way, the combined retinal projection of the speed is the same for the turn as for the straight course. Consider now a vehicle entering a turn with a velocity, $V_S$, as determined from the scene flow velocity as derived above. As shown in FIG. 7, let the vehicle 1010 have a velocity, $V_T$, along the tangential of a turn 1012, where the turn has a radius of curvature, R, with respect to a point 1014. The rotational velocity of the vehicle, w, is then $w=V_T/R$ from the kinematics. Let the driver see the scene flow origin in the display at the camera viewing distance, $\rho$, as originally shown in FIG. 6 above. Then the sideward speed of the flow source origin, $V_w$, is the viewing distance times the rotational speed, $V_w=\rho*V_T/R$. Now, the driver sees the flow source traveling at a velocity:

$$V_S=\text{sqrt}(V_T^2+(\rho*V_T/R)^2), \quad (7)$$

since the tangential and rotational speeds are orthogonal at any point along the turn. Assuming that the driver maintains the same scene flow source speed, $V_S$, in the turn that he did in the straight course, then the vehicle speed is that tangentially along the turn:

$$V_T=V_S/\text{sqrt}(1+(\rho/R)^2). \quad (8)$$

Here, the scene flow origin distance is fixed by the scene compression ratio for a constant lighting and roadway terrain condition, and we see that even though when the driver maintains a constant scene flow velocity, the vehicle speed will decrease with the curvature of radius. That is, the vehicle will be driven at the scene flow velocity for gradual turns (with nearly infinite radius of curvature), but will be driven much slower for tighter turns when the radius is much smaller. Considering now the viewing distance to the flow field source:

$\rho_c=\eta/\sin(\theta_C)$, equation (8) becomes, $$V_T=V_S/\text{sqrt}(1+(\eta/(R*\sin\theta_C))^2), \quad (9)$$

in terms of the scene flow velocity, camera height, radius of curvature, and scene optic flow origin angle.

Note that the road turn speed may be limited by other factors. For example, the turn speed may be limited by the acceleration force generated in the turn since the human driver is sensitive to rotational accelerations above about 0.4 g, where g is the gravitational acceleration (at sea level, $g=9.81$ m/s$^2$). That is, the driver will tend to limit the rotational acceleration to $V_T^2/R<0.4$ g, and therefore the tangential speed to $V_T<\text{sqrt}(0.4\ g*R)$. This implies that the straight course speed for turns maintaining the optic flow is limited to, $Vs<\text{sqrt}(0.4\ g*R*(1+(\eta/R*\sin\theta_C)^2))$, if rotational accelerations are not to be experienced; this follows from equation (9). Another limiting factor is the amount of training and experience that the driver has had with the vehicle dynamics. In the following section, we derive the effects of a limited field-of view on the road turn speed.

Entering or Leaving a Turn

Figure 8:
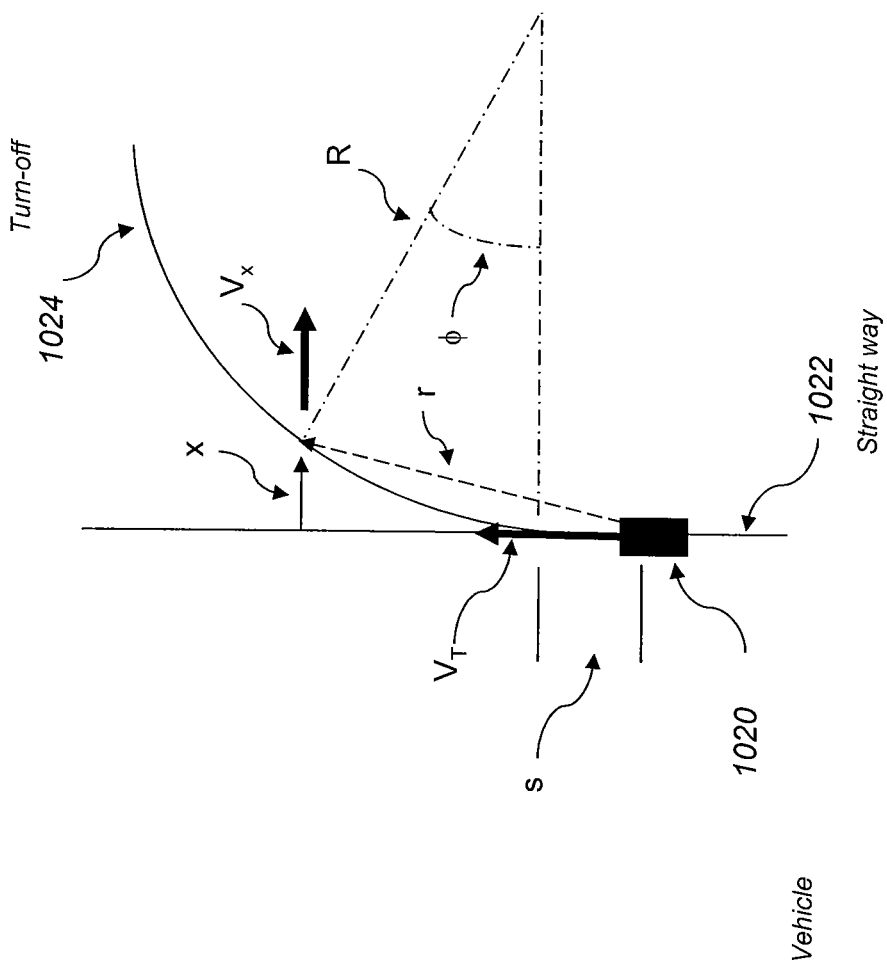
FIG. 8 illustrates the road turn geometry of FIG. 7 upon entry into the turn.

FIG. 8 considers the act of approaching a turnoff, where the driver is on a straightaway 1022 with his vision tracking the road turn 1024 he is about to enter. Here, the viewing distance $\rho$ is assumed to be much smaller than the radius of curvature, R, of the road turn 1024, i.e., $R\gg\rho$. In this case, from the geometry of FIG. 8, the angular offset to the viewed point is: $\phi\rightarrow\sin(\phi)=(\rho-\sigma)/R$, where $\sigma$ is the distance to the turn-off entrance from the viewing point in the vehicle. The angular time rate of change is given by: $\phi'=-\delta'/R$, or $\phi'=-V_T/R$, in terms of the straight road speed, $V_T$. Similarly, the distance of the road turn fixation point from the straight-way projection is given by: $\xi=R*(1-\cos(\phi))$, and the corresponding rate of time change by: $V_\xi=R*\sin(\phi)*\phi'$, which reduces to: $V_\xi=(\rho-\sigma)*V_T/R$, by combining the above expressions. Assuming that the driver maintains a consistent visual flow, the square of the straightaway speed is equal to the sum of the squares of the speeds along the straight-way and the perpendicular: $V_S^2=V_T^2+((\rho-\sigma)*V_T/R)^2$. Solving this expression leads to equation (9a) for the turn-approach speed:

$$V_T=V_S/\text{sqrt}(1+((\rho-\sigma)/R)^2), \quad (9a)$$

A similar equation applies to the approach speed for turning onto the straightway, where $\sigma$ is the viewing distance to the straightway from the viewing point on the turn.

Road Turn with Limited Field-of View

If the turn is tight enough that the driver cannot see the optic flow origin, there is a limited field-of-view, since the flow source lies beyond the view for the turn being executed. Accordingly, equations (9) and (9a) noted above are no longer applicable. The driver sees the scene optic flow pattern flowing in from the road turn at the side of the display. The visible flow source is now closer to the vehicle than the origin actually would be on the display for the unlimited field of view case and the corresponding retinal projection appears faster causing the driver to slow down. Again, the driver tends to adjust his speed so that the combination of the forward motion and rotational turning velocities appears the same as the straight course speed.

We now derive a predicted speed for the limited field-of view road turn. We do this by first deriving the camera-viewing angle and distance for the flow source in terms of the limited field-of view and the road turn radius of curvature. The rotational velocity on the retina in then derived from the viewing angle assuming that the driver is fixated on the flow source, and this velocity is compared to what would be seen at the flow origin.

Figure 9:
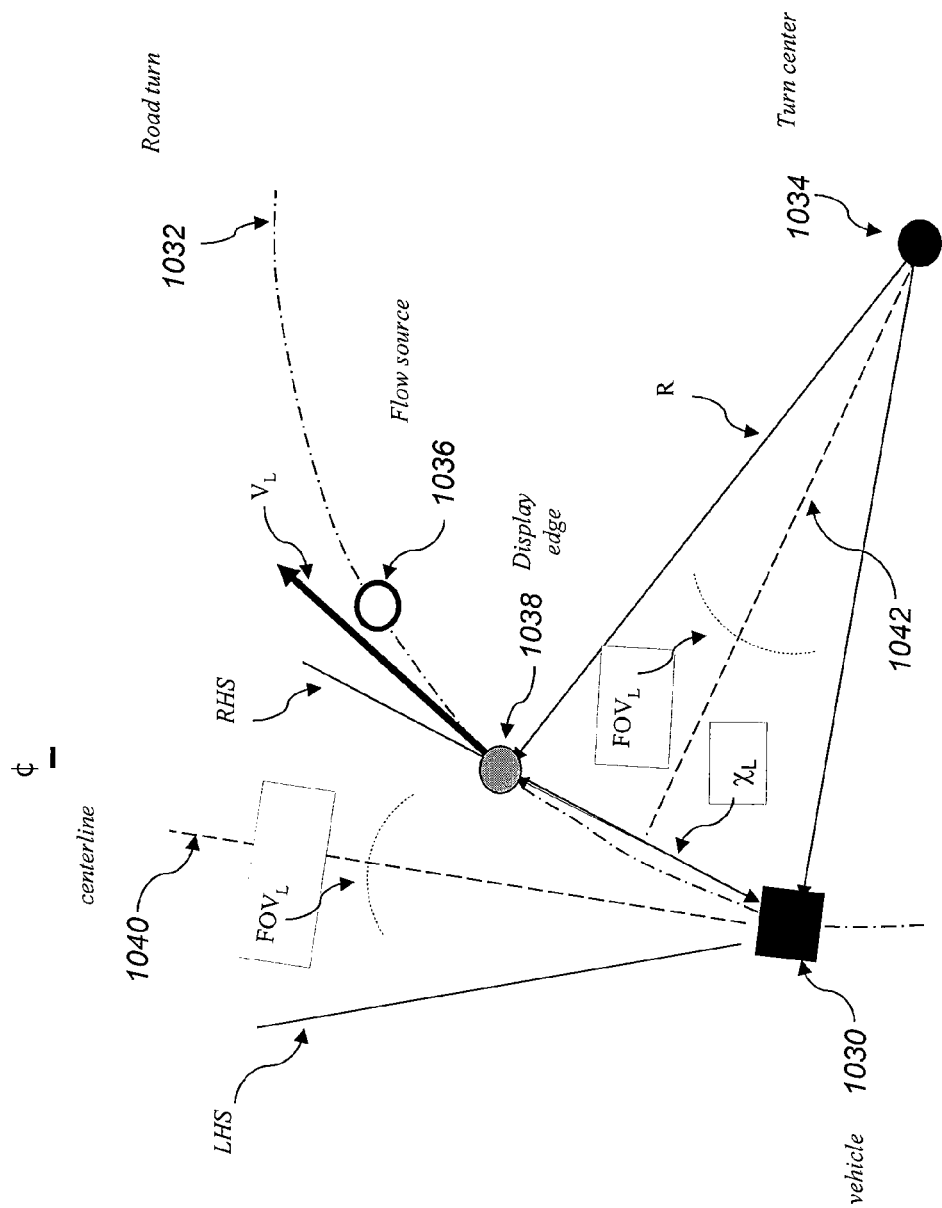
FIG. 9 illustrates road turn geometry with a field of view limitation.

FIG. 9 shows the geometry for the case where the flow origin 1036 is outside the camera's limited field-of view, $FOV_L$. Here, the camera $FOV_L$ is less than the critical field-of view needed to see the flow origin, $FOV_L<FOV_C$. In FIG. 9 the length, $\chi_L$, from the position of the camera on the vehicle 1030 to the point 1038 where display edge intersects the road edge (where the road 1032 leaves the display scene), is the chord of the sector formed by the vehicle 1030 and the intersect point 1038 with the turn center 1034. Here the sector angle formed by the radii from the turn center 1034 equals the display field-of view. This can be seen by considering the angles formed from the bisect 1042 of the chord from the center such that the angle "a" is a right angle. This is true also of the angle "c" formed from the center radius to the vehicle and the display centerline 1040, which is tangential to the road at this point. The angular bisect "d" of the sector is the right angle complement of the angle "b" formed by the chord and the perpendicular to the centerline from the display edge point. However, this complement is ½ of the field-of view, and therefore the sector subtends the display field-of view, $FOV_L$. For this reason, the length, $\chi_L$, is given by the geometrical relation between the chord of the circular sector with radius (R) and the enclosed central angle:

$$\chi_L=2R*\sin(FOV_L/2). \quad (10)$$

The camera viewing angle, $\theta_L$, for the source point at the edge of the road turn in the display is given by combining this equation with the equation for the distance as a function of the camera height ($\eta$), and viewing angle ($\theta$): $\chi_L = \eta/\tan(\theta_L)$, resulting in:

$$\theta_L = \tan^{-1}(\eta/(2R*\sin(FOV_L/2))). \quad (11)$$

Making use of the sinusoidal relation between the camera height ($\eta$), the viewing distance ($\rho$), and viewing angle ($\theta$), the viewing distance is $\rho_L = \eta/\sin(\theta_L)$.

Now, the rotational velocity of the source point seen at the retina is given in terms of the camera viewing distance, $\rho_L$, the vehicle velocity, $V_L$, and the camera viewing angle, $\theta_L$, by $w_L = (V_L/\rho_L)*\sin(\theta_L)$, per equation (2). Making use of the sinusoidal relation between the camera height ($\eta$), viewing distance ($\rho$), and viewing angle ($\theta$), the rotational velocity is per equation (3)—

$$w_L = (V_L/\eta)*\sin^2(\theta_L). \quad (12)$$

Similarly, the rotational velocity of the source origin point that would be seen with an unlimited field-of view is given in terms of the unlimited scene velocity ($V_S$), and the camera critical viewing angle for the flow origin ($\theta_C$), by equation (3), as $w_C = (V_S/\eta)*\sin^2(\theta_C)$. Arguing that the driver tends to maintain the same apparent rotational speed in the limiting view case as in the unlimited, such that, $w_L = w_C$, results in a relation between the road turn speeds—

$$V_L = V_S*\sin^2(\theta_C)/\sin^2(\theta_L), \quad (13)$$

where $V_S$ is the vehicle velocity for the unlimited field-of view case.

The viewing angle for the flow origin is related to the critical field-of view as follows. For this view, the flow origin occurs at a point on the turn that appears at the display edge since the turn is tight enough so that the driver can just see the origin point for the camera field-of view. At this field-of view, $FOV_C$, critical for the turn radius of curvature, the driver retains an unlimited view of the flow origin; any narrower field-of view would provide a limiting view of the flow field. Following equation (11), this critical field-of view is given by—

$$FOV_C = 2*\sin^{-1}(\eta/(2R*\tan\theta_C)), \quad (14)$$

in terms of the radius of curvature (R), and the camera critical viewing angle for the flow origin ($\theta_C$).

Assuming that the flow sources in the two cases are far from the vehicle and therefore that the camera view angles for the flow sources are small in values, the sinusoidal functions may be approximated by the tangential functions. Again, applying this assumption to equation (11) results in—

$$\sin(\theta_C)/\sin(\theta_L) = \sin(FOV_L/2)/\sin(FOV_C/2). \quad (15)$$

In turn, this may be used to reduce equation (13) to the following relation between the road turn speeds:

$$V_L = V_S*\sin^2(FOV_L/2)/\sin^2(FOV_C/2). \quad (16)$$

applicable when the camera field-of view is less than the critical field-of view for the road turn, $FOV_L < FOV_C$, where $FOV_C$ is given by equation (14), and $V_T$ by equation (9). Equation (15) predicts that the velocity, $V_L$, for a limiting field-of view $FOV_L$ is less than that for the unlimited field-of view.

Following the argument given above for road turns, let the vehicle enter the turn with a velocity, $V_L$, as determined from the scene flow velocity. The vehicle has a velocity, $V_T$, along the tangential of the turn where the turn has a radius of curvature, R. Again, the rotational velocity of the vehicle, w, is then $w = V_T/R$ from the kinematics. The driver now sees the scene flow origin in the display at the camera viewing distance, $\rho_L$, since the flow source is limited by the display. Then the sideward speed of the flow source, $V_w$, is the viewing distance times the rotational speed, $V_w = \rho_L*V_T/R$. Now, the driver sees the traveling at a velocity:

$$V_L = \text{sqrt}(V_T^2 + (\rho_L*V_T/R)^2), \quad (17)$$

since the tangential and rotational speeds are orthogonal at any point along the turn. Assuming that the driver maintains the same scene flow source speed, $V_S$, in the turn that he did in the straight course, then the vehicle speed is that tangentially along the turn:

$$V_T V_L/\text{sqrt}(1+(\rho_L/R)^2). \quad (18)$$

This equation is identical to equation (9) except that the viewing distance is that for the limited field-of view.

Combining equation (18) with equation (16), and using $\rho_L = \eta/\sin(\theta_L)$, we have for the vehicle speed:

$$V_T = V_S*\sin^2(FOV_L/2)/(\text{sqrt}(1+(\eta/R*\sin\theta_L)^2)*\sin^2(FOV_C/2)), \quad (19)$$

where $V_S$ is the straight road speed and the critical field-of view $FOV_C$ is a function of the radius of curvature according to equation (14).

Having derived the effect of road turn on the perceived speed for the unity-display, the results are readily adjusted to those for the display scene compression by substituting $\rho' = \alpha^{-2/3}*\rho$, for the resolution distance to the origin of optical flow in the original equations.

EXPERIMENTAL EVIDENCE

Evidence is now provided for the effects of display scene compression upon object awareness and driving tasks. The evidence is mainly drawn from a series of field experiments.
Situational Awareness The display scene compression affects the ability to maintain situational awareness while driving. A field study using flat panel displays and vehicle-mounted fixed forward looking camera arrays (Smyth C C, Gombash J W, and P M Burcham (2001). *Indirect vision driving with fixed flat panel displays for near-unity, wide, and extended fields of camera view*. ARL-TR-2511, Army Research Laboratory, Aberdeen Proving Ground, MD 21005, hereinafter "Smyth, Gombash, & Burcham, 2001"), provides anecdotal evidences that while there are advantages in using panoramic displays for situational awareness and navigation, there are disadvantages during driving due to scene distortions, at least as determined by participants' comments. The study compared direct vision driving to indirect vision driving with flat-panel displays for different camera fields of view (FOV): near-unity, wide, and extended. The displays were mounted in the cab and provided a 110° panoramic view of the driving scene as seen from a forward viewing monocular camera array that was mounted on the front roof of the vehicle. The FOV of the camera array was 150° for the near-unity view, 205° for the wide view, and 257° for the extended view, and the scene imagery was accordingly seen as compressed on the fixed-sized displays. In regard to camera FOV, participants reported an advantage for navigating with the expanded views. While the near unity FOV was more comfortable and easier to drive with because of the more realistic image, more of the course could be seen with the wide and extended FOV and the wider views helped in navigating the course. Although the scene objects (i.e., barrel course markers) were smaller with the wide FOV, the relative size was the same and they were able to drive. With the extended FOV, they saw more of the scene on the central display and the side cameras were not as helpful. However, the expanded views induced scene distortions that were detrimental for driving. With the wide FOV, objects appeared to move faster on the displays and a rotation effect occurred at the far corners of the side displays. With the extended FOV, the bottom half of the displays did not update as fast as the vehicle and the turn rate on the side displays was different from that felt in the vehicle; since objects appeared smaller they seemed further away and distances were misjudged. One participant reported feeling a sliding feeling in a turn and an accompanying motion sickness with a headache and stomach nausea. Thus, there is an advantage to tailoring the camera FOV and display compression to fit the driving situation by balancing scene resolution with situational awareness as needed for the driving task.

Obstacle Detection

A demonstration of the effects of display scene compression upon detection follows from the results of a field study (Smyth C C (2002). *Detecting targets from a Moving Vehicle with a Head-Mounted Display and Sound Localization*. ARL-TR-2703, Army Research Laboratory, Aberdeen Proving Ground, MD 21005., hereinafter "Smyth, 2002 [ARL-TR-2703]"), in which eight participants detected and identified pop-up targets on an outdoor firing range from a stationary and a moving HMMWV (high mobility, multipurpose, wheeled vehicle) while using a head-mounted display (HMD), with and without sound localization, and open direct view as a control. A head-slaved camera mounted on top of the vehicle provided the image to the HMD via a pan and tilt mechanism. With sound localization provided by localized auditory cueing, the computer controlled audio tones appeared to originate from the location of the target. In this study, the indirect vision system was limited by the resolution and field-of-view (FOV) of the HMD used. At 30-degrees, the horizontal FOV of the HMD was 61% of the 48.8-degree FOV of the camera. Further, the HMD with 528×340 rasters has 68.8% of the horizontal angular resolution of the camera with 768×494 rasters. For these reasons, targets on the HMD appear 0.42 smaller in linear size than they would with a HMD optically matched to the camera, or an equivalent compression ratio of $\alpha=2.38$. In general, the results of the study are that more targets were detected with direct viewing than with the HMD and from the stationary position than from the moving vehicle. Although slightly more targets were detected with direct viewing from the stationary vehicle without cueing, sound localization improved target detection in the other treatments. Of interest to this disclosure is target detection with cueing since this removes the effects of search FOV. For the stationary and moving treatments with cueing, 2.10 times more targets were detected with direct view than with the HMD (stationary: 1.46; moving: 2.74), and the targets were detected 2.18 times faster on the average with direct view than with the HMD (stationary: 2.12; moving: 2.25), results roughly close to the HMD compression ratio.

Convoy Following

The effect of display scene compression upon convoy following is demonstrated by the results of a field study (Smyth C C, Gaare D, Gombash J W, Stachowiak C C (2002). *Driving Performance od the Vetronics Technology Test-bed (VTT) Vehicle*. ARL-TR-2914, Army Research Laboratory, Aberdeen Proving Ground, MD 21005. Data presented at June 2002 NDIA Intelligent Vehicle Systems Symposium, hereinafter "Smyth, Gaare, Gombash, & Stachowiak, 2002"), on vehicle mobility in which seven participants who drove a modified M2 Bradley Fighting Vehicle (BFV) on a 5-mile rough terrain course along a specified route, in a convoy, and parked the vehicle. The vehicle was operated from a crew station located within the hull of the vehicle with an indirect vision system and a hand yoke for steering and foot pedal brake and accelerator. Attached to the roof of the vehicle was a forward-looking camera array consisting of five monocular CCD color NTSC cameras that together covered roughly a 183-degree horizontal field of view (HFOV). Three of the cameras were grouped together in a front camera array and one camera was placed on each side of the vehicle. The central camera array has a 5.5-degree downward tilt. The camera outputs were seen on fixed flat-panel video displays mounted across the top of the driving station. While the 13-inch diagonal AMlCD flat panel displays in the vehicle were 1280 by 1024 SXGA pixel resolution, they scaled the images to the 460 by 400 TV resolution of the NTSC return from the PULNIX TMC-73M cameras (768 by 494 pixel resolution), resulting in a compression ratio of 2.06. This was verified by a visual acuity test using a Snelling equivalent vision chart placed in front of the vehicle in which the acuity as seen through the cameras was on average 20/60 for the participants with an average natural vision acuity of 20/30, that is, the median natural acuity was about twice that as seen through the camera system. While the tests were limited to collecting descriptive statistics for performance with the camera system, the results for the convoy following may be compared to those for the convey lead-vehicle as a control. In this test, the test vehicle driver was instructed to maintain a 50-meter separation distance while the lead vehicle slowly sped up and then slowed down in a scheduled manner about a baseline speed (15 mph), following a brief period in which the participant was allowed to familiar himself with the apparent angular size of the lead vehicle as seen through the camera at the 50-meter distance. The descriptive statistics for this test show that the participants maintained an average 67.5 meter separation with a 29.37 meter range ($25^{th}$-to-$75^{th}$) about the medium. The coefficient of variance as defined by the ratio of range to medium is taken as a measure of the decrease in sensitivity to acceleration; this term equals 0.435, which is close to the inverse of the compression ratio (0.485). The resulting decrease in sensitivity apparently caused the participants to increase the convoy following-distance to maintain response time with the ratio of the medium distance to the standard at 1.349, roughly the ratio of the actual speed to the predicted perceived (2.06^−0.333=1.272), a result in keeping with the analysis.

Perceived Road Speed

The validity of the perceived road speed analysis is demonstrated for several data sets from field studies reported in the literature. These include a study on road turn speed for direct vision sedan highway driving (Emmerson J., "A Note on Speed-Road Curvature Relationships," *Traffic Engineering and Control*, November 1970. Cited in Fitzpatrick K & W H Schneider IV (2004). *Turn Speeds and Crashes Within Right-Turn Lanes*. FHWA/TX-05/0-4365-4, Texas Transportation Institute, The Texas A&M University System: College Station, Tex. 77843-3135, Pg. 24, hereinafter "Emmerson, 1970"), and two studies on both direct and indirect vision driving with military vehicles with one study using a helmet mounted display (HMD) with head slaved camera (Smyth C C & R G Whittaker (1998). *Indirect Vision Driving Study, $21^{st}$ Army Science Conference*, June 15-17, Norfolk, Va., hereinafter "Smyth & Whitaker, 1998"), and the other study using flat panel displays and vehicle-mounted fixed forward looking camera arrays (Smyth, Gombash, & Burcham, 2001). Three different camera lens settings were used for driving with the flat panel displays, and the test data along with that for the HMD, are used to verify the reduced resolution (i.e., display compression) analysis. The HMD study compared direct vision driving to indirect vision driving, and with course location determined from GPS recordings for four study participants, the direct vision-driving database for that study along with that for the highway driving is used to verify the unlimited FOV road turn speed analysis. Finally, the HMD study had a limited field-of view on some course turns and this database is used to verify the analysis for limited FOV road turn speeds.

Effects of Reduced Resolution

The validity of equation (9) for the effects of display compression on road speed follows from the two experiments on indirect vision driving using flat panel and helmet mounted displays (HMD). In these studies, eight participants negotiating a cross-country road course in a military vehicle with the different viewing systems in a counterbalanced manner, and the data was used for a regression analysis of the road speed as a function of the compression ratio. The 1996 study of Smyth and Whitaker (1998) compared direct vision driving to that for indirect vision using a HMD with a head-slaved camera. As a follow-up, the 1999 study of Smyth, Gombash, and Burcham (2001), compared direct vision driving to indirect vision driving with flat-panel displays for different fields of view (FOV) of the cameras: near-unity, wide, and extended. The displays were mounted in the cab and provided a 110° panoramic view as seen from a forward viewing monocular camera array that was mounted on the front roof of the vehicle. The FOV of the camera array was 150° for the near-unity view, 205° for the wide view, and 257° for the extended view, and the scene imagery was accordingly seen on the fixed-sized displays as compressed. The HMD in the 1996 study subtended a 30° FOV with a head-mounted display of reduced resolution used in place of fixed display panels. The participants in this study tended to keep their heads fixed facing forward without head movements while driving. Although the field studies were similar, the military vehicle in the 1996 HMD study was a heavier HMMWV with less road vibrations and the participants drove slightly faster in the direct vision mode.

Flat Panel Study (1999): Equation (6) derived above is in the form of a product of the course speed divided by the display compression ratio ($\alpha$) raised to a ⅓ power. The study road course times are statistically significant by the camera FOV treatments, and the parameters of the equation are computed from this data with a linear regression analysis on the logarithmic values of the road speed and compression ratio (adjusted-R square=0.328, p<0.0004, F=16.136, df=1, dfe=30), resulting in—

$$\text{speed(km/hr)}=v_o{}^*\alpha^{-0.332}, \quad (20)$$

where $v_o$=22.31 km/hr. a value within 2.15% of the average direct vision driving speed of 22.8 km/hr. for the experiment. The regression equation predicts that the average driving speed is greatest for the direct vision and decreases with increasing display compression according to the ⅓ power law in agreement with the analysis.

Figure 10:
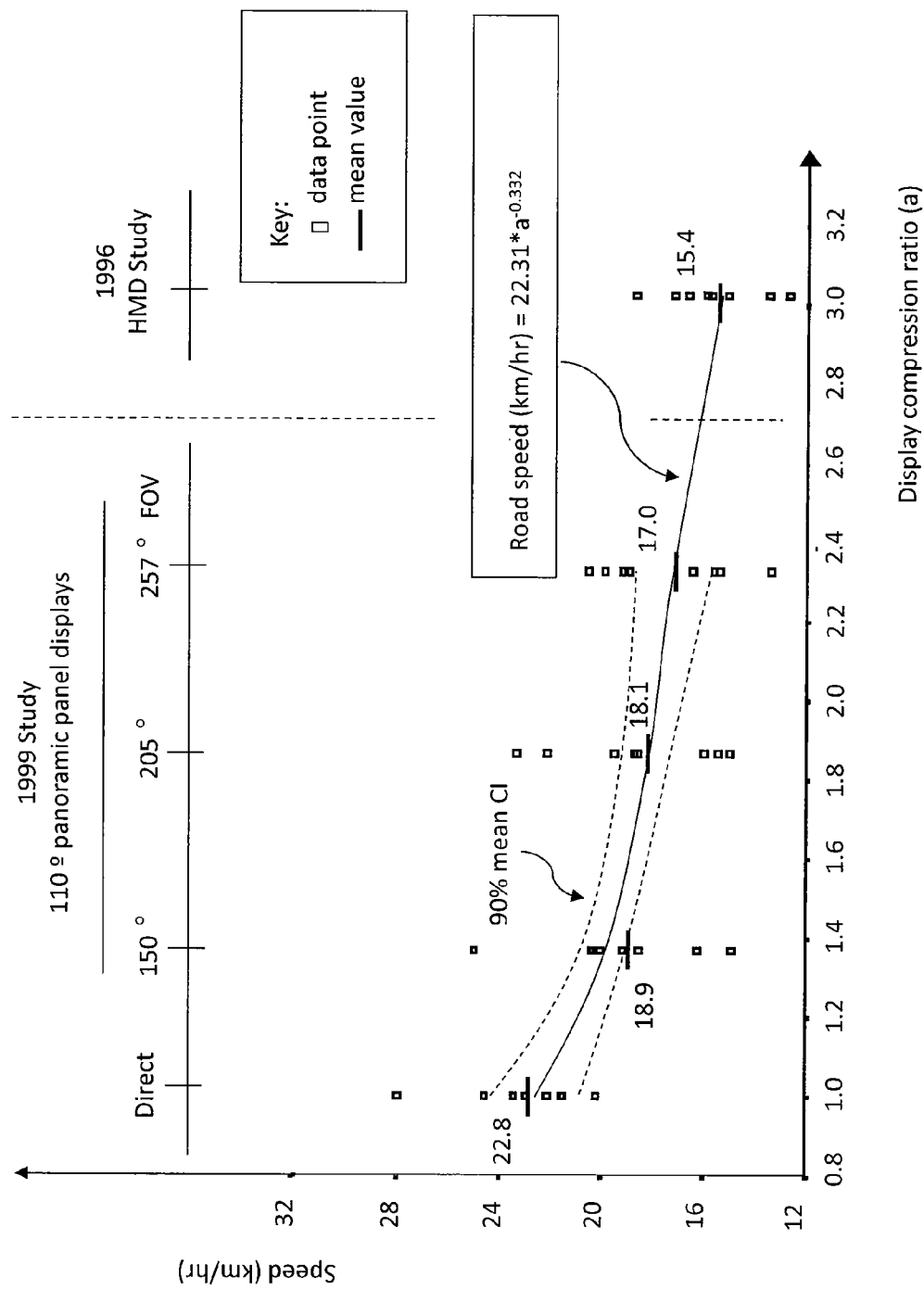
FIG. 10 is a plot of predicted speed as a function of display compression ratio for a field study.

FIG. 10 is a plot of the predicted speed as a function of the display compression ratio; here the compression ratio is $\alpha$=1.36 for the 150° near unity FOV, $\alpha$=1.86 for the 205° wide view FOV, and $\alpha$=2.34 for the 257° extended FOV. The figure shows a scatter plot for the experimental data, the mean data values, and the estimated regression line with 90% confidence intervals (CI) for the sample means. For the indirect vision, the predicted 18.16 km/hr is within 0.06% of that for the wide FOV, and 17.11 km/hr is within 0.18% of that for the extended FOV. While the predicted value of 20.13 km/hr for the near-unity FOV is within 6.39% of the mean value, the mean value is just outside the 90% CI. However, while the driver could see the vehicle hood with the other treatments, this was not true with the near-unity FOV since the hood was just below the camera's narrower view. Without the hood as a guide, the drivers presumably had to be more careful in their control of the vehicle's approach to the markers, and this may account for the slower than predicted speed.

HMD Study (1996): The point labeled "HMD study" was not part of the regression analysis and refers to the separate experiment conducted in 1996 using a helmet-mounted display with head-slaved camera video returns (Smyth & Whitaker, 1998). Of interest is that the equation derived above for the 1999 experiment accurately predicts the mean speed for the 1996 study. In that study conducted on the same site, but with a different model HMMWV, training regime, and course layout, the participants drove at an average speed of 14.26 mph (22.95 km/hr) with direct viewing and 9.58 mph (15.41 km/hr) with the HMD. To reduce the need for head movement with the HMD, the participants were taught a similar driving strategy of first aligning the vehicle with a barrel pair during the approach and then accelerating through. With the narrow FOV of the HMD, the participants could just see both sides of the front hood at the same time by looking directly forward, but not both barrels of a marker pair as he passed them. Note that a participant turning his head to navigate about a barrel as he entered a turn would tend to lose track of the other one in the pair of markers. At a 30° FOV, the HMD compresses the 56° FOV of the vehicle mounted camera by a factor of 1.866; further, the HMD with 180,000 rasters had 58.59% of the video resolution of the fixed panel displays (640×480 rasters) used in the 1999 study. For these reasons, the HMD has a 3.184 effective display compression ratio, which converts to a predicted course speed of 9.428 mph (15.17 km/hr) using the above course speed equation. As shown in FIG. 6, this predicted value is within 1.56% of the average speed (15.41 km/hr), measured in the HMD study. Further, the direct vision average speeds are practically identical for the two studies (22.95 km/hr for the HMD versus 22.8 km/hr for the flat panels, within 0.46%).

In summary, the two studies demonstrate the validity of the analysis for the effect of reduced resolution caused by scene imagery compression upon perceived road speed.

Road Turns for Unlimited Field-of-View

Experimental evidence for the validity of equation (9) for road turn speed with unlimited view of the optic flow field origin, may be found from a study on the relation of road curvature on vehicle speed for direct vision sedan highway driving (Emmerson, 1970), and from the direct vision database portion of the 1996 HMD field study of Smyth and Whitaker, 1998. The analysis is based on equation (8) in the following form:

$$V_T=V_s/\text{sqrt}(1+(\rho_C/R)^2), \quad 21)$$

expressed in terms of the camera viewing distance to the flow origin, $\rho_C$, determined for the viewing conditions.

Highway Driving: In the Emmerson study of highway driving (1970), road curves with greater than 200 meter radius of curvature had little influence on speed, whereas curves with radius less than 100 meters caused a substantial reduction in road speed. The investigator reported that the road curve speed (v) is described by the product of the straight course speed ($v_o$) times an exponential function of the curve radius of curvature (R), $$v=v_o{}^*(1-\exp(-0.017{}^*R)), \quad (22)$$

where road speed is in km/hr, radius in meters, and the straight course speed for this study was $v_o$=74 km/hr. Assuming that for direct vision driving of a sedan on a highway, the viewing eye height of the driver (h) is 1.5 meters above the road way and fitting a calibration point to equation (22) for equation (21), the viewing distance (r) to the optic flow origin in front of the vehicle is 73.16 meters (240 feet), and the origin viewing angle (qc), is 1.18 degrees from the horizon. Using these values for the viewing distance in equation (21), or equivalently the viewing height and origin angle in equation (9), the resulting road turn speeds from the two equations are in a near perfect agreement over the full range of radii of curvature considered by the investigator.

HMD Study (1996): In the 1996 field study (Smyth & Whitaker, 1998), the participants navigated a course with straight ways and turns of different radii with both direct vision and indirect vision, the latter seen through the HMD. In this study, the GPS position and orientation data were recorded during the trial runs of the last four participants and the road speed was computed from this data and segmented statistically by road turn type. Here, the discussion is limited to the data of the direct vision driving for theses participants without the HMD. The analysis was conducted in two stages: first, a subset of the data was used to calibrate the optic flow origin viewing distance of equation (21) for the conditions of the experiment, and then the expected speeds were computed for the remaining data to demonstrate the model validity using the calculated viewing distance parameter. The course consisted of several long straight segments and two sections with winding tight turns that had statistically equivalent road speeds. One section consisted of a sequence of several S-turns, and this section was used to calibrate the viewing distance parameter. The other section consisted of S-turns interspaced with short straight segments and was used to demonstrate the validity of the model equation.

Calibration for Study—Numerical analysis was used to iteratively compute the flow origin viewing distance (r) that results in an estimated course average speed ($v_a$) in agreement with the average for the participants, $v_a$=5.38 m/s, on the calibration course section. The numerical expression used in the analysis is:

$$\Sigma[L_i * \text{sqrt}(R_i^2+\rho^2)/R_i] = v_o * L_T/v_a, \qquad (23)$$

where $L_T = \Sigma[L_i]$, with the summation over all calibration segments, and the curve radius ($R_i$) and arc length ($L_i$) are for the $i^{th}$ segment. The value of the flow origin viewing distance that solves this expression for the calibration course data is $\rho$=18.440 meters (60.50 feet), and the corresponding viewing angle is $\theta c$=4.67°, from equation (8). Table 1 lists the radius of curvature for the road turns and the lengths of the turn segments on the calibration course in the consecutive order that they would have been encountered for a clockwise road course; the experiment was counterbalanced by travel direction around the course. Also listed are the estimated turn speed from equation (21) and the corresponding time that it would take to travel the arc length at that speed. With these computations, the total estimated time to travel the calibration course equals the measured time, and the estimated average speed of 5.379 m/s is in exact agreement with that measured for the four participants over the calibration course. Note that the direct vision distance to the optic flow origin for driving with the HMMWV is 25% of that determined for driving with a sedan on the highway; this decrease may be caused by several factors. The HMMWV driving course was not as well defined as a highway since it consisted of dirt tread marks between lane markers laid out on a cross-country field. The windshield of the HMMWV tended to be relatively dirty from passage along the dirt course. The field was rough and the participants experienced vibrations while driving, which reduced their natural visual acuity.

Validation for Study—Table 2 lists the segment radius and arc length for the demonstration section course. The radii of the straight segments are designated as "inf" for infinite radius of curvature. Again, the segment speeds for the road turns estimated from equation (21) using the viewing distance determined for the calibration course, and the corresponding times to travel the segments at those speeds, are listed in the table. Note that while the straight course speed of 8.725 m/s is known for the first and last segments, there was no way of computing the speed for the short straight segments connecting the road turns. However, the vehicle used in the experiment was a military diesel powered utility truck without much accelerating power. Considering the short travel times for these segments, the segment speed was computed as the average of the speeds for exiting and entering the connected turns, with the straight course speed attained on the long segments. With these computations, the total estimated time to travel the validation course equals the measured time, and the computed average speed of 5.63 m/s is in agreement with that measured for the four participants over the demonstration route.

In summary, the two studies: the study of highway driving (Emmerson, 1970), and the direct vision data from the HMD study (Smyth & Whitaker, 1998), demonstrate the validity of the analysis for the effect of road turn curvature upon the perceived road speed with unlimited FOV (i.e., unlimited view of the optic flow field origin).

Road Turns with Limited Field-of-View

Experimental evidence for the validity of equation (19) for the limited field-of view road turn speed may be found in the indirect vision database for the 1996 field study on driving with a HMD with a head slaved camera (Smyth & Whitaker, 1998).

Applicable Equation: The validity analysis is based on equation (13) in the following form:

$$V_T = v_S * (\eta/\rho_C)^2/(\text{sqrt}(1+(\rho_L/R)^2)*\sin^2(\theta_L)), \qquad (24)$$

expressed in terms of the unlimited camera viewing distance to the flow origin, $\rho_C$, for the viewing conditions, where we have used $\sin(\theta_C) = \eta/\rho_C$, the viewing angle, $\theta_L$, as determined from equation (11), and $\rho_L = \eta/\sin(\theta_L)$.

HMD Study: As mentioned, we consider the data of the last four participants for which GPS data was recorded in the indirect vision driving portion of the 1996 HMD field study (Smyth & Whitaker, 1998). Following equation (24), the analysis is based on the optic flow origin viewing distance ($\rho_{C'}$), for the indirect vision viewing conditions of the experiment, with the distance computed from that for the direct vision driving ($\rho_C$), with adjustment for the reduced resolution of the HMD. Using equation (5), the viewing distance is: $\rho_{C'} = \alpha^{-2/3} * \rho_C = (3.184)^{-2/3} * 18.440 = 8.519$ meters (27.949 feet), resulting in a 46.20% reduction in viewing distance. For the indirect vision configuration, the camera array was mounted on the vehicle roof at a height above ground level of $\eta$=1.8 m, and the corresponding optic flow origin viewing angle is, $\theta_{C'}$=12.2°. Using these parameters, the expected speeds were computed from the radii of curvature for all turns of the test course (i.e., both the calibration and demonstration sections combined). Again, the road speeds for the straight segments connecting the turns are computed as the average of the turn exit and enter speeds; the average road speed for the four participants on the first and last straight sections with indirect vision driving was $v_o$=6.062 m/s. Finally, head movement data from the flat panel study (Smyth, Gombash, & Burcham, 2001), suggest that the participants may have used slight head movements to enlarge their field-of view beyond that of the HMD, and for that reason the analysis is based on an effective field-of view of 32-degrees. The results of the analysis are listed in Table 3. Note that on some turns the origin of the optical flow was within the HMD view and for these turns the road speed was computed by equation (9) for an unlimited FOV; however, on other turns, the origin of the optical flow was outside the HMD view and for these turns the road speed was calculated by equation (24) for a limited FOV. With these computations, the total estimated time of 43.464 s to travel the course is 0.87 seconds greater than the measured time of 42.592 s, and the estimated average speed of $v_a=3.618$ m/s is within 2.00% of the experimentally derived 3.692 m/s for the full course.

In summary, the indirect vision data from the HMD study (Smyth & Whitaker, 1998), demonstrate the validity of the analysis for the effect of road turn curvature upon the perceived road speed with limited FOV.

Figure 11:
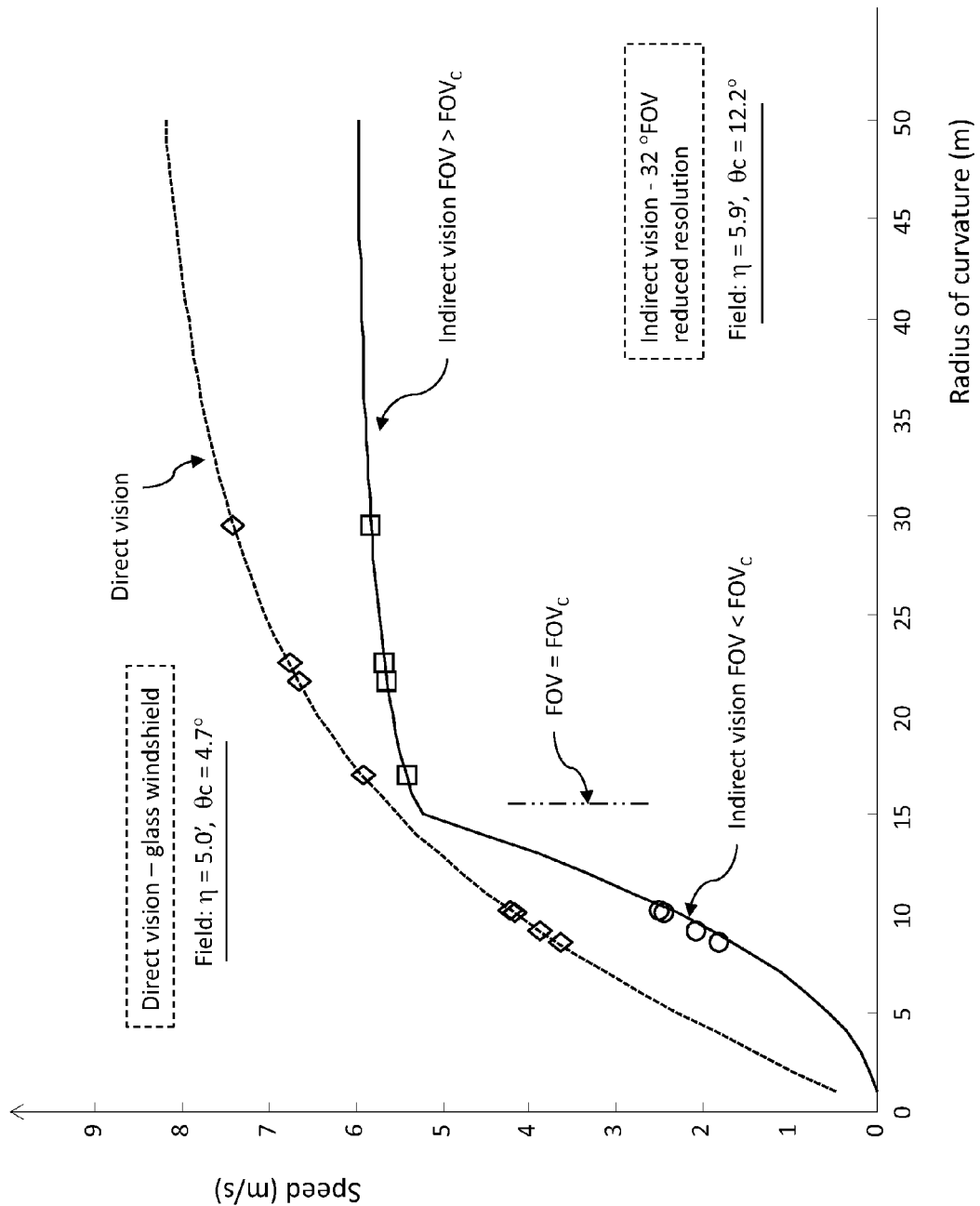
FIG. 11 is a plot of predicted speed as a function of radius of curvature for a field study.

These results for road turn speed are summarized in FIG. 11 showing the estimated speed as a function of the radius of curvature as predicted from the 1996 HMD field study data. The figure plots the estimated speed for the direct vision driving with the glass windshield (viewing height: $\eta=5.0'$, angle: $\theta c=4.7°$) computed from equation (9) for an unlimited FOV, and the predicted speeds particular to the study computed by the same equation. Similarly, plotted is the estimated speed for the indirect vision driving with the HMD (FOV: 32°, resolution: $\alpha=3.184$, viewing height: $\eta=5.9'$, angle: $\theta c=12.2°$), computed from equation (9) or equation (19) depending upon the FOV, and the predicted speeds particular to the study computed by the same equation. Note the break in the plot at about 16-meters where the camera FOV equals the critical value that is needed to see the optical flow origin. The view of the optical flow is limited for smaller radii resulting in a marked decrease in driving speed as computed by equation (24).

In this argument, validity is demonstrated by the computation of reasonable road speeds with estimated course times that are within 2% of the study measured times for both the direct and indirect view data sets, following the calculation of a viewing distance parameter for the optical flow origin from a subset of the study data. The small sample size of four participants from which the data sets were drawn does not support further statistical analysis.

In summary of the analysis, the predicted road speed, v, for skilled-base driving from the motion generated optic flow field follows from the display scene compression ratio (as determined by the ratio of the camera FOV to that of the display as seen by the driver), and in turn the degree of road turn relative to the camera FOV. In this analysis, the straightway road speed is a function of the straightway direct vision road speed ($v_o$), and the display scene compression ratio ($\alpha$). In a road turn, the speed is attenuated as a function of the turn radius of curvature (R), and the characteristics of the display such as the look down angle to the scene velocity flow origin ($\theta_c$), and the camera height above the ground ($\eta$). The road speed is further limited when the camera horizontal field-of view (FOV) is less than the critical field-of view ($FOV_c$) for the road turn radius of curvature.

In a further development that follows from the experiments, the straightway direct vision road speed of the analysis was the speed that the participants perceived as being maintained throughout the driving course and the predicted road speed was the speed that would be measured for the vehicle. With this interpretation, the road speed ($V_P$) perceived by the driver as bring maintained for a road speed ($V_M$) that would be measured for the vehicle, may be summarized below as a function of the display scene compression ($\alpha$), the camera horizontal FOV, and road turn curvature (R):

Case I: Straight Road Way $$V_P = V_M * \alpha^{+1/3}.$$

Case 2: Road Turn with Unlimited Horizontal Field-of View, FOV $$V_P = V_M * \sqrt{1 + (\eta/(R*\sin\theta_c'))^2} * \alpha^{+1/3},$$

where $FOV \geq FOV_c = 2*\sin^{-1}(\eta/(2R*\tan\theta_c'))$, a function of the radius of curvature, and
$\theta_c' = \sin^{-1}(\eta*\alpha^{+2/3}/\rho)$, where $\rho$ is the viewing distance to the origin of optical flow for the unity-display.

Case 3: Turn with Limited Horizontal Field-of View, $FOV_L$ $$V_P = V_M * \sqrt{1 + (\eta/(R*\sin\theta_L))^2} * \sin^2(FOV_c/2) * \alpha^{+1/3} / \sin^2(FOV_L),$$

where $FOV_L < FOV_c$, and $\theta_L = \tan^{-1}(\eta/(2R*\sin(FOV_L/2)))$, a function of the radius of curvature.

Therefore it has been shown that the vehicle road velocity perceived by the driver is dependent upon the relative ratio of the camera field-of view, both horizontal and vertical, to that of the display of the camera return as determined by the display size and viewing distance, as well as the native resolution of the display monitor. On this basis, in a further embodiment, the camera field-of view and display size are controlled along with adjustment of the vehicle speed for optimizing task performance.

Further Embodiments

In one such embodiment, the invention is embedded as a component of an autonomous driving system that when reaching a particular task event automatically judged critical with insufficient data for proper functioning, will release a request to the operator for manual operation of the corresponding task. Concurrently, the system activates the invention as a real-time adaptive aider that applies the predicted speed perception so as to control the camera return as a driving aid for the operator, where in this embodiment, the predicted speed perception corresponds to a cognitive flow rate in the operator that is compatible with the control dynamics needed for the requested task. In this embodiment, the invention sets the predicted perceived speed by control of one or more of the camera field-of-view, display size, and vehicle speed.

Figure 12:
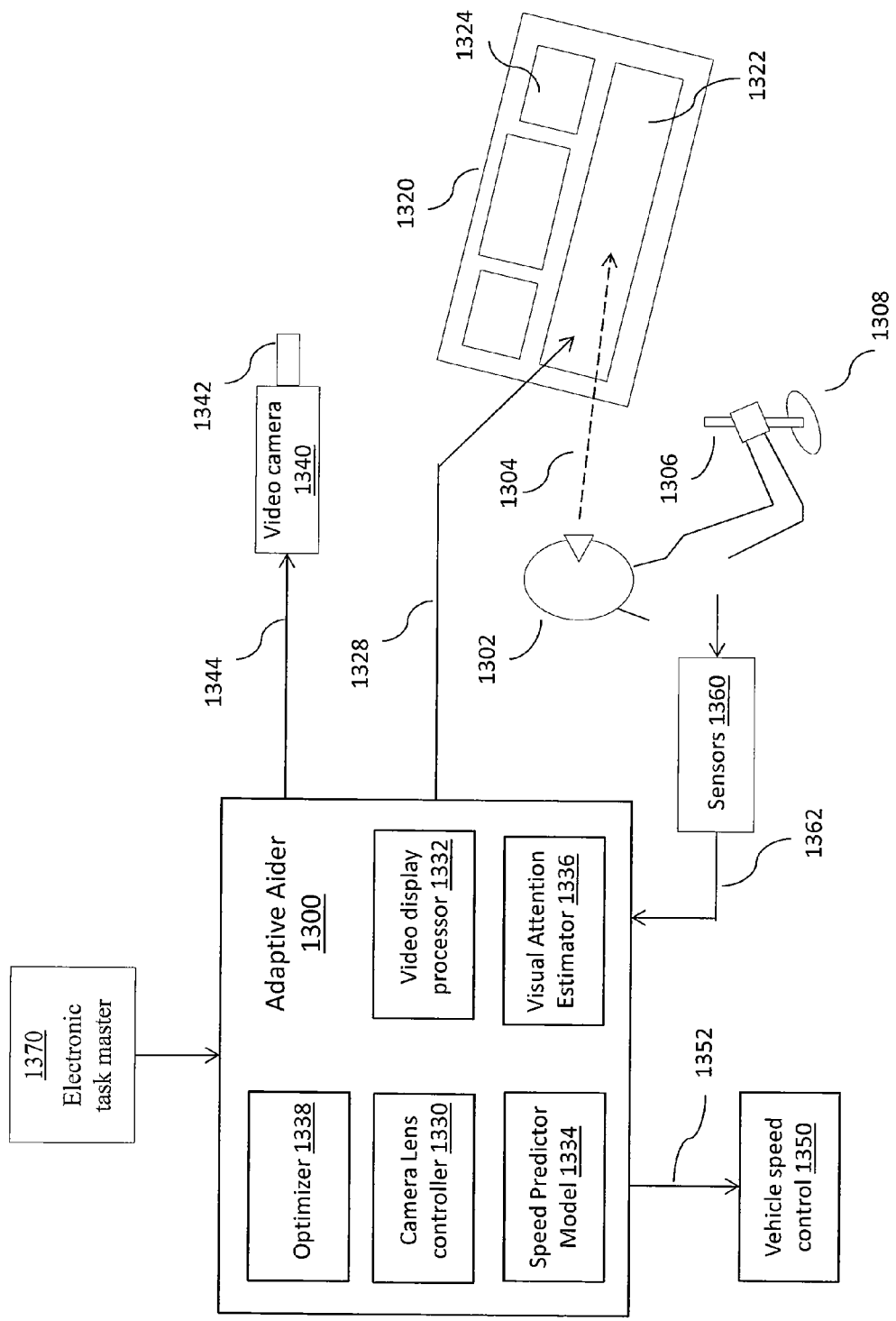
FIG. 12 is a block diagram of a further embodiment of the invention as a real-time adaptive aider that applies predicted speed perception for control of the camera return as a driving aid.

FIG. 12 is a block diagram of such a further embodiment of the invention as a real-time adaptive aider that applies predicted speed perception for control of the camera return as a driving aid. In this embodiment, the adaptive aider 1300 is composed of such components as a camera return optimizer 1338, speed predictor modeler 1334, operator visual attention estimator 1336, camera lens controller 1330, and video display 1332, and has an electronic output 1352 that is applied to a vehicle speed adjustment controller 1350, an output 1334 that is applied to the driving scene camera 1340 for adjustment of the camera lens 1342, and an output 1328 that is applied to the multifunctional screen display 1320 with the driving scene display 1322 as well as other functional displays 1324. These displays are being viewed 1304 by the operator 1302 as he or she manually 1306 controls tasks 1308 in support of the passage of the vehicle. As well as input from the electronic task master 1370 for manual task directive, the aider receives input 1362 from as array of sensors 1360 on the status of the operator and the task currently being performed.

Figure 13:
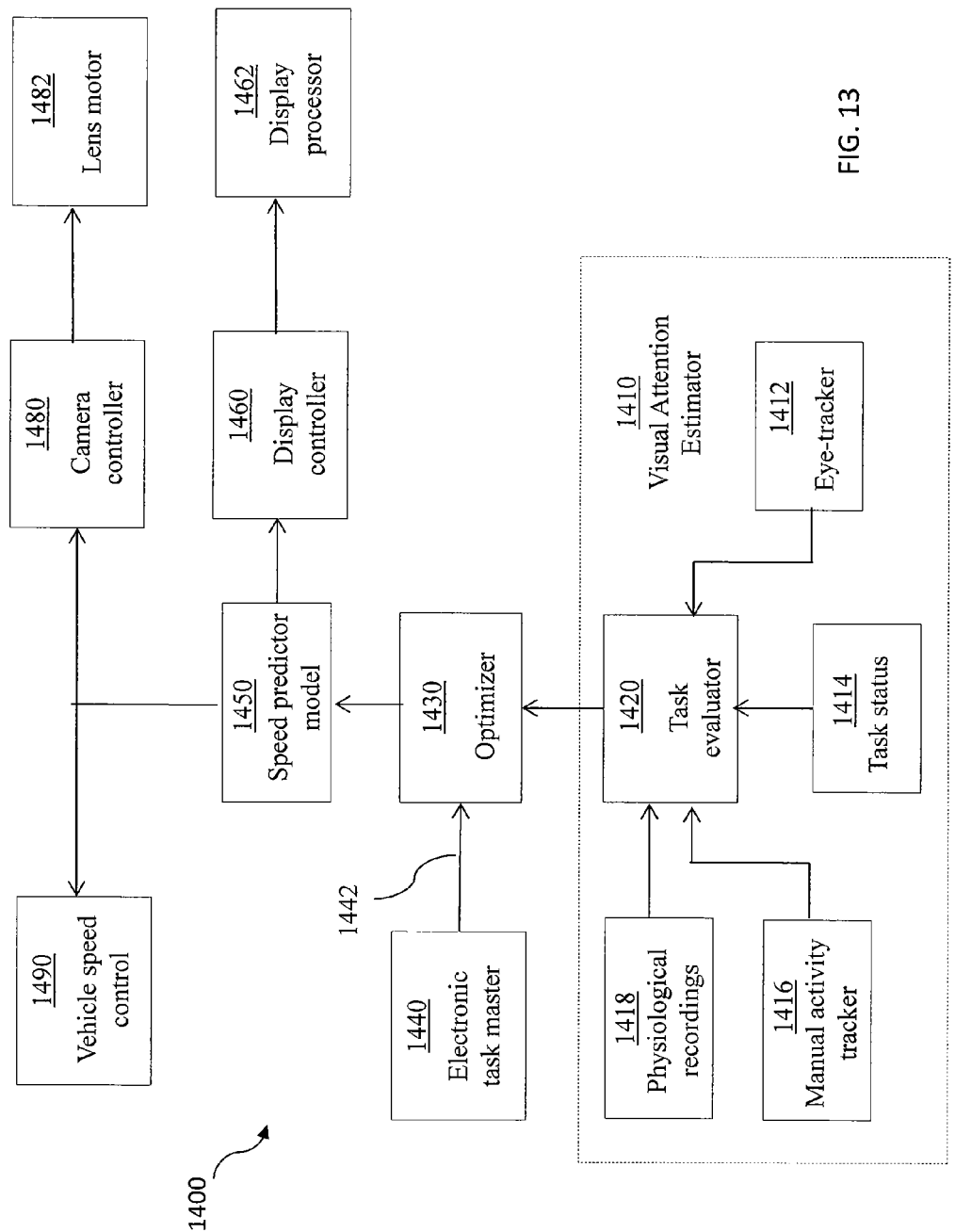
FIG. 13 is a block diagram of the invention showing one possible configuration as a real-time adaptive aider that applies predicted speed perception for control of the camera return as a driving aid.

FIG. 13 is a block diagram showing one possible configuration 1400 of the invention as a real-time adaptive aider that applies predicted speed perception for control of the camera return as a driving aid. Here, the camera return optimizer 1430 receives digital input 1442 from the electronic task manager 1440 on the type of task requested to be performed and the estimated time available, and received digital input from the visual attention estimator 1410 about the attention state of the operator. In this configuration, the attention state is derived by a task evaluator 1420 from sensor input from the task status modular 1414 (on the status of the task currently being performed by the operator), and a manual activity tracker 1416; and in some further embodiments, on input from an eye-tracker 1412 and physiological recordings 1418. The optimizer with knowledge of both the requested task and operator state computes the expected cognitive loading flow rate on the operator and the corresponding optimal perceived speed that would compatible with the control dynamics needed for the requested task. In turn, the optimizer finds the best control characteristics for the camera return needed from speed predictor model 1450, which releases corresponding control signals to the video display controller 1460 for the display processor 1462 on the driving scene display size and location, to the camera controller 1480 for settings of the camera lens motor 1482 for the FOV, and to the vehicle speed control 1490 for adjustment of the vehicle speed.

Figure 14:
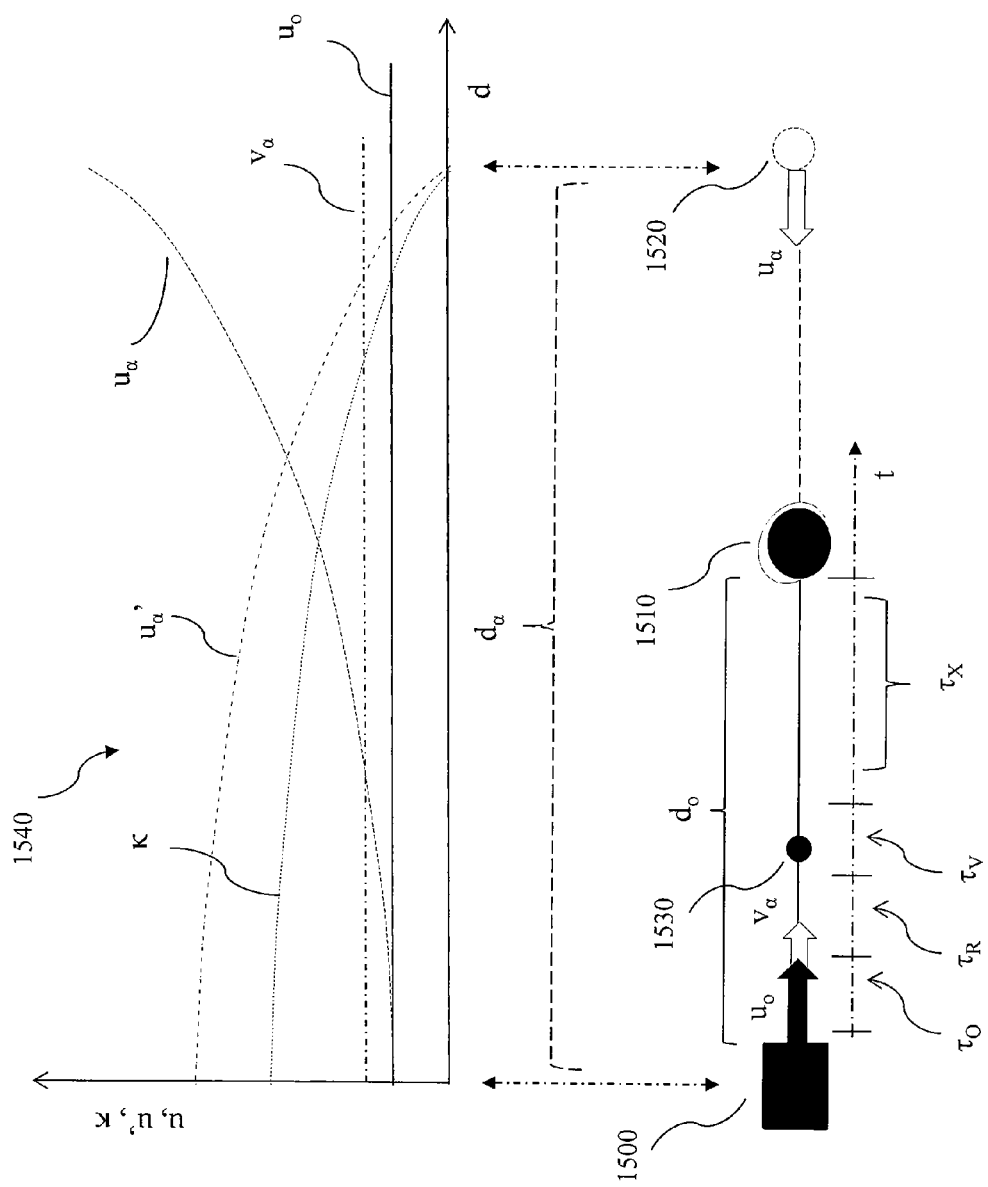
FIG. 14 is a schematic showing the relation of the perceived road speed to the task elements of a compressed scene display for an automated task request.

FIG. 14 is a schematic showing the relation of the perceived road speed to the task elements of a compressed scene display for an automated task request. The figure shows a block figure vehicle 1500 traveling a road speed $u_o$ toward a stationary object 1510 at a distance $d_o$ ahead of the vehicle. Due to the display scene compression a, the operator perceives the object as being at 1520, an apparent distance of $d_\alpha = \alpha * d_o$, and being approached at a speed of $u_\alpha$; the operator perceives the vehicle speed as $v_\alpha = u_o * \alpha^{1/3}$, from the optic flow locus located a fixed distance in front of the vehicle, now at point 1530. Considering a time line (t) for the automated task request, the operator needs to first orient on the object in the display, $\tau_o$; recall a task schema for activity, $\tau_r$; evaluate and select an action, $\tau_e$; and complete an executed action, $\tau_x$, before reaching the object. The complexity of the task induced by the scene compression, are shown in the plot 1540 relating the vehicle speed ($u_o$), perceived vehicle speed ($v_\alpha$), and the apparent approach speed ($u_\alpha$), deceleration ($u_\alpha'$), and path curvature ($\kappa$) to the perceived distance ($d_\alpha$) from the object. While the vehicle speed and consequently the perceived speed remain constant, the approach speed to the object appears to decelerate on an increasingly curved path as it gets closer. The figure clearly shows the increase in task dimensions of object speed and location to be tracked and evaluated, as well as increased dynamics of those dimensions. While the time to complete the task remains the same, the increase in the task dimensions and dynamics of these dimensions increases the difficulty of the task and correspondently, the attention demand on the operator with a reduction in task performance. In particular, the apparently high approach speed of a more distant object imposes an increased cognitive load for scene evaluation during task execution that is tied to the vehicle perceived speed; this is shown by the experimental data (Smyth, Gombash, Burcham, 2001), in which test participants would drive at a slower speed with indirect vision than direct vision while perceiving that they were driving at the same speed that they did with direct vision. Referring again to this experiment, the subjective workload reported by the participants for mental and temporal demands remain statistically the same across the different compression ratios (Smyth C C (2002). *Modeling Indirect Vision Driving with Fixed Flat Panel Displays: Task performance and mental Workload*. ARL-TR-2701, Army Research Laboratory, Aberdeen Proving Ground, MD 21005, hereinafter "Smyth, 2002 [ARL-TR-2701]"); the overall subjective workload increases with compression ratio, but this is due to an increase in reported frustration. That the reported demands are significantly less for the direct vision is explainable by the wide view from the open cab. The display element dynamics are proportional to the vehicle perceived speed ($v_\alpha$), and for this reason the perceived speed may be considered a metric of the display induced workload and consequently a display design feature.

Considering the time line (t) of FIG. 14 for the automated task request in greater detail, the time available may depend upon the speed of the vehicle and the distance to the object when the request is made. As noted above, the operator needs to first orient on the object in the display, $\tau_o$; recall a task schema for activity, $\tau_r$; evaluate and select an action, $\tau_e$; and complete an executed activity, $\tau_x$, before reaching the object. The time to orient, detect, recognize and identify the object may depend upon the perceivable features as determined by the object distance and display scene compression ratio; however, to a first order approximation this time may be assumed constant while the associated cognitive workload is a function of the features, given that the task request was made at a suitable distance. Similarly, the times to identify the task problem, recall a task schema, and evaluate and select an action may be assumed constant, although the cognitive workload may depend upon the action choices available. Presumably, the executable activity will be made along a mentally projected course trajectory that is being continually evaluated and adjusted as the activity occurs. Here, the workload may depend upon the adjustment rate which is determined by the vehicle speed and the frequency of control adjustments needed over the route distance, as well as by the ability to observe and evaluate the course for adjustments which is determined by both the speed and the compression ratio. Workload can influence task performance according to the Yerkes-Dodson Law with an optimal performance workload level and deterioration in performance for workload greater or less than the optimal level. In one embodiment, the display characteristics may be optimized for task time and workload by choice of vehicle speed and camera FOV within the tactical constraints and operational limits on speed and task needs for FOV. Again, the perceived speed may be considered a metric of the display induced mental workload and consequently the display design feature.

Figure 15:
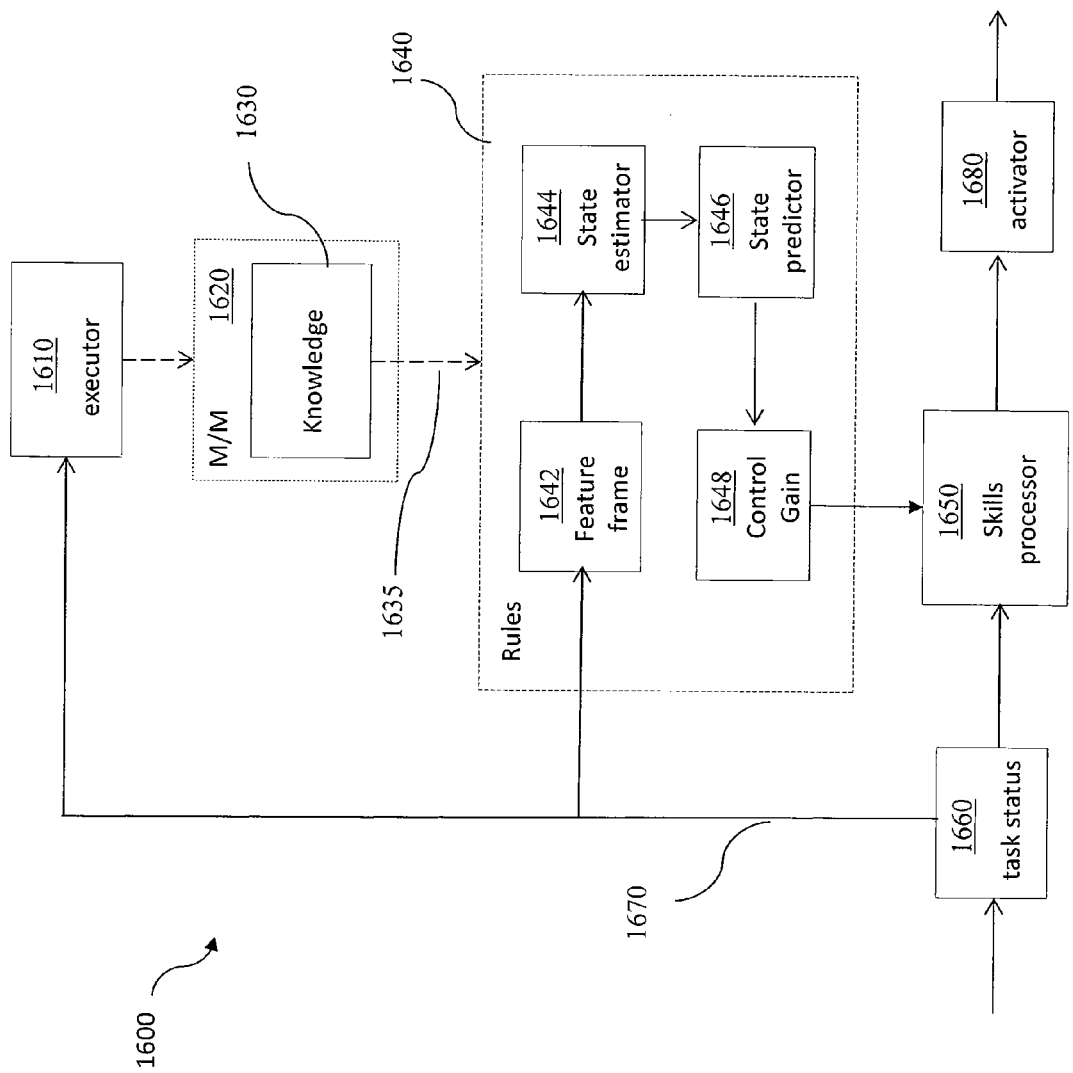
FIG. 15 is a schematic of a state-space variable model comprising a Skill-Rules-Knowledge (SRK) information processor for modeling vehicle control.

In a further embodiment, the invention incorporates an embedded model of a human information processor in the optimizer 1430, configured as a Skills-Rules-Knowledge (SRK) information processor in a form applicable for vehicle control as a continual control process. As elaborated in FIG. 15, the model 1600 consists of an executor 1610, task (mental) model bases 1620 with Knowledge 1630 and script Rules processor 1640, and a Skills processor 1650. A task status 1660 is input 1670 to the executor 1610, the task model bases 1620, and the skills processor 1650, which in turn provides an output to an activator 1680. Based on the task status, the executor directs selection of the task model, and in turn, rules script with knowledge of the task parameters is downloaded 1635 to the rule-based processor 1640. Associated with these activities are micro-model times and workloads. With this embodiment, the model involvement corresponds to a hierarchy of cognitive processing in the task at the levels of naturalistic reasoning, rules-based reasoning, knowledge recall, or task priming as determined by the executor. Here naturalistic reasoning occurs at the Skills Processor 1650 where the stimuli are self evident from the features and maps directly to a schema for a motor response without cognitive evaluation. At a higher level, where the stimuli or schema is not as self evident, the rules processor must be evoked for evaluation and response decision. When confounded, knowledge of features or schema applicable to the task domain may have to be recalled. Finally, when switching tasks, the rules and knowledge constituting the task mental model may have to be primed to the applicable task domain.

In a still further embodiment, the model is expanded to emulate features appropriate for vehicle control with the executor in the form of a minimax strategy algorithm processor in which the need to evaluate the changing situation is competing with the task focus for the attention facilities as determined by induced mental stress; the Knowledge base recalled from long-term memory consists of a features set template and a schema constituting a mental-model in state space for activities performing transformations on the feature set; the Rules base is in the form of a state-space vector controller that sets a control-set point goal; and the skills processor is a manual activity controller tracking the error between the effort and the set goal.

In this embodiment applicable to continual control applications, the Rules based processor 1640 may be a state-space variable modern-control theory processor where the variables are those of a mental model state construct of the task problem, here consisting of those observed by the task status 1660 with the features matched to the Feature Frame 1642 for the variable features. The features are read by a State Estimator 1644 which estimates the present state of the observed variables from the feature set and also the state of the unobserved variables for completion of the model state; in some embodiments, this may be a Kalman-Bucy filter construct. A State Predictor 1646 with knowledge of the task dynamics in the form of rules, possibly in another embodiment expressed in the form of state differential equations, predicts the future state of the task problem from the present state. These predictions are used by a Control Gain Reference 1648 to set a tracking reference for the Skills Processor 1650.

In a still another embodiment, the Skills Processor 1650 may be in the form of a feed-forward controller that with separate process model feedback loops to account for control process transport delays, forces the process output to track the input reference setting. In one such embodiment, the Skills Processor 1650 may be in the form of an adaptive filter as an inverse model of the skill process configured as a filtered x-LMS algorithm controller to account for control response delay. In a still further embodiment, the Skills Processor may be in the form of a "Smith Predictor" controller concept applicable to the neurological motor control circuits presumably at the cerebellum level controlling limb movements from visual input. As with a standard Smith Predictor design, the controller uses a feed-forward model of the controlled process to compensate for the lag in negative feedback including that of the neurological proprioceptor output and of the delay in the visual possibly generated by the vehicle video system and in the consecutive neural sensory input. In one such design, an inner loop model of the process without the delays is in a negative feedback loop which compared to the reference setting drives a feed-forward controller gain; while the error between an outer loop model of the process with delays and a negative unity feedback of the process output, is added back into the controller input to cancel the effect of the transport delays without destabilizing the inner high-gain control loop.

Figure 16:
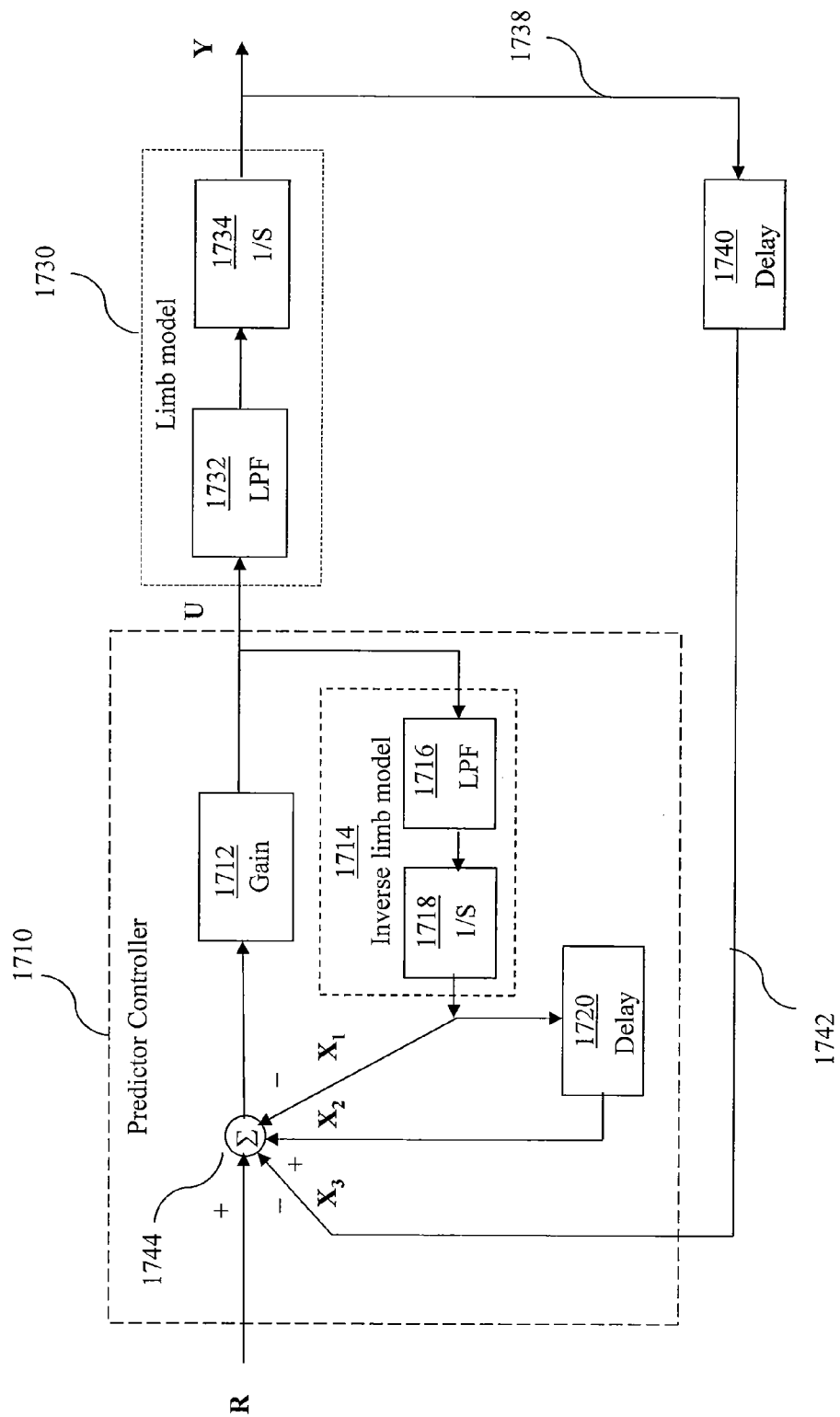
FIG. 16 is a schematic of the skills component as a 'Smith' predictor for modeling limb movement in vehicle control.

FIG. 16 shows a block diagram of a simple "Smith Predictor" control scheme for simulating limb movement in such a visual tracking task. The Predictor controller 1710 consists of an inner loop feed-forward inverse model 1714 of the limb as a first-order low-pass filter 1716 (with a corner frequency of 0.9 Hz), in series with an integrator 1718 and output $X_1$ to an adder 1744. The outer loop consisting of 150 ms delay 1720 of the inner loop output, has an output $X_2$ which is compared at the adder to the negative unity feedback loop $X_3$. The error signal from the adder for the offset from the reference R is input to a gain 1712 with a motor command output U, to the limb model 1730 modeled in turn as first order low pass filter 1732 in series with an integrator 1734. The proprioceptor outputs for the arm movement Y are delayed 1740 in the feedback loop 1742. Here, the inner loop 1714 provides a rapid prediction of the outcome of each motor command sent to the arm, while the outer loop 1720 provides a prediction of the feedback synchronous with the proprioceptor and visual feedback 1742.

There is a neurological basis for the validity of such a model within the human cerebral cortex with presumably the Executor mapped to the orbitofrontal cortex believed involved in planning, the Feature Frame and State Estimator to the posterior parietal cortex involving visual-egocentric coordinates, the State Predictor to the anterior parietal with settings from the pre-motor cortex, and the Gain Reference to the motor cortex. The Skills Processor may be mapped to the cerebellum with a reference point from the motor cortex and visual offset from the pontine nuclei via the posterior parietal for foveal vision or even directly from the visual cortex for peripheral vision. Further, the reference signal may be set by the parietal cortex in visual-egocentric coordinates for comparison to the delayed visual return. The cerebellum is believed essential to coordinating motor limb and digit movements. In this process, the cerebellum presumably forms an internal model of the motor system including a neural representation of the controlled limb; this is because the speed of human motor movement (on the order of 200-300 ms), is too fast to be controlled by visual feedback; the response is controlled by the feedback of the proprioceptor outputs which have an internal delay on the order of 150 ms, coupled with the returning visual feedback, perhaps 150-250 ms later.

In a further development, the invention may be applied for an automated task request to manually control the course of the vehicle along a reference path while the speed is controlled by the automation. To that purpose, the function of manual steering and the relation to vehicle heading may be formulated as state-space variables in an operator model. In particular, for path following, the operator control model may comprise a path curvature preview pursuit loop and an error compensatory loop based on an error signal comprised of the weighted sum of the curvature, heading, and lateral offsets for control of the steering wheel by arm movement. The state-space formulation is based on the mathematical relations among these offsets as performance measures with the lateral offset as the integral of the heading offset error and the offset in curvature as the differential of the heading error. Taken together, these measures follow from the input of the heading error to the operator as a Proportional-Integral-Differential (PID) controller setting the control reference point for limb movement.

Figure 17A:
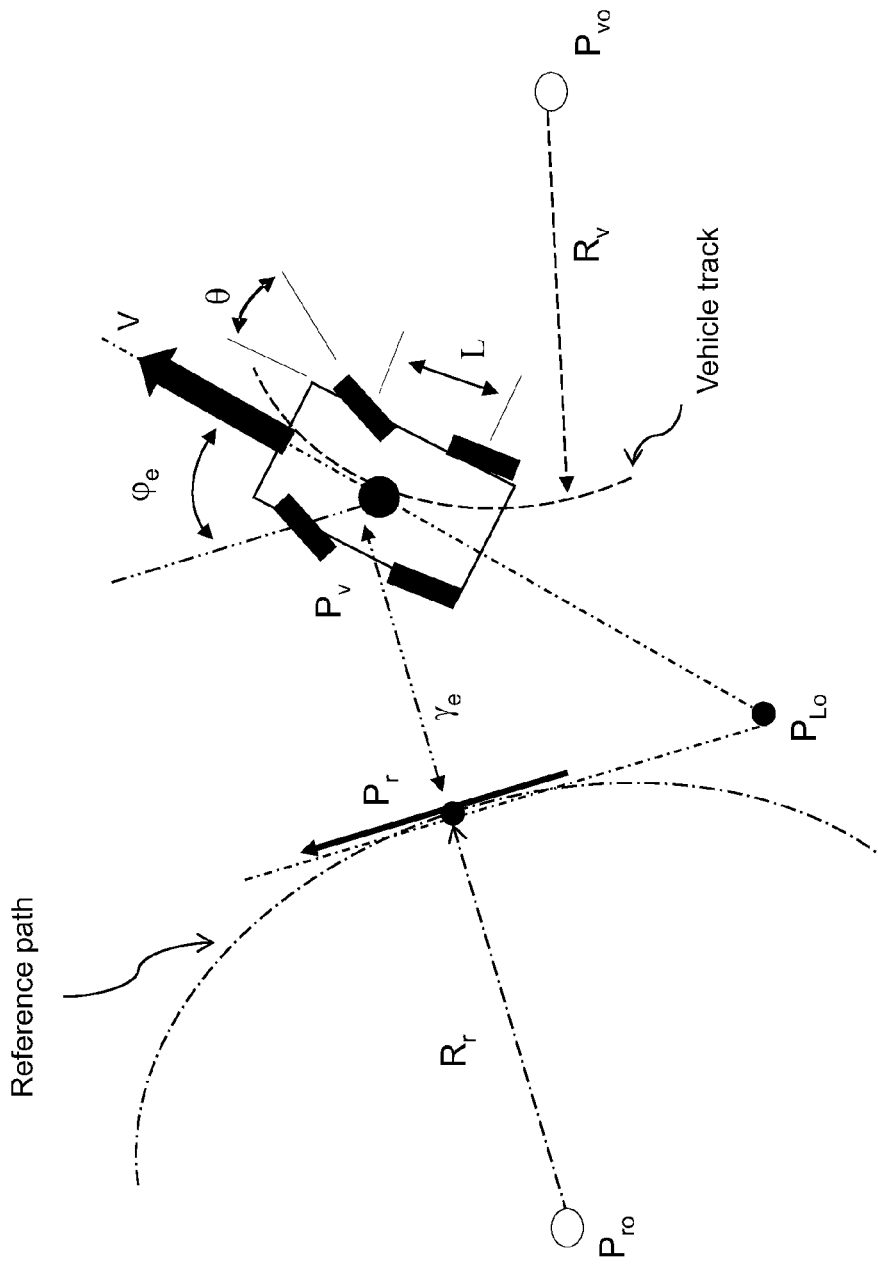
FIG. 17A is a top-view schematic showing the relation of a vehicle tire-offset angle to the vehicle heading, lateral offset, and course curvature.

In particular, while the driver controls the vehicle path with the steering wheel, the vehicle performance is a function of the path curvature, the heading, and the lateral position as follows for a simple vehicle model used for demonstration. FIG. 17A is a top view schematic showing the relation between the tire-offset angle and vehicle heading, lateral offset, and path curvature. In the figure, a vehicle is executing a turn sufficiently large in radius for the road speed and conditions that tire side-slips do not occur. Under these conditions, given the tire offset angle θ, the turn radius of curvature is $R_v=L/\sin(\theta)$, where L is the vehicle wheel base length; the turn curvature $C_v=1/R_v$. The lateral offset $\gamma_e$ is the straight line distance from the vehicle position $P_v$ along the normal to the reference path at $P_r$, with the reference path of radius $R_f$ and centered at $P_{ro}$. The heading offset $\phi_e$ is the angle between the vehicle heading and that of the path tangent at the normal point. Having demonstrated the definitions of the vehicle steering performance measures, the following relations exist between the measures:

Steering—The steering wheel offset ($\delta$), is linked to the limb position as determined by the control circuit for limb movement. The steering wheel offset controls the tire wheel angle ($\theta$) from the steering linkage as a position control process (zero order) with gain $K_{sw}$: $\theta = K_{sw}*\delta$; correspondingly, a transfer function: $\Phi(s)/\Delta(s) = K_{sw}$. In application, the tire wheel offset and through the linkage, the steering-wheel offset are limited in range about the vehicle centerline.

Path Curvature—The radius of curvature (R) of the vehicle path is determine by the sinusoidal function of the tire wheel angle and the vehicle wheel base (L), $R = L/\sin(\theta)$, which reduces to $R = L/\theta$, for small angles, or $R = L/K_{sw}*\delta$, for small steering wheel offsets, with a corresponding transfer function: $C(s)/\Delta(s) = K_{sw}/L$; the path curvature is the reciprocal of the path radius, $C = 1/R$.

Heading—The time-change in vehicle heading ($\phi$) is determined by the tire offset in a first order rate control with gain u/L, a function of the vehicle velocity, u, that is ($\phi' = u*\sin(\theta)/L$, which reduces to $u*\theta/L$, for small angles. The change in heading is determined in turn by the steering wheel offset: $\phi' = u*\sin(K_{sw}*\delta)/L$ which reduces to $u*K_{sw}*\delta/L$, for small angles; the transfer function is $\theta(s)/\Delta(s) = (u*K_{sw}/L)/s$.

Lateral Position—The change in lateral position ($\gamma$) is related to the steering wheel offset in a second order acceleration control with gain $u^2*K_{sw}/L$, a function of the velocity squared, $\gamma'' = (u^2*K_{sw}/L)*\delta$, for small angles; the transfer function is $X(s)/\Delta(s) = (u^2*K_{sw}/L)/s^2$.

Figure 17B:
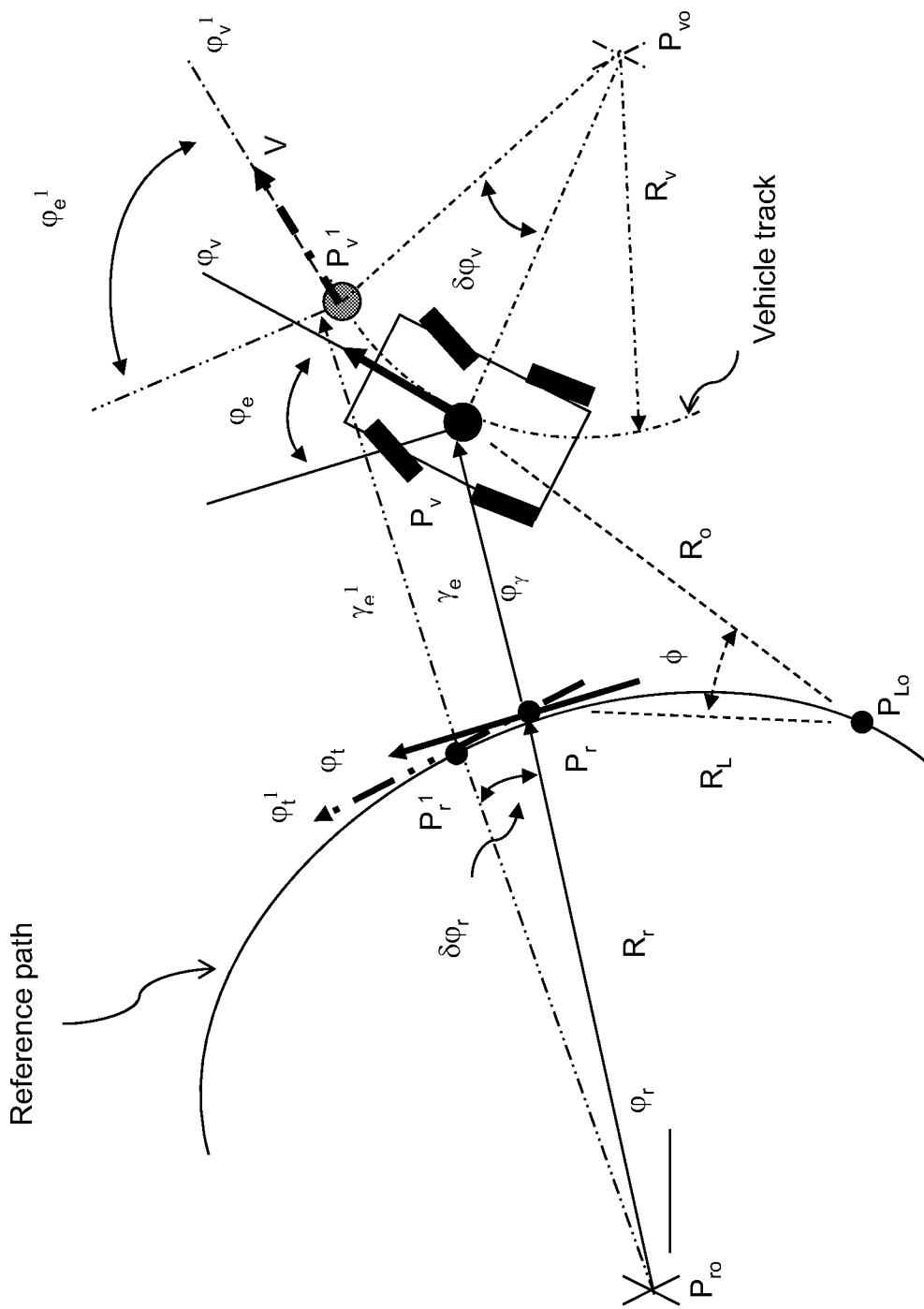
FIG. 17B is a top-view schematic showing the relation of vehicle heading and lateral offset errors to circular arc reference path and vehicle track.

As further insight into the driving process, the heading and lateral offset may be derived for a circular arc reference path. FIG. 17B is a top-view schematic showing the relation of the heading and lateral offset errors of the vehicle track to a circular arc reference path. The reference path is a circular arc specified by a turn direction (i.e., clockwise [cw] or counterclockwise [ccw]), a radius of curvature, $R_r$, and an arc origin $P_{ro}$. The vehicle heading and lateral offset errors are measured relative to the straight-line extension of the reference-arc radius to the vehicle position. That is, the heading error $\phi_e$ is the difference between vehicle heading $\phi_v$ and the tangent $\phi_t$ to the reference arc at the point Pr where the radius extension reaches the reference arc, and the lateral offset $\gamma_e$ is the distance from that point to the vehicle position.

Note that the vehicle position $P_v$: $[x_v, y_v]$ may be located in the reference path coordinates by: $x_v = (R_r + \gamma_e)*\cos(\phi_r) + x_{ro}$, and $y_v = (R_r + \gamma_e)*\sin(\phi_r) + y_{ro}$, where the angle to the radius extension, $\phi_r = $ a tan $2((y_v - y_{ro}),(x_v - x_{ro}))$, is measured positive in the counterclockwise direction from the positive x-axis; the corresponding reference path tangent is: $\phi_t = \phi_r + Sr*\pi/2$, where Sr specifies the turn direction, $Sr = 1$ for ccw, and $Sr = -1$ for cw. This equation-set may be used to find the arc lateral offset: $\gamma_{em} = -R_r + (y_v - y_{ro})*\sin(\phi_r) + (x_v - x_{ro})*\cos(\phi_r)$, an expression that is positive for a vehicle outside the arc and negative for one within the arc. The sign of the offset of the vehicle as seen from the path is given by a positive reference unity offset, here chosen to be to the right side of the reference tangent. Here, the sign of the lateral offset of the vehicle from the path is given by the dot product of the offset directional cosines with those of a positive reference unity offset, here chosen to be to the right side of the reference tangent, with directional cosines: $a_{yo} = \sin(\phi_t)$ and $b_{yo} = -\cos(\phi_t)$. With this convention, the offset sign is given by: $So = \cos(\phi_\gamma)*\sin(\phi_t) - \sin(\phi_\gamma)*\cos(\phi_t)$, where $\phi_\gamma = $ a tan $2(y_v - y_r, x_v - x_r)$, is the angle of the offset to the vehicle position, and $x_r = R_r*\cos(\phi_r) + x_{ro}$, $y_r = R_r*\sin(\phi_r) + y_{ro}$, the position on the reference arc where the offset originates; thus resulting in $\gamma_e = \text{sign}(So)*\text{abs}(\gamma_{em})$. That is, the offset is $\gamma_e = Sr*\gamma_{em}$. While this is the offset of the vehicle as seen from the path, the offset of the path as seen from the vehicle is given by $\gamma_d = -\text{sign}(Sd)*\gamma_e$, where $Sd = \sin(\phi_v)*\sin(\phi_t) + \cos(\phi_v)*\cos(\phi_t)$, the dot-product of the directional cosines for the path direction and that of the vehicle.

Note that the reference path could just as well be defined by the arc origin and a point on the arc, $P_{Lo}$; in these terms, the lateral offset magnitude is given by the law of cosines as $\gamma_e = \text{sqrt}(R_L^2 + R_o^2 - 2*R_L*R_o*\cos(\phi))$, where $\phi$ is the angle formed by $R_L$ and $R_o$. Here, as $R_r \to \infty$, the reference path becomes a straight path with heading $\phi_L$ and origin $P_{Lo}$; the reference path tangent becomes the path heading $\phi_t = \phi_L$, and the lateral offset magnitude $\gamma e = \text{sqrt}(R_o^2 - R_L^2)$, since now cos $(\phi) = R_L/R_o$; where $R_L = (x_v - x_{Lo})*\cos(\phi_L) + (y_v - y_{Lo})*\sin(\phi_L)$, $x_r = R_L*\cos(\phi_L) + x_{Lo}$, $y_r = R_L*\sin(\phi_L) + y_{Lo}$, and positive offset occurs for the vehicle to the right of the line tangent, as for the straight-line reference path case above. Again, having established the heading error and offset in terms of the path parameters, it is now advantageous to derive the changes in heading error and lateral offset as the vehicle proceeds, and in particular the relation between these changes.

As shown in FIG. 17B, consider the passage of the vehicle from point $P_v$ to $P_v^1$ in incremental time $\delta t$, with speed V along the arc with radius $R_v$. Here, the incremental change in heading error is the difference between the change in the vehicle heading and that of the reference curve tangent, $\delta\phi_e = \delta\phi_t - \delta\phi_v$. While the change in the vehicle heading remains $\delta\phi_v = Sv*V*\delta t/R_v$, the corresponding change in the arc tangent is determined by the arc between $P_r$ and $P_r^1$, that is, $\delta\phi_t = Sr*V*\delta t*\cos(\phi_e)/(R_r + \gamma_{em})$, from the geometry. The rate of change of the heading error is $\phi_e' = -V*(Sv/R_v - Sr*\cos(\phi_e)/(R_r + \gamma_{em}))$. Here $R_v = \text{abs}(L/\sin(\theta))$, and $Sv = \text{sign}(\sin(\theta))$, following the tire offset convention presented above. Considering now the change in arc lateral offset, as can be seen from the figure, the incremental change is $\delta\gamma_{em} = Sr*V*\delta t*\sin(\phi_e)$, that is, the rate of change of the lateral offset is $\gamma_{em}' = Sr*V*\sin(\phi_e)$. In turn, the acceleration in the lateral offset is $\gamma_{em}'' = -Sr*V^2*\cos(\phi_e)*(Sv/R_v - Sr*\cos(\phi_e)/(R_r + \gamma_{em}))$. Similar comments apply to the change in lateral offset of the vehicle as seen from the path, with however no correction for the reference path direction, $\gamma_e' = V*\sin(\phi_e)$. The lateral offset of the path as seen from the vehicle continues to be given by $\delta\gamma_d = -\text{sign}(Sd)*\delta\gamma_e$, where $\delta Sd = -\delta\phi_e(\phi_e*\sin(\phi_e))$, determining the change in sign of the vehicle perceived offset as the vehicle progresses around the arc.

Note that for small heading error, $\phi_e \to 0$, the lateral offset velocity is $\gamma_{em}' = V*\phi_e$, and additionally, for small lateral offsets such that $R_r >> \gamma_{em}$, and where the vehicle is on path, the acceleration $\gamma_{em}'' = -Sv*V^2*(1/R_v - 1/R_r)$, a function of the differences in the path curvatures. Thus, for slight deviations in vehicle heading from that of the reference path, while the rate of change of the lateral offset is linearly related to the heading error through the velocity, the rate of change of the heading error is tied to the velocity through the difference in the path curvatures. The implication is that acceleration control of the driving errors may be managed through the matching of the vehicle path curvature to that of the reference path. Note that for $R_r \to \infty$, these equations reduce to those for the straight-line reference path.

Figure 18:
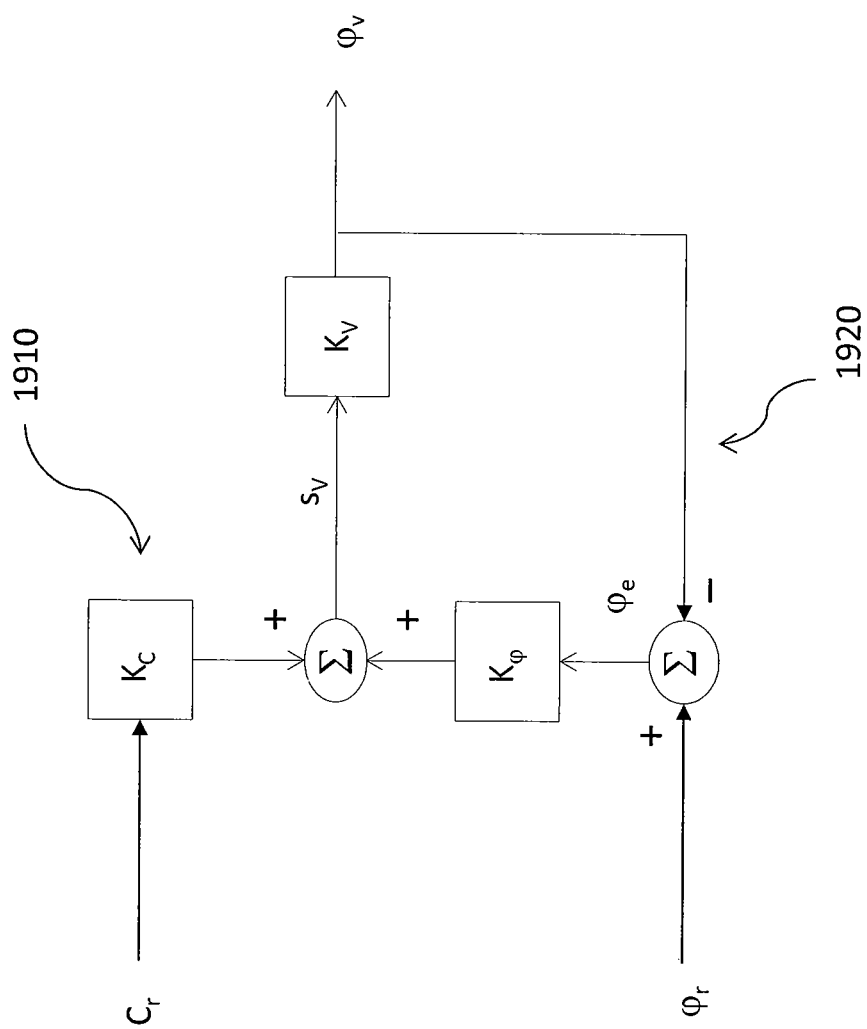
FIG. 18 is a schematic of the operator control process as a pursuit feed-forward tracking control loop coupled with a compensatory feedback tracking loop.

The operator model follows the mental process that the driver uses to steer the vehicle; in particular, that the driver steering control as shown in FIG. 18, consists of a pursuit tracking 1910 of the path curvature $C_r$ based on a preview of the reference path ahead, coupled with a compensatory correction 1920 of vehicle performance errors in the path pursuit tracking, here shown as the heading error $\phi_e$, the difference in the vehicle heading $\phi_v$ and the reference path heading $\phi_r$. In this simplistic scheme, the sum of the path curvature weighted by the gain $K_C$ and the heading error weighted by the gain $K_\phi$, results in a manual motor control set point $S_v$, which in turn weighted by the gain $K_v$ representing the vehicle dynamics, produces the vehicle performance measures.

Pursuit Tracking: The driver in previewing the path ahead uses the perceived path curvature to implement feed-forward control. The driver judges the curvature $C_r=1/R$, of the reference path ahead from points where the path appears to reverse direction; in turn, the reference heading $\phi_r$ and lateral position $\gamma_r$ of the path are related to the path curvature through the vehicle velocity, that is, the differential of the heading of the path ahead is related to the path curvature by $\phi_r'=u*C_r$, and that of the lateral offset to the heading by $\gamma_r'=u*\phi_r$. From the estimate of the reference path, the errors in the vehicle track may be perceived for compensatory tracking Compensatory Tracking: The compensatory control may be represented as a filter with an error signal comprised of the weighted sum of the curvature, heading, and lateral offsets for the arm movement control of the steering wheel setting. The steering wheel control is an acceleration control and the error rate is an anticipatory lead input.

Figure 19:
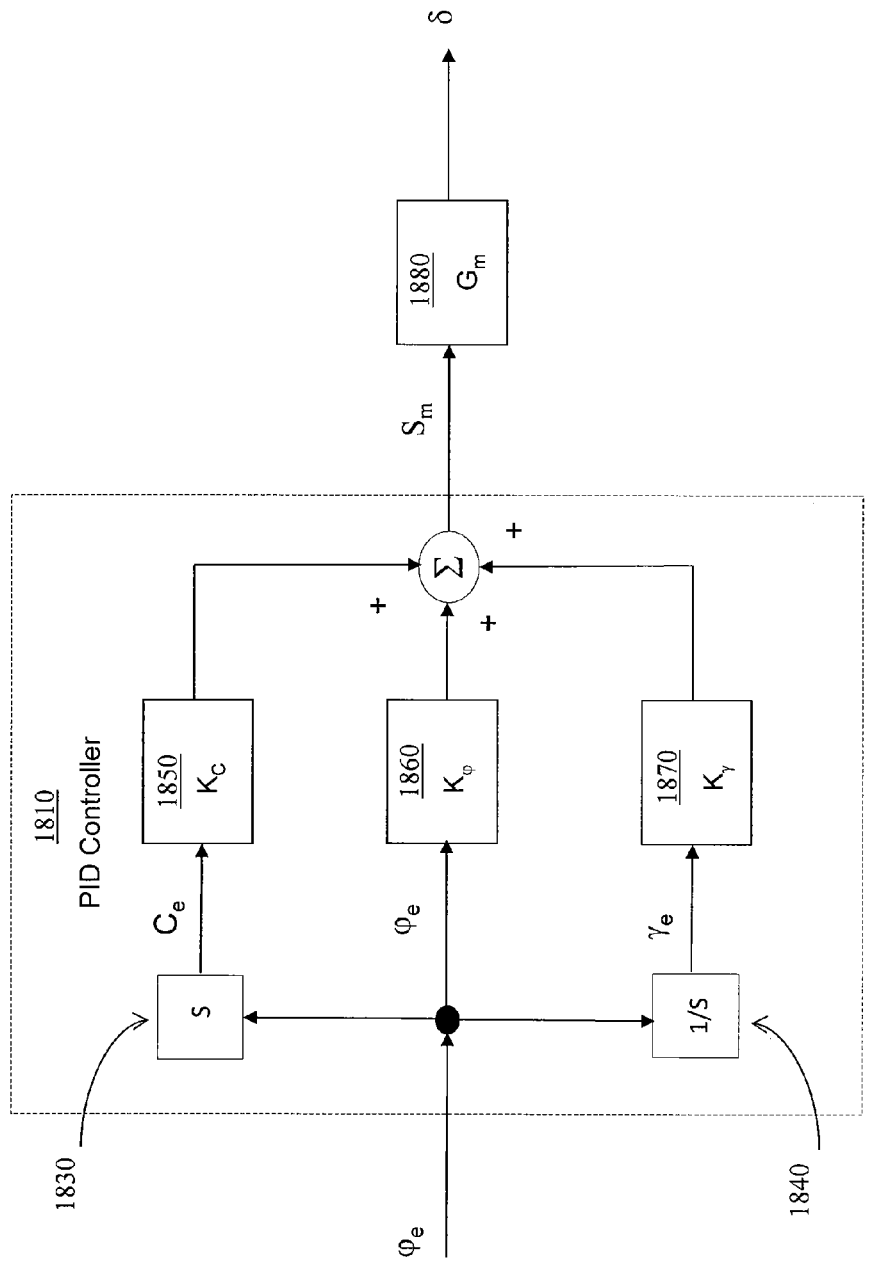
FIG. 19 is a schematic of a compensatory loop of the state-space model configured as a Proportional-Integral-Differential (PID) controller.

In a further embodiment, the compensatory tracking loop follows this development as a PID controller, based on the relations between the path curvature, heading, and lateral offset. As shown in FIG. 19, the correction by the operator to the heading error $\phi_e$ is input to a Proportional-Integral-Differential (PID) controller 1810, with the lateral offset correction $\gamma_e$ being the integral signal 1840, the heading correction $\phi_e$ the proportional signal, and the curvature correction $C_e$ being the differential signal 1830. The signals are weighted by error gains 1850, 1860, and 1870 for the curvature, heading, and lateral respectively, and the sum of these weighted signals may be considered as the control signal $S_m$ to the human motor Skills processor 1880 for setting the steering wheel offset, $\delta$. As mentioned above, the limb movement may in turn be modeled by a form of a "Smith Predictor" controller concept applicable to the neurological motor control circuits presumably at the cerebellum level controlling limb movements from visual input.

Having established the state-space variables and model for the estimator and state predictor representing the state-space formulation of the steering control task, with the state-space vector controller setting a control-set point for the manual control, the effects of the display scene compression upon the driving task will now be considered. As noted in comments for FIG. 14, the scene compression distorts the movement of scene objects both in approach speed and path, and increases the mental workload as a function of the perceived vehicle speed. For the specific task of manual driving, the effects directly influence task performance through the changes in perceived reference path curvature and the vehicle heading error rate. As has been noted above, the perceived reference path curvature for a straight path is $C_r=(\alpha^2-1)*\sin^4(\phi)/(\alpha*x_o*(\alpha^2-1)*\cos^2(\phi)+1)^{3/2})$, an expression dependent on the compression ratio and the position relative to the vehicle; because of this distortion, the accuracy of the pursuit tracking may be decreased. With compression, the heading error rate for a straight path becomes $\phi_e'=v_a*\sin(K_{sw}*\delta)/L$, since the changes are seen at the perceived vehicle speed, and the compensatory tracking may have more difficulty following changes in the heading error. For these reasons, the display scene compression may cause an increase in cognitive workload for the pursuit tracking due to the apparent increase in path curvature, and an increase for the compensatory tracking due to the increase in perceived vehicle speed.

Figure 20:
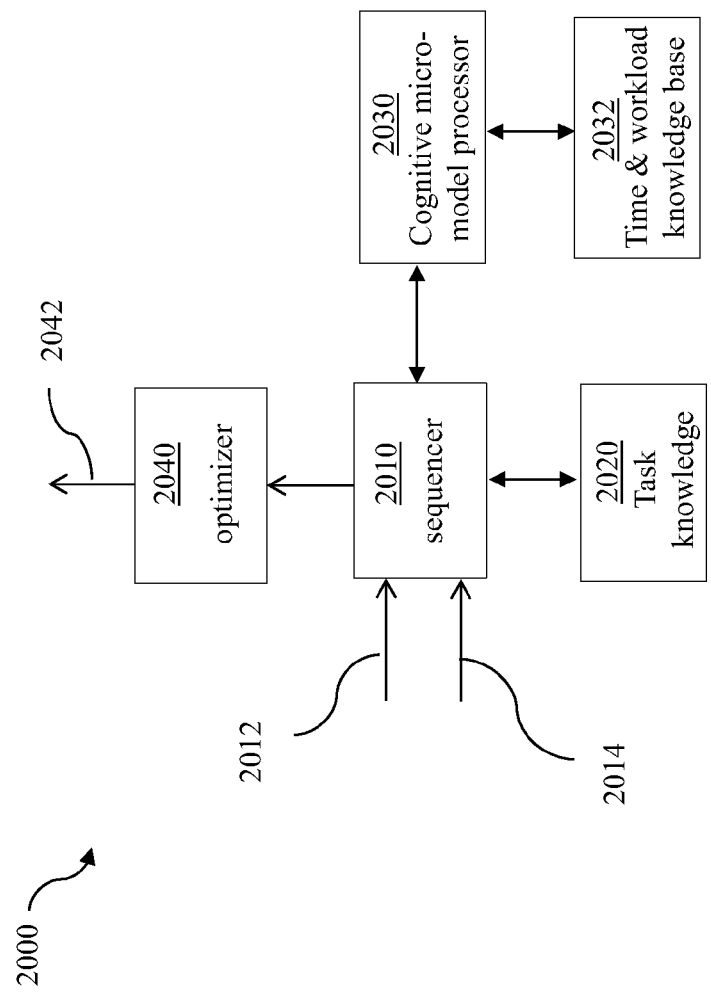
FIG. 20 is a schematic of an optimizer for specifying the parameters of the camera and display, and the vehicle speed that optimizes the camera return.

In a further embodiment, the optimizer 1430 (FIG. 13) is configured as a real-time adaptive aider for the requested task of manually driving the vehicle, by selecting the optimal parameters of display scene compression ratio, camera field-of-view, and vehicle speed. In this process, the camera and display parameters and the vehicle speed are adjusted so that the perceived speed matches the control dynamics optimal for the task, where here, the perceived speed is a measure of the rate of the pipelined flow of the visual scene, evaluation, and control response, limited in manual control processes to about 10 hertz for practical applications. In one embodiment 2000 shown in FIG. 20, a sequencer 2010 processes as input a control strategy 2012 and an task evaluator 2014, where the control strategy is composed of a sequence of task events composed of time periods and sub-tasks to be enabled during the time periods, and specifying a reference path to be executed. Here, the sub-tasks may be such as task orientation, task recall, enabling option review and decision, selection activation, and continual control activation, depending upon the state of operator attention. The sequencer has access to a task knowledge base 2020 and a cognitive micro-model processor 2030 itself with access to a sub-task time and workload knowledge base 2032. Based on the task control strategy and the task status, the sequencer using the task knowledge base and the cognitive model processor, executes an iterative scheduling process for the strategy events with associated cost variables. The optimizer computing the corresponding cost functions selects the minimal cost schedule and outputs the same to the adjustment controllers. This process involves the use of a model of the continual control activation as a feed-forward control loop based on path prediction derived from the reference path, and as a feedback control loop with heading as input, where the control action workload is determined by the heading change rate, a function of the perceived speed as a task cost element of workload for the cognitive flow. This process results from the derivation of the perceived vehicle speed in terms of the parameters of the camera and the display, and the vehicle speed for minimize the strategy cost as cognitive workload; the adjustment of the vehicle speed is made according to the different event stages of the task for minimize the strategy cost.

In this embodiment, the state-space variable form of a skills-rules-knowledge (SRK) information processing model is a framework for a behavior micro-modeling of workload as developed for the requested task operation. With the micro-modeling based on the SRK model, the response of the human operator is directed by micro-level activities that occur within cortical-based processors. These processors consist of a perceptual processor, a cognitive processor interfacing to memory, and a motor processor. The processing times are on the order of 70 to 100 milliseconds with a demand loading corresponding to the attention needed to process the information for the task. Furthermore, loading is increased by interference that occurs within processors during performance of concurrent tasks. Here, responses are skilled or rule-based, with skilled responses being a sequence of over-learned, automatic activities performed in a pipelined manner between connected processors, from perceptual, to cognitive, and then to motor action. In contrast, the rule-based reasoning is a cognitive processor activity of an evaluation nature, in particular, of an "if-then" production rule. Furthermore, the operator will perform a large task by separating it into a series of cognitively manageable unit subtasks. In turn, a unit task has an acquisition phase and an execution phase. During acquisition, the operator builds a mental representation of the task while during execution he or she interacts with the machinery to perform the task. The execution phase is described in terms of mental and motor operations that are peculiar to the particular task.

In this model further configured for the manual control task, the task operation is represented as a sequence of sub-tasks each initiated by display orientation, and followed by mental preparation, an evaluation and decision, and then the execution of control activity. The sub-task sequence consists of micro-model behavior elements and corresponding times. Eye movement time includes preparation and saccade. In a further embodiment, associated with these subtasks are micro-times for execution and corresponding workloads as determined from expert consensus and verified by experimental studies. For demonstration, appropriate subtask activities may be as follows:

Orienting on the Display—At the skill-level, the head is rotated to look at the display while simultaneously the eyes are rotated toward the task related display object; the vision is accommodated to the view.

Mental Preparation—Recall of rule-based knowledge from long-term memory needed to prepare for the task activity.

Evaluation and Decision—Skilled based visual fixation on the displayed object followed by abstractions of pertinent features coupled with mental rotation for fitting to a memory based template for object recognition and problem classification; a rule-based review of possible schemas for action with consequent judgments resulting in an activity choice follows.

Task Activity—A sequence of over-learned, automatic activities performed at the skill level consisting of continuous control movements interspaced with discrete searches and evaluation of task related objects made along a mentally projected course trajectory that is being continually evaluated and adjusted as the activity occurs. In this processor model, the scene features are continually being matched to the variable frame for processing by the rules script processor configured as a state space variable controller for updating the course trajectory as a control set point for the skills processor, where the feature set and rules script are from a representative knowledge base. The skills processor is modeled as a feed forward controller with feedback correction for reaching the control set point.

According to one embodiment, the design process of the camera return optimization may use an iterative optimization routine based on minimizing a cost function defined in terms of the task time and the workload of the operator, $J=C0*T+C1*\Sigma(w-wo)^2$, where the summation is over the task events, C0 and C1 are cost weight factors, and the reference workload, "wo", corresponds to a state of optimal performance according to the Yerkes-Dodson Law. Excessive workload may lead to operator errors which causes a decrement in task performance. Implicit in the cost function is the effect of the projected reference path through the time needed by the operator to review the field choices, since this time includes search, locate, and recognition of choices before a decision to activate may be made; associated with these time elements are effects on workload as well. In a further embodiment, a scheduler may iteratively assign fields and choices to the control schedule until all combinations have been made, and then select the assignment corresponding to the minimal cost. As well as the iterative optimization routine, in further embodiments, variations of minimum cost scheduling algorithms such as the linear programming simplex method, the dynamic programming based Held-Korp algorithm, the Lin-Kernighan heuristic (as a "traveling salesman" problem), or critical path job-machine scheduling techniques may be applied to solve the camera return adjustments as a standard combinational optimization problem.

In this process, the time to orient, detect, recognize and identify a scene object may depend upon the perceivable features as determined by the object distance and display scene compression ratio; however, to a first order approximation this time may be assumed constant while the associated cognitive workload is a function of the features. Similarly, the times to identify the task problem, recall a task schema, and evaluate and select an action may be assumed constant, although the cognitive workload may depend upon the action choices available. Presumably, the executable activity will be made along a mentally projected course trajectory that is being continually evaluated and adjusted as the activity occurs. Here, the workload may depend upon the adjustment rate which is determined by the vehicle speed and the frequency of control adjustments needed over the route distance, as well as by the ability to observe and evaluate the course for adjustments which is determined by both the speed and the compression ratio.

In a further embodiment, the task evaluator 1420 (FIG. 13) may collect attributes of the cognitive state of the operator, in particular, attributes pertaining to the present state of task attention to provides a starting point for the control tasking. For example, the operator may have already recalled the task schema and features to be processed and starting the task analysis at that point may be imposing a hindrance instead of aiding by interfering with the natural task flow. In one embodiment, attributes may comprise one or more such as vision attributes of eye-movements, fixations, and eye-blinks; physiological attributes of heart-rate, heart rate variability, respiration rate, and autonomic cardiac activities of the respiratory sinus arrhythmia, all measured from analyses of the electrocardiogram; and physiological attributes of single-trial evoked response potential and short term frequency power spectra from analysis of electroencephalogram measurements of cortical brain activity. These attributes may be mapped to the state of cognition reasoning as "Skills" (natural processing), "Rules" (rules processing), "Knowledge" (knowledge based reasoning), and "Executive" (task switching and setup). In turn, this may be mapped to the state of task attention further comprising at least one of the states of confounded, task orienting, task recall, task focus, and task execution with option review and decision, and selection activation.

In an embodiment considering vision attributes, eye-blinks and eye-movement and fixation patterns may indicate the state and source of visual attention. In vehicle control with vision directed to the scene display, the visual patterns may be pursuit tracking of objects in the scene as the vehicle moves forward such as visual tracking of the optic flow locus point in front of the vehicle and of the road edge both associated with "Skill" level driving, with occasional transient saccades to acquire new road objects that are associated with "Rules" based processing of search activity. This activity is commonly associated with a cluster of fixations once an object has been located that are used to first recognize a feature of the object for identification, and then a longer fixation for identifying the object, followed by a flurry of eye-blinks during evaluation. As has been mentioned, a shift in fixation from the scene display to the vehicle menu display may be preceded by a fixed gaze while task preparation is mentally made, presumably by priming short term memory to task schema based rules and knowledge in long term memory store. In turn, the shift may be followed by a search pattern for pertinent features of the display to complete task setup (by mapping object stimuli to schema feature framework), and finally during task execution, a disciplined pattern of fixations clustered on task pertinent features with longer fixations made in selection, and possibly eye blink flurries during a resulting manual action.

In a further embodiment, the general state of attention may be determined from electrocardiogram (EKG) measurements (not shown) since the heart rate and its variability are sensitive to the cognitive workload with an increase in heart rate and a reduction in variability with increased task demands; in particular, the power spectrum of the middle frequency component (0.1 Hz) is reduced during resource limited tasks.

In a still further embodiment, the state of cognition may be determined from electroencephalogram (EEG) measurements from skin-scalp sites (not shown) of cortical brain activity; the scalp topological and power spectrum frequency distributions of the Electroencephalography (EEG), are related to cognitive processing. In particular, scalp topology spectra distributions associated with cognitive states are:

Task switching and recall—Strong coherence occurs in the Theta band (4-7 Hz) for the prefrontal and posterior cortical regions during task setup and recall with associated memory transfer for cognitive switching between tasks; this is followed by suppression of the upper alpha band (10-12 Hz) with memory processing at completion of task setup.

Knowledge based reasoning—Frontal theta (4-7 Hz) activity occurs with increased mental processing during challenging tasks involving "rules" processing of knowledge; prefrontal excitation and lateralization in the anterior regions are indicative of high mental workload that is associated with "rules" and "knowledge" based reasoning.

Rules processing—Alpha band (8-12 Hz) power decreases with task performance, at least for arithmetic, recalling, and visual and auditory memory tasks, while there is increased theta band (4-7 Hz) power during spatial and verbal tasks, with a large increase over the right hemisphere in the spatial task.

Repetitive skills task—A repetitive task sequence is associated with suppressed lower alpha band (8-10 Hz) involved in attention and expectancy.

Driving as a continual control task—Alpha suppression (8-12 Hz) in the frontal cortex is associated with increased task attention during driving. Increased power activity with alpha suppression occurs in the primary visual and higher order visual and cerebellar areas, while activity in the frontoparietal, anterior cingulate and medial frontal activity is decreased due to the use of overlearned responses in driving. A distraction during a continual control task is associated with increased theta (4-7 Hz) and beta (13-20 Hz) band activity in the frontal cortex, with suppressed alpha (8-12) and beta power in the motor area.

In addition to the above description, the following embodiments in accordance with the invention are also intended:

1. A method for estimating a perceived vehicle speed in an indirect vision driving task as seen from a display of a video camera return of the driving scene, based on one or more of the display and camera parameters, the driving course characteristics, and the vehicle speed.
2. The method of embodiment 1, in which the estimation of a perceived speed is based on an optic flow locus point seen on the said display for the vehicle, at a camera viewing distance and look-down angle determined by the display and camera parameters, and the driving course characteristics.
3. The method of embodiment 2, in which the said camera viewing distance and look-down angle are determined by the display scene compression ratio ($\alpha$), here the ratio of the display field-of-view as seen by the display operator to the camera field-of-view (FOV), and by the driving course characteristics.
4. The method of embodiment 3, in which the perceived speed is determined for a straight course by the linear speed seen generated at the said locus point by the vehicle forward motion; determined for a circular course with unlimited camera FOV by the composite of the linear speed and rotational speed seen generated at the locus point by the vehicle forward motion and the turn rotational motion; and determined for a circular course with a limited camera FOV by the composite of the linear speed and rotational speed seen generated at the camera-viewing limit by the vehicle forward motion and the turn rotational motion, where the locus point is outside of the camera view.
5. The method of embodiment 4, in which the estimated perceived speed ($V_p$) seen by the display operator as generated by the vehicle speed ($V_M$), comprises:
a. an expression for a straight course, that is given by: $V_p = V_M * \alpha^{+1/3}$, a function of the display scene compression ratio ($\alpha$);
b. an expression for a circular course with unlimited camera FOV, that is given by: $V_P = V_M * \mathrm{sqrt}(1+(\eta/(R*\sin \theta'_c))^2) * \alpha^{+1/3}$, a function of the radius of curvature (R), where $\theta'_c = a\sin(\eta * \alpha^{+2/3}/\rho)$, and where $\rho = \eta/\sin \theta_c$, is the camera viewing distance to the said locus point, where $\theta_c$ is the camera viewing angle to the locus point, and $\eta$ is the camera height above ground level; and
c. an expression for a circular course with a limited camera horizontal field-of view ($FOV_L$), that is given by: $V_P = V_M * \mathrm{sqrt}(1+(\eta/(R*\sin \theta_L))^2) * \sin^2(FOV_c/2) * \alpha^{+1/3} / \sin^2(FOV_L)$, where $FOV_L < FOV_c = 2a\,\sin(\eta/(2R*\tan \theta'_c))$, twice the horizontal viewing angle at the camera position to the locus point, and $\theta_L = a\tan(\eta/(2R*\sin(FOV_L/2)))$, the camera look-down angle to the ground as seen at the camera-viewing limit.
6. A method for optimizing a camera return in an indirect vision driving task, comprising a control strategy for:
a. adjusting parameters of the driving scene camera;
b. adjusting parameters of the display of the said camera return;
c. adjusting the vehicle speed; wherein:
   adjustments are made in a manner generating a cognitive flow rate for a display operator that is optimal for the control dynamics needed for the task, within the tactical and operational constraints of the task.
7. The method of embodiment 6 in which determining the control strategy for the task comprises specifying task events composed of time periods and sub-tasks to be enabled during the time periods, and specifying a reference path to be executed, where the sub-tasks may comprise at least one sub-task of orientation, task recall, enabling option review and decision, selection activation, and continual control activation.
8. The method of embodiment 7, in which determining the control strategy for the task, comprises the modeling of the operator for the control strategy events, as:
a. an executor specifying a representative model of a knowledge base consisting of a feature set and rule scripts;
b. a state-space variable frame for matching features to the variables;
c. a rules processor comprising a state-space variable controller for specifying a control set point from the variable frame and the rule scripts; and d. a skills processor based on a feed forward controller with feedback correction for reaching the control set point.

9. The method of embodiment 8, wherein modeling uses a micro-model, comprising:
   a. a table of subtask elements composed of orientation, task recall, enabling option review and decision, and selection activation; and
   b. a data base of corresponding subtask times at the millisecond level and workload as cost variables.

10. The method of embodiment 7 in which determining the control strategy comprises determining the attention state of the operator, comprising at least one of confounded, task orienting, task recall, task focus, or task execution.

11. The method of embodiment 7 in which determining the control strategy comprises using the micro-model with the use of subtask times and workloads as task cost elements of the cognitive flow.

12. The method of embodiment 7 in which the determining the control strategy comprises the modeling of the continual control activation as a feed-forward control loop based on path prediction derived from reference path curvature, and as a feedback control loop with at least heading as input based on evaluating path performance, where the control action workload is determined by the heading change rate, a function of the perceived speed, herein considered as a task cost element of the cognitive flow.

13. The method of embodiment 6 in which the perceived speed is related to the parameters of said camera and said display, and the vehicle speed for minimize the strategy cost, and an optimizing scheme is used to determine the adjustments that minimize the strategy cost by optimizing the cognitive workload as measured by the perceived speed, within the tactical and operational constraints of the task.

14. The method of embodiment 13 of adjusting the parameters of said camera and said display, comprising adjusting a display scene compression ratio, here the ratio of the display field-of-view as seen by the display operator to the camera field-of-view, for minimize the strategy cost.

15. The method of embodiment 13 in which adjusting the vehicle speed is done according to the different event stages of the task for minimize the strategy cost.

16. A system for optimizing a camera return in an indirect vision driving task, comprising:
   a. a means for adjusting parameters of the driving scene camera;
   b. a means for adjusting parameters of the display of the said camera return;
   c. a means for adjusting the vehicle speed;
   d. a model of an operator cognitive process as strategy costs;
   e. a means of determining the attention state of a display operator;
   f. a means of deriving a control strategy for the task specifying task events composed of time periods and sub-tasks to be enabled during the time periods, and specifying a reference path to be executed; and
   g. a means of specifying adjustments for the task events from the cognitive process model in a manner generating a cognitive flow rate for a display operator that is optimal for the control dynamics needed for the task, within the tactical and operational constraints of the task.

17. The system of embodiment 16, in which model of the operator cognitive process comprises:
   a. an executor specifying a representative model of a knowledge base consisting of a feature set and rule scripts;
   b. a state-space variable frame for matching features to the variables;
   c. a rules processor comprising a state-space variable controller for specifying a control set point from the variable frame and the rule scripts; and
   d. a skills processor based on a feed forward controller with feedback correction for reaching the control set point.

18. The knowledge base of embodiment 17, embedded as a micro-model, comprising:
   a. a table of subtask elements composed of orientation, task recall, enabling option review and decision, and selection activation; and
   b. a data base of corresponding subtask times and workload as cost variables.

19. The system of embodiment 16, where the means determining the state of task attention, comprising at least one of:
   a. a device for tracking eye-movements and predicting eye-gaze;
   b. a device for determining physiological state of the operator;
   c. a device for tracking manual activities appropriate for performance of the tasks; and
   d. a device for reporting the state of the task performance by the operator, wherein the determination of the state of attention further comprises the detection of attributes for the state, comprising at least one of confounded, task orienting, task recall, task focus, or task execution.

20. The system of embodiment 16, where the means specifying adjustments of the said camera and display, and the vehicle speed for the control strategy, from the cognitive process model comprises:
   a. the specification of the sub-tasks for the control strategy as at least one sub-task of orientation, task recall, enabling option review and decision, selection activation, and continual control activation, depending upon the state of attention;
   b. the use of the micro-model with the use of subtask times and workloads as task cost elements of the cognitive flow;
   c. the use of the model of the continual control activation as a feed-forward control loop based on path prediction derived from reference path curvature, and as a feedback control loop with at least heading as input based on evaluating path performance, where the control action workload is determined by the heading change rate, a function of the perceived speed, herein considered as a task cost element as workload of the cognitive flow;
   d. the derivation of the perceived vehicle speed in terms of the parameters of said camera and said display, and the vehicle speed for minimize the strategy cost as cognitive workload;
   e. the adjustment of the parameters of camera and display, comprising adjusting a display scene compression ratio, here the ratio of the display field-of-view as seen by the display operator to the camera field-of-view, for minimize the strategy cost;
   f. the adjustment of the vehicle speed according to the different event stages of the task for minimize the strategy cost; and g. the use of an optimizing scheme for determining the adjustments that minimize the strategy cost by optimizing the cognitive workload, within the tactical and operational constraints of the task.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated. All references mentioned herein are hereby incorporated by reference in their interties.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

TABLE 1

Calibration Road speed for unlimited FOV road turns

| Segment | Radius (m) | Length (m) | Speed (m/s) | Time (sec) |
|---|---|---|---|---|
| 1 | 21.68 | 12.810 | 6.646 | 1.927 |
| 2 | 10.03 | 8.612 | 4.169 | 2.066 |
| 3 | 10.20 | 9.108 | 4.223 | 2.157 |
| 4 | 29.60 | 9.309 | 7.406 | 1.257 |
| Total | n/a | 39.838 | 5.379 | 7.407 |

TABLE 2

Validity Demonstration Road speed for unlimited FOV road turns

| Segment | Radius (m) | Length (m) | Speed (m/s) | Time (sec) |
|---|---|---|---|---|
| 1 | inf | 5.960 | 8.725 | 0.683 |
| 2 | 22.61 | 8.935 | 6.761 | 1.321 |
| 3 | 16.93 | 9.220 | 5.901 | 1.562 |
| 4 | inf | 9.601 | 6.751 | 1.422 |
| 5 | 8.50 | 7.862 | 3.652 | 2.152 |
| 6 | 8.50 | 8.675 | 3.652 | 2.375 |
| 7 | inf | 9.010 | 6.248 | 1.442 |
| 8 | 9.18 | 6.524 | 3.888 | 1.678 |
| 9 | inf | 15.841 | 6.248 | 2.535 |
| 10 | 8.50 | 6.271 | 3.652 | 1.717 |
| 11 | inf | 20.166 | 8.725 | 2.311 |
| Total | n/a | 108.064 | 5.630 | 19.194 |

TABLE 3

Road speed for 1996 HMD study road sections (effective FOV = 32°)

| Segment | Radius (m) | Length (m) | FOVC | Speed (m/s) | Time (sec) |
|---|---|---|---|---|---|
| 1 | inf | 5.960 | 0.00° | 6.062 | 0.983 |
| 2 | 22.61 | 8.935 | 21.77° | 5.673 | 1.580 |
| 3 | 16.93 | 9.220 | 29.21° | 5.416 | 1.711 |
| 4 | inf | 9.601 | 0.00° | 4.838 | 1.584 |
| 5* | 8.50 | 7.862 | 60.30° | 1.812 | 5.007 |
| 6* | 8.50 | 8.675 | 60.30° | 1.812 | 5.525 |
| 7 | inf | 9.010 | 0.00° | 4.004 | 1.486 |
| 8* | 9.18 | 6.524 | 55.43° | 2.080 | 3.628 |
| 9 | inf | 15.841 | 0.00° | 4.690 | 2.613 |
| 10* | 8.50 | 6.271 | 60.30° | 1.812 | 3.994 |
| 11 | inf | 20.166 | 0.00° | 6.062 | 3.327 |
| 12 | 21.68 | 12.810 | 22.71° | 5.642 | 2.278 |
| 13* | 10.03 | 8.612 | 50.38° | 2.443 | 4.085 |
| 14* | 10.20 | 9.108 | 49.49° | 2.520 | 4.191 |
| 15 | 29.60 | 9.309 | 16.59° | 5.825 | 1.601 |
| 16 | inf | 9.309 | 0.00° | 6.062 | 1.536 |
| Total | n/a | 157.251 | n/a | 3.618 | 43.464 |

Note:
*indicates FOV limited turns with FOVC > FOV = 32°

| REFERENCE NUMERALS ARL 10-42 | |
|---|---|
| 100 | speed advisor system |
| 102 | speed prediction modeler |
| 104 | driver |
| 106 | vehicle |
| 108 | camera |
| 110 | lens |
| 112 | video signal processor |
| 114 | video display |
| 118 | scene |
| 120 | joystick |
| 122 | straight path modeler |
| 124 | field of view modeler |
| 126 | field of view modeler |
| 128 | adaptive aider |
| 130 | path |
| 132 | path |
| 200 | computer system |
| 202 | processor |
| 204 | memory |
| 206 | support circuits |
| 208 | i/o interface |
| 209 | input/output device |
| 210 | speed advisor module |
| 212 | speed prediction modeler |
| 214 | adaptive aider module |
| 216 | scene segment modeler S-UFOV module |
| 218 | scene segment modeler T-UFOV module |
| 220 | scene segment modeler T-LFOV module |
| 222 | operating system |
| 300 | method |
| 302 | step |
| 304 | step |
| 1030 | vehicle |
| 1032 | road |
| 1034 | turn center |
| 1036 | flow origin |
| 1038 | intersect point |
| 1040 | display centerline |
| 1300 | the adaptive aider |
| 1302 | operator |
| 1304 | displays |
| 1308 | tasks |
| 1320 | multifunctional screen display |
| 1322 | driving scene display |
| 1324 | functional displays |
| 1328 | output |

-continued

REFERENCE NUMERALS
ARL 10-42

| | |
|---|---|
| 1330 | camera lens controller |
| 1332 | video display |
| 1334 | speed predictor modeler |
| 1336 | operator visual attention estimator |
| 1338 | camera return optimizer |
| 1340 | driving scene camera |
| 1342 | camera lens |
| 1350 | speed adjustment controller |
| 1352 | electronic output |
| 1360 | sensors |
| 1362 | input |
| 1370 | electronic task master |
| 1400 | configuration |
| 1410 | visual attention estimator |
| 1412 | eye-tracker |
| 1414 | task status modular |
| 1416 | manual activity tracker |
| 1418 | physiological recordings |
| 1420 | task evaluator |
| 1430 | return optimizer |
| 1440 | electronic task manager |
| 1442 | digital input |
| 1450 | speed predictor model |
| 1460 | video display controller |
| 1462 | display processor |
| 1480 | camera controller |
| 1482 | camera lens motor |
| 1490 | vehicle speed control |
| 1500 | block figure vehicle |
| 1510 | stationary object |
| 1520 | perceived object |
| 1530 | point |
| 1540 | plot |
| 1600 | model |
| 1610 | executor |
| 1620 | model base |
| 1630 | knowledge |
| 1635 | rule-based processor |
| 1640 | script rules |
| 1642 | feature frame |
| 1644 | state estimator |
| 1646 | state predictor |
| 1648 | control gain reference |
| 1650 | skills processor |
| 1660 | task status |
| 1670 | input |
| 1680 | activator |
| 1710 | predictor controller |
| 1714 | inner loop feed-forward inverse model |
| 1716 | first-order low-pass filter |
| 1718 | integrator |
| 1720 | outer loop |
| 1730 | limb model |
| 1732 | low pass filter |
| 1734 | integrator |
| 1742 | visual feedback |
| 1744 | adder |
| 1810 | PID controller |
| 1830 | differential signal |
| 1850 | error gain |
| 1860 | error gain |
| 1870 | error gain |
| 1880 | skills processor |
| 2000 | optimizer |
| 2010 | sequencer |
| 2012 | control strategy input |
| 2014 | task evaluator input |
| 2020 | task knowledge base |
| 2030 | cognitive micro-model processor |
| 2032 | sub-task time and workload knowledge base |

The invention claimed is:

1. A method for aiding an operator during performance of an indirect vision driving task while viewing a display of a video camera return of a driving scene via a display device, comprising:
   determining parameters for both of a display being viewed during an indirect vision driving task and of a camera providing a camera return that is being displayed;
   determining characteristics of a plurality of sections of a course in the driving scene being displayed to the operator via the display device;
   determining an actual speed of the vehicle during the indirect vision driving task;
   calculating an estimated operator-perceived vehicle speed as would be expected to be visually perceived and interpreted as being the actual vehicle speed by the operator during performance of the indirect vision driving task while viewing the display device for each of a plurality of sections of the course in the driving scene based on the above determinations; and
   adaptively controlling, via a processor, the display of the driving scene on the display device to the operator in a manner so as to mitigate the difference between the estimated operator-perceived vehicle speed for the operator and the actual vehicle speed during the performance of the indirect vision driving task.

2. The method of claim 1, wherein calculating the estimated operator-perceived vehicle speed is based on determinations that include parameters of an optic flow locus point seen on the display being viewed by the operator, at a camera viewing distance and look-down angle as determined by the display and camera parameters, and geometric characteristics of the plurality of sections of driving course.

3. The method of claim 2, wherein the camera viewing distance and look-down angle are determined by a display scene compression ratio ($\alpha$) that is the ratio of the display field-of-view as seen by the operator to the camera field-of-view (FOV), and by the determined driving course characteristics.

4. The method of claim 3, in which the estimated operator-perceived vehicle speed is:
   determined for a straight section of course separately by a linear speed seen generated at the optic flow locus point by forward motion the vehicle;
   determined for a circular section of course with unlimited camera FOV separately by a composite of the linear speed and a rotational speed seen generated at the optic flow locus point by the vehicle forward motion and rotational motion; and/or
   determined for a circular course with a limited camera FOV separately by a composite of the linear speed and rotational speed seen generated at a camera-viewing limit by the vehicle forward motion and the rotational motion, where the locus point is outside of the camera FOV.

5. The method of claim 4, in which the estimated operator-perceived vehicle speed ($V_p$) is generated from the vehicle speed ($V_M$) and comprises:
   an expression for a straight course, that is given by: $V_p = V_M * \alpha^{+1/3}$, a function of the display scene compression ratio ($\alpha$);
   an expression for a circular course with unlimited camera FOV, that is given by: $V_P = V_M * \sqrt{1 + (\eta/(R*\sin\theta'_c))^2} * \alpha^{+1/3}$, a function of the radius of curvature (R), where $\theta'_c = a\sin(\eta * \alpha^{+2/3}/\rho)$, and where $\rho = \eta/\sin\theta_c$, is the camera viewing distance to the locus point, where $\theta_c$ is the camera viewing angle to the locus point, and η is the camera height above ground level; and an expression for a circular course with a limited camera horizontal field-of-view (FOV$_L$), that is given by: V$_P$=V$_M$*sqrt(1+(η/(R*sin θ$_L$))$^2$)*sin$^2$(FOV$_c$/2)*α$^{+1/3}$/sin$^2$(FOV$_L$), where FOV$_L$<FOV$_c$=2a sin(η/(2R*tan θ'$_c$)), twice the horizontal viewing angle at the camera position to the locus point, and θ$_L$=a tan(η/(2R*sin (FOV$_L$/2))), the camera look-down angle to the ground as seen at the camera-viewing limit.

6. The method of claim 1, wherein adaptively controlling the display of the driving scene on the display device comprises alerting the operator that there is a difference between the estimated operator perceived vehicle speed for the operator and the actual vehicle speed.

7. The method of claim 1, wherein adaptively controlling the display of the driving scene on the display device comprises adjusting the format of the driving scene that is displayed to the operator such that the operator will visually perceive and interpret the vehicle speed during performance of the indirect vision driving task while viewing the display device as substantially being the actual speed of the vehicle.

8. The method of claim 7, wherein the format of the driving scene that is displayed is controlled in accordance with a control strategy that includes adjustments of one or more of:
 a. parameters of the camera;
 b. parameters of the display of the camera return;
 c. the vehicle speed.

9. The method of claim 8, wherein the adjustments are made in a manner so as to generate a cognitive flow rate in the operator that is optimal for control dynamics required for the task.

10. The method of claim 8, wherein the control strategy comprises:
 a. specifying task events composed of time periods and sub-tasks to be enabled during the time periods, and
 b. specifying a reference path to be executed,
 where the sub-tasks may comprise at least one of:
  i. sub-task of orientation;
  ii. task recall;
  iii. enabling option review and decision;
  iv. selection activation; and
  v. continual control activation.

11. The method of claim 8, wherein the control strategy comprises modeling of the operator for the control strategy events, as one or more of:
 a. an executor specifying a representative model of a knowledge base consisting of a feature set and rule scripts;
 b. a state-space variable frame for matching features to the variables;
 c. a rules processor comprising a state-space variable controller for specifying a control set point from the variable frame and the rule scripts; and
 d. a skills processor based on a feed forward controller with feedback correction for reaching the control set point.

12. The method of claim 11, wherein modeling uses a micro-model, comprising:
 a. a table of subtask elements composed of orientation, task recall, enabling option review and decision, and selection activation; and
 b. a data base of corresponding subtask times at the millisecond level and workload as cost variables.

13. The method of claim 8 wherein the control strategy includes determining an attention state of the operator.

14. The method of claim 12 wherein the control strategy includes using the micro-model with the use of subtask times and workloads as task cost elements of an optimal cognitive flow rate in the operator.

15. The method of claim 10 wherein the control strategy includes modeling of the continual control activation as a feed-forward control loop based on a path prediction derived from a curvature of the reference path, and as a feedback control loop with at least heading as input based on evaluating path performance.

16. Apparatus for aiding an operator during performance of an indirect vision driving task performed by a vehicle operator while viewing a display of a video camera return of a driving scene via a display device, comprising:
 a camera for generating a video camera return signal representative of an driving scene;
 a video signal processor for applying the video camera return signal to a display for viewing of the driving scene by the vehicle operator;
 a speed prediction modeler for predicting a driving speed, where the speed prediction modeler determines parameters for both of the display and of the video camera, determines characteristics of a plurality of sections of a course in the driving scene being displayed, determines an actual speed of the vehicle during the indirect vision driving task, and then calculates an estimated operator-perceived vehicle speed as would be expected to be visually perceived and interpreted as being the actual vehicle speed by the operator during performance of the indirect vision driving task while viewing the display device for each of a plurality of sections of the course in the driving scene based on the above determinations; and
 an adapter aider for adaptively controlling the display of the driving scene on the display device to the operator in a manner so as to mitigate the difference between the estimated operator-perceived vehicle speed for the operator and the actual vehicle speed during the performance of the indirect vision driving task.

17. The apparatus of claim 16, wherein the adapter aider adaptively controls the display of the driving scene on the display device by alerting the operator that there is a difference between the estimated operator-perceived vehicle speed for the operator and the actual vehicle speed.

18. The apparatus of claim 16, wherein the adapter aider adaptively adjusts the format of the display of the driving scene to the operator such that the operator will visually perceive the vehicle speed during performance of the indirect vision driving task while viewing the display device as substantially being the actual speed of the vehicle.

19. The apparatus of claim 18, wherein the adapter aider controls the format of the display of the driving scene in accordance with a control strategy that includes adjustments of one or more of:
 a. parameters of the camera;
 b. parameters of the display of the camera return;
 c. the vehicle speed.

20. The apparatus of claim 16 wherein the speed prediction modeler determines an expression for a straight section of course separately, an expression for a circular section of course with an unlimited field-of-view (FOV) separately, and/or an expression for a circular section of course with a limited FOV in calculating the estimated operator perceived vehicle speed separately.

* * * * *